US006922455B2

(12) United States Patent
Jurczyk et al.

(10) Patent No.: US 6,922,455 B2
(45) Date of Patent: Jul. 26, 2005

(54) GAS-TARGET NEUTRON GENERATION AND APPLICATIONS

(75) Inventors: Brian E. Jurczyk, Joliet, IL (US); John M. DeMora, Jr., Chicago, IL (US); Robert A. Stubbers, Cincinnati, OH (US)

(73) Assignee: Starfire Industries Management, Inc., Chicago, IL (US)

( * ) Notice: Subject to any disclaimer, the term of this patent is extended or adjusted under 35 U.S.C. 154(b) by 47 days.

(21) Appl. No.: 10/058,561

(22) Filed: Jan. 28, 2002

(65) Prior Publication Data

US 2003/0152186 A1 Aug. 14, 2003

(51) Int. Cl.[7] .................................................. G21B 1/00
(52) U.S. Cl. ..................... 376/144; 376/145; 376/107; 376/109; 378/134; 378/136
(58) Field of Search .......................... 376/107, 109, 376/144, 145; 378/134, 136

(56) References Cited

U.S. PATENT DOCUMENTS

| | | | |
|---|---|---|---|
| 3,258,402 A | 6/1966 | Farnsworth | 376/102 |
| 3,386,883 A | 6/1968 | Farnsworth | 376/107 |
| 3,530,036 A | 9/1970 | Hirsch | 376/107 |
| 3,530,497 A | * 9/1970 | Hirsch et al. | 376/109 |
| 3,609,369 A | 9/1971 | Croitoru | 376/108 |
| 3,761,712 A | 9/1973 | Listerman | 250/388 |
| 3,794,843 A | 2/1974 | Chen | 250/359.1 |
| 3,885,160 A | 5/1975 | Dillingham | 376/191 |
| 4,076,990 A | 2/1978 | Hendry et al. | 376/191 |
| 4,112,306 A | 9/1978 | Nunan | 376/112 |
| 4,233,539 A | 11/1980 | Falce | 315/5.38 |
| 4,244,782 A | 1/1981 | Dow | 376/179 |
| 4,263,528 A | 4/1981 | Miram | 313/193 |

(Continued)

FOREIGN PATENT DOCUMENTS

| WO | WO 95/30235 | * 11/1995 |
|---|---|---|
| WO | 97/00519 | * 1/1997 |
| WO | WO 98/19817 | * 5/1998 |
| WO | WO 99/24990 | * 5/1999 |

OTHER PUBLICATIONS

McClure, G. W., "High–Voltage Glow Discharges in D2 Gas. I. Diagnostic Measurements," J. Phys. Rev., 124, Nov. 1, 1961.

Hirsch, R. L., "Inertial–Electostatic Confinement of Ionized Fusion Gases", J. Appl. Phys., 18, Oct. 11, 1967.

Miley, G. H., "Discharge Characteristics of the Spherical Intertial Electrostatic Confinement (IEC) Device", IEEE Trans. Plasma Sci., 25, Aug. 4, 1997.

*Primary Examiner*—Jack Keith
(74) *Attorney, Agent, or Firm*—Leydig, Voit & Mayer, Ltd.

(57) ABSTRACT

Described herein are integrated systems for generating neutrons to perform a variety of tasks including: on-line analysis of bulk material and industrial process control (as shown in FIG. 1), security interrogation (as shown in FIG. 2), soil and environmental analysis, and medical diagnostic treatment. These systems are based on novel gas-target neutron generation which embodies the beneficial characteristics of replenishable fusible gas targets for very long lifetime, stability and continuous operation, combined with the advantageous features common to conventional accelerator neutron tubes including: on/off operation, hermetically sealed operation, and safe storage and transport. Innovative electron management techniques provide gas-target neutron production efficiencies that are comparable or surpass existing sources. The high-pressure high-resistance gaseous discharge is presented as a favorable gas-target neutron generator embodiment, combining ion source regions, accelerator regions, gas-target regions and electron management components within a single simple cost-effective device that is adaptable to various geometric configurations that provide specific neutron emission profiles for greater analysis capacity.

6 Claims, 36 Drawing Sheets

U.S. PATENT DOCUMENTS

| | | | |
|---|---|---|---|
| 4,414,472 A | 11/1983 | Watt | 250/359.1 |
| 4,480,185 A | 10/1984 | Hashimoto | 250/251 |
| 4,581,194 A | 4/1986 | Givens | 376/119 |
| 4,582,992 A | 4/1986 | Atwell | 250/359 |
| 4,645,635 A | 2/1987 | Yuen | 376/245 |
| 4,671,256 A | 6/1987 | Lemelson | 600/4 |
| 4,694,165 A | 9/1987 | Proctor et al. | 250/252.1 |
| 4,696,782 A | 9/1987 | Clayton et al. | 376/159 |
| 4,830,193 A | 5/1989 | Clayton et al. | 209/311 |
| 4,884,288 A | 11/1989 | Sowerby | 378/51 |
| 5,053,185 A | 10/1991 | Christensen | 376/137 |
| 5,098,640 A | 3/1992 | Gozani | 376/166 |
| 5,112,564 A | 5/1992 | Bernardet | 376/116 |
| 5,153,439 A | 10/1992 | Gozani | 250/350.64 |
| 5,162,095 A | 11/1992 | Alegre | 376/159 |
| 5,200,626 A | 4/1993 | Schultz | 250/390.04 |
| 5,252,832 A | 10/1993 | Nguyen | 250/390.01 |
| 5,330,621 A | 7/1994 | Visuri | 162/49 |
| 5,342,158 A | 8/1994 | Isaacson | 414/146 |
| 5,373,538 A | 12/1994 | Grenier | 376/159 |
| 5,392,319 A | 2/1995 | Eggers | 376/194 |
| 5,396,071 A | 3/1995 | Atwell | 250/358.1 |
| 5,410,575 A | 4/1995 | Uhm | 376/159 |
| 5,414,195 A | 5/1995 | Peterson. | 588/1 |
| 5,433,693 A | 7/1995 | Ott | 600/1 |
| 5,606,167 A | 2/1997 | Miller | 250/390.04 |
| 5,732,115 A | 3/1998 | Atwell | 376/159 |
| 5,818,054 A | 10/1998 | Randers-Pehrson | 250/350.64 |
| 5,825,030 A | 10/1998 | Hurwitz | 250/358.1 |
| 5,949,069 A | 9/1999 | Chace | 250/269.7 |
| 5,959,870 A | 9/1999 | Hurwitz | 700/239 |
| 6,026,135 A | 2/2000 | McFee | 376/159 |
| 6,157,034 A | 12/2000 | Griebel | 250/358.1 |
| 6,188,746 B1 * | 2/2001 | Miley et al. | 378/119 |
| 6,218,943 B1 | 4/2001 | Ellenbogen | 340/572.4 |

* cited by examiner

(a) Prompt Gamma Neutron Activation Analysis

Neutron + nucleus = nucleus with extra neutron + characteristic gamma ray

The photon (gamma) that is emitted has a characteristic wavelength (color) that identifies the element.

(b) Delayed Gamma Neutron Activation Analysis

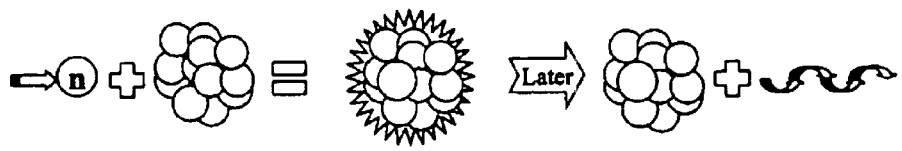

Neutron + nucleus = activated nucleus with extra neutron
               which emits a                characteristic gamma ray when it decays

Bulk Material Property Analysis with Neutrons

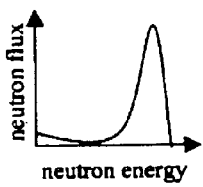
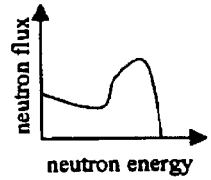

(c) Neutron Energy before Entering Material
(slight energy scattering due to neutrons passing through neutron generator)

(d) Neutron Energy after Passing through Material
(marked energy scattering due to material properties)

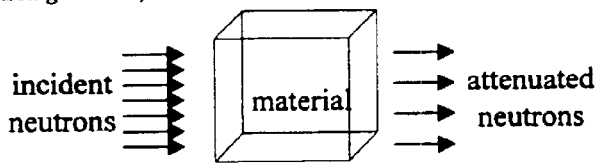

(e) By comparing neutron fluxes before and after passing through the material, various material properties can be calculated, including density, thickness, porosity, and moisture content.

Fig. 3.

Thermal Neutron + Boron-10 = Energetic Lithium-7 + Energetic Alpha

Key for Symbols Used in Figures 7, 9, and 33

- (-) electron
- (+) positive ion (such as deuterium)
- (f.n.) fast neutral (such as deuterium)
- (gas) background gas (such as deuterium)
- ⇨ gaseous discharge particle has energy for collision (above thermal equilibrium)
- ✸ collision
- (n) neutron
- ($^3$He) helium-3

GAS-TARGET NEUTRON GENERATION AND APPLICATIONS

FIELD OF INVENTION

Ultimately, the invention relates to a neutron source and its applications. The gas-target neutron source might be classified along with accelerator-target systems or "neutron tubes", which use targets imbedded with deuterium and/or tritium to generate neutrons, and are usually small point sources of neutrons whose lifetimes decrease with increased yield. However, the gas-target neutron generator uses deuterium gas or a deuterium and tritium mixture as the fusion target to provide longer lifetimes even at high neutron yields. The High-Pressure High-Resistance Gaseous Discharge (HPHRGD) neutron generator embodiment can be configured to provide a neutron source in a wide variety of shapes, such as linear, planar, or toroidal. Various innovations are implemented in the field of electron management to increase the amount of high-energy ions, fast neutral and target background gas particles in the discharge to improve the neutron generation rate and power efficiency. Such innovations reduce the effects of electrons to promote a discharge dominated by the high-energy heavy particles, which allow for higher pressures of operation to offset an increase in the resistance of the gaseous discharge.

The applications of the gas-target neutron generator involve the fields of neutron-material interactions for diagnostic or therapeutic effects. Analysis techniques such as delayed gamma analysis (thermal & fast activation and inelastic scatter) and prompt gamma analysis (thermal and fast capture and inelastic scatter) can identify chemical elements within a material. Such information can be used to inspect camouflaged packages, determine the presence of explosives, measure trace elemental impurities, and assess the quality of materials in an online industrial process. Other neutron analysis techniques such as neutron resonance spectroscopy, neutron absorption and neutron attenuation measurements can determine material properties such as density, thickness, porosity, and moisture content. The on-line determination of such properties can improve many various industrial process control applications. Neutrons from the gas-target system can also be used directly in medical therapy applications, such as boron neutron capture therapy, and functional single photo computed tomography.

BACKGROUND OF THE INVENTION

Due to the wide variety of subject areas this invention encompasses, there is a tremendous amount of background information that can be examined. The following sections will identify areas that are helpful toward the understanding of the invention.

Neutron Generation

There are many available means to generate neutrons: such generators include nuclear reactors, radioisotope sources, linear accelerator spallation devices, accelerator-solid target devices, and a host of plasma-confinement fusion concepts.

Nuclear reactors can produce tremendous quantities of neutrons, but are only considered for very large-scale applications that would require a dedicated facility. Reactors are often quite large, expensive to construct and operate, and are heavily regulated. They are not considered portable or cost-effective for small-scale neutron applications.

Radioisotope neutron sources consist of an isotope that spontaneously fissions, such as californium-252, or an alpha-emitter, such as plutonium-240 or americium-241, mixed with beryllium. Radioisotope sources are often small and can provide large neutron fluxes, however, they cannot be "turned off" and must be shielded to protect personnel from radiation exposure. Such sources produce neutrons at various energies, as well as other types of radiation, including beta, gamma, and x-rays. The health risks, costs and ultimate disposal issues of such neutron sources make them unattractive for industrial applications.

Linear accelerator spallation sources accelerate ions to high energies and send them into a target to produce neutrons from spallation reactions. Neutrons produced from the spallation reactions are emitted in a "forward-peaked" direction, resulting in an intense, directed neutron flux, which can be useful in some applications. The spallation targets can produce large neutron yields and can have a reasonably long lifetime. However, these devices require large support structures, are not considered portable, and are very expensive to construct and operate.

There are many concepts that use the fusion process to generate neutrons. Fusion is a nuclear process where two light nuclei undergo a high-energy collision that rearranges the subatomic particles of the colliding nuclei to form two (or more) different nuclei with high energies. There are two principal fusion reactions that produce neutrons. One is the reaction between deuterium and tritium, which produces 14.1 MeV neutrons, along with 3.5 MeV alpha particles. The other key neutron producing reaction is between two deuterium nuclei; however, this reaction has two possible outcomes: a 2.45-MeV neutron and a 0.82-MeV helium-3 nucleus, or a 3.06-MeV proton and a 1.02-MeV triton (tritium nucleus).

Accelerator-solid target devices utilize the acceleration of deuterons, usually generated with a Penning ion source, into a target loaded with deuterium or tritium in solid solution or hydride form. The energies of acceleration are in the hundreds of kilovolts to allow enough penetration of the deuteron into the target metal lattice to find a D or T atom for fusion. These devices operate with a low background gas pressure and a high target density within the metal lattice to maximize fusion probability and neutron output. However, the targets erode from particle impingement and thermal degradation, resulting in minimal lifetimes measured in hundreds of hours with nominal neutron output. These sources are normally pulsed to generate high neutron fluxes and to reduce target degradation.

There are several plasma-confinement fusion concepts capable of generating neutrons that have been developed in the hope of commercially generating electrical power. There are two "mainstream" categories of fusion devices, magnetically confined fusion (MCF), and inertial confinement fusion (ICF). In MCF systems such as tokamaks, spheromaks and stellerators, strong magnetic fields are used to confine a plasma with a temperature sufficient for fusion, thereby generating neutrons. In ICF systems, a small pellet or droplet of fusible material is rapidly heated and compressed by high-energy laser beams or particle beams to cause fusion, thereby generating neutrons. Generally, the "mainstream" MCF and ICF systems are very large and require large amounts of power and support infrastructure to generate large quantities of neutrons; thus these systems are not practical for industrial neutron analysis.

There are also many lesser-known "alternative" plasma-confinement fusion concepts that are more practical for neutron production, due to their smaller size. Theta-pinch and z-pinch devices attempt to confine high-energy plasma with self-generated magnetic fields caused by flowing current. Plasma focus devices use a transient discharge current to push fusible gas down the length of an electrode, heating and compressing it at the end of the electrode. These systems provide moderate bursts of neutrons but with low repetition rates. Inertial electrostatic confinement systems establish "virtual" electrode confinement regions, called "poissors", that confine energetic ions at a high-density where they can fuse with each other, however such systems require large volumes and large support structures for practical neutron generation.

Accelerator Gas-Target Neutron Generation

A new method of neutron generation employs an accelerator to send high-energy ions into a gas target for the fusion reaction. The idea of using high-energy ions to interact with a gas is not new, but applying the idea to create a portable neutron generator is new. Accelerator gas-target devices generally contain an ion source region, acceleration region and gas-target region. There are potential advantages to the gas-target system due to the constant replenishment of target material and the removal of the degradable metal lattice found in solid-target systems. However, there are disadvantages in power efficiency due to electron generation and mobility, and low gas-target density for the fusion reactions necessary for efficient neutron generation. Another aspect of the gas-target neutron source is that the gas-target region can be of varying geometry to produce different shaped neutron production regions.

Electron Management System

Another background field for the invention contained herein is in the realm of electron management. Gas-target systems do not benefit from a metal lattice to absorb electrons generated from the high-energy ion impact with the target material. Consequently, electrons are generally free to be accelerated through the acceleration region to the detriment of the gas-target system, limiting performance. Thus, electron management can be applied to the gas-target system to increase system efficiency, including techniques such as suppression, repression, screening, extraction, and collection. The adoption of electron management principles and methods allow gas-target systems to provide equivalent or superior performance to that of conventional solid-target accelerators.

Gaseous Discharges

As stated, the invention described in this document utilizes a gaseous discharge process that operates in a high-pressure high-resistance mode to generate high-energy particles for the preferred embodiment of the family of gas-target systems. The HPHRGD neutron generator operates in a weakly ionized state where collisions between heavy particles provide the ionizations to sustain the discharge. Operation in this state is commercially unattractive for processing applications, due to low plasma generation densities per unit input power. However, the high-pressure high-resistance gaseous discharge does produce many high-energy particles that are applicable to nuclear interactions and other collisional processes.

Background information in the field of plasma discharge devices is broad and varied. The most common and prevalent plasma devices are radio frequency driven devices and direct current glow discharges. These discharge devices generally operate in the low-resistance electron-dominated "normal glow" discharge mode at low voltages (hundreds of volts). Some glow discharge systems can operate with larger potential differences, but operate in the "abnormal glow" or "obstructed glow" regimes of electron dominance over plasma sheath distances.

The high-pressure high-resistance gaseous discharge described in this document is not a "glow discharge" as defined in conventional plasma physics. Rather, it could be considered as a hybrid between a particle accelerator and an electrical discharge. The HPHRGD neutron generator operates with a gaseous discharge that is sustained primarily by ionizing collisions between heavy-particles (ions and fast neutral gas particles) over long path lengths, which has a higher resistance than other electron-dominated discharges. The HPHRGD system shares some aspects of conventional plasma devices, such as pseudosparks, thyratrons, vacuum switches, and aspects of high-energy accelerators as well. The phrase "high-pressure" is associated with the successive electron management improvements that allow higher gas-target pressures for increased neutron generation.

Electrode geometry is an important aspect of the innovation since it is a defining factor in the formation of the high-pressure high-resistance gaseous discharge. The use of a semi-transparent cathode (an electrode with openings or holes) in the HPHRGD system is to provide transparency for ions and fast-neutral particles to transit to other regions of the device. The semi-transparent electrode is not meant to trap or confine any particles within the discharge, as is common with "hollow-cathode" systems in the traditional sense, which effectively confine electrons through a reflexing action long enough to provide large electron-generated plasma densities. The hollow cathode effect is useful in enhancing electron-dominated discharges and increasing the efficiency of plasma generation. The electrodes of the HPHRGD system are designed to prevent the traditional hollow cathode effect from occurring during normal operation.

HPHRGD Neutron Generator Components

The HPHRGD embodiment of the gas-target neutron generator combines the ion source, acceleration region, and gas-target volume components of a basic gas-target system into one simple device. The invention utilizes various gaseous discharge geometries to create different neutron source distributions, such as linear, planar, and annular. The choice of neutron source geometry can improve analysis techniques by providing neutrons where they are needed to perform effective scanning in various applications. Also, these geometries allow for efficient cooling of the discharge device during high-power operation. As a result, the HPHRGD neutron generator can operate with greater average power inputs than other neutron sources, such as accelerator-solid-target sources.

The HPHRGD neutron generator uses semi-transparent electrodes to allow particles to traverse the neutron generator. The electrode openings also allow electric fields to penetrate inside the electrode. The size and number of electrode openings can be adapted to decrease the potential differences within the cathode region, thereby repressing secondary electron emission. The concept of altering electrode openings to reduce electric field penetration is fairly common, such as using this technique to repress secondary electron emission in vacuum tubes and thyratron switches. However, the application of this technique to increase the gaseous discharge resistance to improve neutron generation is new.

Another improvement to the HPHRGD neutron generator suppresses and removes unwanted electrons from the device for increased neutron production power efficiency. Electron suppression techniques have been employed in detection systems and over-current devices to focus, reflect, inhibit, or minimize particle flow in one direction for improved efficiency. Removing unwanted charged particles in specific regions of the high-pressure high-resistance gaseous discharge can improve the system performance by altering the pressure-distance parameter and constituents of electrical current passing through the gas. Passive (un-powered) charged particle removal techniques employing recombination can also increase the performance of the HPHRGD neutron generator. Applications that employ similar techniques include material electron absorbers in plasma switches, thyratrons, igniters, triodes, and high-intensity plasma lamps. The use of such techniques to increase discharge resistance to improve neutron generation is novel.

The performance of the HPHRGD neutron generator is further improved by utilizing materials that provide specific surface effects, such as increased or reduced secondary electron emission, increased particle reflection and gas absorption on surfaces. Electron emission near an electrode can lead to localized ionization of the background gas, which may be desired in certain areas and undesired in others. Increased gas absorption and particle reflection from electrode surfaces lead to increased ion ejection rates off of those surfaces. Various applications, such as lighting systems, discharge lamps, mutlipactors, and over current-arrestors, use material choice and surface treatments to achieve desired ionization effects and to extend electrode lifetime. The use of surface materials to increase gaseous discharge resistance and enhance neutron generation is a new application.

A comprehensive control system for the HPHRGD neutron generator is desired to regulate all of the system components and monitor parameter conditions. A single package of hardware and/or software is envisioned to integrate the control of the HPHRGD neutron generator with the control of radiation data acquisition systems, data analysis programs, and other industrial process systems. While there are several parameters that can be monitored and/or regulated, this task is within the computational capabilities of existing industrial controllers.

Neutron-Based Applications

There is a plethora of background information in the field of neutron assay and interrogation. Prompt and delayed gamma neutron activation analysis and neutron thermalization analysis techniques date back to the late 1930s. Non-destructive evaluation (NDE) techniques were improved in the 1950s and 1960s when commercial neutron sources became more widespread. FIG. 3 presents generalizations about various neutron material analysis techniques. These analysis techniques can be implemented to utilize the unique properties of the gas-target HPHRGD neutron generator, specifically its neutron generation source geometry.

Prompt Gamma Neutron Analysis (PGNA) is a nuclear technique to determine the presence of chemical elements within a material. Neutrons strike the nuclei of a material and some neutrons are absorbed or deflected, transferring energy to the nuclei. As shown in FIG. 3a, isotopes will promptly emit gamma rays with a characteristic energy that can be used to identify the chemical element (specifically, the isotope). By measuring the energies and the quantities of the gamma rays immediately released, it is possible to determine the amounts of chemical elements within the material. Certain elements will produce prompt gammas with thermal neutrons and others with fast neutrons, each producing a characteristic gamma ray that can be detected. Such measurements can be made in real time, allowing for online industrial process control and rapid element identification and imaging for security or environmental monitoring purposes.

Delayed Gamma Neutron Analysis (DGNA) is quite similar to PGNA. As indicated in FIG. 3b, the key difference is that in DGNA, the nuclei that absorb neutrons become radioactive and emit characteristic gamma rays (or other radiation) over a period of time that corresponds to the activated isotope's decay constant. This time delay could also be used in conjunction with the gamma-ray energy to identify the isotopes that have been activated. Like PGNA, DGNA can be used with neutrons of almost any energy to help determine the chemical composition.

Neutron thermalization analysis is a technique where neutron energy distributions are measured before and after the neutrons pass through a material, as shown in FIGS. 3c, 3d, and 3e. By examining the change in energy as the neutrons pass through material, various material properties can be calculated, such as thermalization lengths, average atomic mass, density, thickness, porosity, hydrogen content, and moisture content. Such measurements can be performed in real time to provide material analysis for industrial process control. This technique requires a source of fast neutrons, such as the gas-target neutron generator, because neutron energy losses are measured to determine the desired material properties.

On-line industrial process control based on material analysis is employed in many applications. X-rays, gamma rays, and lasers are often used to measure thicknesses and densities to maintain quality product control. Infrared light is used to measure the content of moisture and other chemical compounds. Chemical composition can be continuously monitored to sort material based on its content. Material properties can be used to maintain quality control of a product as it is being formed. The described neutron assay techniques can be used independently or in concert to determine material properties needed for industrial process control. Using energy sensitive gamma detectors and coincidence counting methods, it is possible to use DGNA and PGNA to measure the elemental content of a material and its flow rate or velocity. These techniques can be applied effectively using an HPHRGD neutron generator, which provides the added benefits of better geometry, longer life, shorter computation time from increased source strength, safety and portability.

A more specific application of the material analysis techniques is the inspection of closed packages for security at airports and other shipping facilities. Such inspections are commonly made with x-ray imaging, metal detectors, chemical vapor detection equipment, and by dogs trained to find explosives or contraband. By irradiating baggage and cargo with neutrons, the elemental contents of the interrogated item can be determined. The characteristic gamma rays detected by energy-sensitive detectors can indicate the elements that are present, the total amount of each element, and the location of the elements within the closed package. Systems for neutron interrogation of baggage are commercially available, but have not gained widespread acceptance. The gas-target HPHRGD neutron generator can provide neutrons continuously, reliably, and safely.

Environmental analysis applications often employ chemical identification techniques, such as spectral analysis and gas chromatography, to monitor elemental content. Such techniques often require material to be sampled and analyzed at an off-site laboratory. Many environmental applications would benefit from a neutron source that can be operated "in the field" and moved to various locations to make a series of measurements. The in situ measurement of soil properties (such as nutrient content, moisture content, and trace contaminants) can be made with a neutron generator, energy-sensitive gamma detectors, and related equipment on a small trailer towed by a combine or tractor. The same equipment can be placed on an extension boom of a remote-controlled vehicle to safely locate landmines in a minefield. The gas-target HPHRGD neutron generator can generate neutrons over a wide area to provide rapid measurements, and is small and rugged enough to be placed on a cart or other mobile platform for such tasks.

Neutron sources can also be utilized in various medical applications. Medical imaging often involves the detection of x-rays, magnetic resonances, or gamma rays. Another imaging method involves the use of neutron-sensitive drug tracers that produce gamma rays only when bombarded by neutrons. The detection of such gamma rays can be used to determine their point of origin and produce an image of that tissue area. Various forms of radiation have been used in the treatment of diseases, including heat, lasers, x-rays, gamma-ray, and proton beams. Neutrons can also be used to treat cancer, typically in conjunction with elements that readily absorb neutrons to release other forms of radiation, such as alpha particles. Alpha particles can quickly deposit their energy within a biological cell, breaking chemical bonds 31 and destroying that cell's structure, as shown in FIG. 4b. By loading cancerous cells 30 with isotopes that absorb neutrons 28 to emit alphas, such as boron-10 29 (as shown in FIG. 4a), a neutron source can be used to destroy cancerous cells without adversely affecting the surrounding healthy tissue.

Neutron analysis techniques and applications benefit from using gas-target neutron generation. Gas-target sources have advantages over existing sources because they can be installed in existing facilities, and have a consistent output over a long lifetime, allowing for continuous on-line material analysis and process control. The HPHRGD system can be configured in almost any geometry to deliver neutrons to best suit the application or analysis technique. When the gas-target source is not in use, it can be turned off to stop neutron generation and stored safely with little to no radiation shielding.

SUMMARY OF THE INVENTION

The gas-target neutron generator is the subject of this invention, offering superior performance in terms of lifetime with application to on-line analysis, inspection and treatments. The HPHRGD is the preferred embodiment of the gas-target neutron generator because it combines the ion source, acceleration region and the gas-target all in one device. Utilizing a semi-transparent electrode, a high-resistance gaseous discharge can be sustained by ionizations caused predominately by high-energy ions and high-energy charge-exchanged fast-neutral particles, as opposed to electron-impact ionization. To maximize the production of fusion neutrons in this high-resistance discharge mode, several innovations have been made. These innovations include: smaller anode-cathode gap spacing to operate at higher pressures, cathode openings specifically designed to repress electric field penetration, a double-cathode arrangement to collect surplus low-energy charged particles, a baffle system to inhibit excess charged particle production by errant particles, and material selections to provide desired effects on particles at electrode surfaces. The effects of these electron management innovations are to provide greater power efficiency for neutron generation by: reducing the charged particle production rate at unfavorable locations in the discharge, increasing the operating pressure at the same gaseous discharge resistance, and providing a greater number of fusion targets.

The gas-target HPHRDG neutron source has many advantages over conventional neutron generation systems. Unlike radioisotopic sources, there is no emission of radiation from the source while it is not powered, making the storage, transport, and positioning of the device safe for applications that use a neutron source. Because the HPHRGD neutron generator uses a gaseous target for the neutron producing reaction, the target material does not erode or degrade over the operational lifetime of the discharge device like accelerator-solid target systems. Due to the distributed nature of the HPHRGD neutron source, input power greater than what is used in conventional neutron sources can be applied, increasing neutron output. Additionally, the innovation also provides a continuous, volumetric, non-point source emission of the neutrons for nearly uniform irradiation of materials and for real-time neutron analysis techniques. The HPHRGD gas-target neutron generator can be adapted to several geometric configurations, including linear (cylindrical), planar, and annular shapes, to provide various neutron emission profiles, unlike spallation sources. Also unlike spallation sources, the HPHRGD neutron generator can be a small, portable, rugged unit that can be easily transported to a work site, or retrofitted into existing installations. A linear-cylindrical arrangement is preferred because it is easy to manufacture, allows for simple cooling of the device, and its neutron generation zone is more uniform than several point sources, making it ideally suited for many different applications.

Several applications can benefit from the use of the gas-target HPHRGD neutron generator and associated neutron analysis techniques. PGNA, DGNA, and neutron thermalization analysis techniques can be performed in real time to provide on-line measurements of materials in a wide variety of settings. For example, material 12 can pass by the gas-target neutron source 10 and can be analyzed for element content, moisture content, density, thickness, or other properties. The results can be used to adjust an industrial process, such as conveyor belt diversion 18 to send material to a desired location 19, as shown in FIG. 1. Alternatively, closed packages (baggage) 22 can be analyzed to determine their chemical composition and locate the presence of contraband or other dangerous materials 24, as shown in FIG. 2. The HPHRGD neutron source and detection equipment can be mounted on a mobile platform to perform soil analysis or landmine detection in-the-field. Finally, the HPHRGD neutron source can provide neutrons for medical imaging and treatments, such as Boron Neutron Capture Therapy (BNCT). In these applications, the components can be integrated into a single system with a common interface to handle the neutron source operation, detection equipment, neutron analysis techniques, and other associated processes.

The invention contains several innovations, grouped into eleven different areas. The primary area describes the gas-target generator methodology; the next six areas describe innovations of the HPHRGD preferred embodiment of the gas-target neutron generator, while the final four areas are innovations that utilize gas-target neutron generators in a variety of applications.

The underlying technology for this invention is the gas-target neutron generator concept. The gas-target neutron generator basic configuration compromises an ion source, accelerator region and gas target for the production of neutrons from the fusion reaction via deuterium collisions with deuterium (D-D) or collisions between deuterium and tritium (D-T) particles. Ions are formed, directed and impacted into a gas region to generate neutrons. The neutrons then pass through the gas-target device vessel, due to the properties of neutrons, and can be utilized for external processes and analysis. The gas-target innovation allows a long-lifetime accelerator-based neutron generator, with on/off capability, hermetically sealed vessel, increased safety and electronic radiation control, desirable for portable neutron sources.

The methodology for the gas-target generator allows the use of conventional ion sources, such as duoplasmatrons, Penning sources and RF exciters, and conventional acceleration methods, such as electrostatic and magnetic. However, gas-target devices have limitations to operation based on the target density for neutron power production efficiency. This invention contains an electron management system that allows gas-target neutron generator operation at high gas-target densities for higher neutron production efficiency by minimizing electron power losses, electron generation in unfavorable locations, and removing surplus charged particle production. As a result, the gas-target neutron generator becomes a viable candidate for many neutron generator applications.

The first area of innovation is a single-cathode HPHRGD neutron generator. This area contains many subsections; the first describes the means to produce a high-pressure high-resistance gaseous discharge. In the simplest embodiment, the device contains a semi-transparent cathode electrode located within an evacuated chamber (which can serve as the anode electrode) back-filled with a small quantity of gas. The electrodes are spaced in a manner to provide strong electric fields to partially ionize the gas and accelerate ions toward the semi-transparent cathode. While traversing the device, high-energy ions can undergo charge-exchange collisions with the background gas, producing fast neutral particles. Both types of particles are able to pass through the openings in the electrode and reach other discharge regions. The fast neutral particles can cause ionizations along their path length, especially near the chamber wall where quantities of background gas can be present at the anode surface. Electrons accelerated by the large electric potential gain too much energy to cause significant charged particle production. The result of these effects is a high-resistance discharge primarily sustained by the collisions of ions and fast neutral particles with the background fill gas, as opposed to electron collisions with the gas. This is important because more energy is supplied to the ions and fast neutral particles than can be attained through electron-dominated discharges, allowing for greater overall efficiency in generating high-energy ions and neutral particles.

As described above, when a collisional gaseous discharge is operated at high-voltage with deuterium gas, deuterium ions are accelerated to high energy. Collisions between a fast-moving deuterium particles and background deuterium gas can result in nuclear fusion, producing a 2.45 MeV neutron from about half of all D-D fusion events. It is important to note that the fusion cross section is very small compared to atomic collision processes, such as ionization and charge-exchange. The HPHRGD gas-target neutron generator operates on the principle of increasing the number of "by-product" fusion reactions by increasing the number of atomic-scale collisions. Additionally, a deuterium and tritium gas mixture can be used, producing a 14.1 MeV neutron every time the two isotopes fuse. The importance of using a gaseous discharge to produce neutrons is that the gas itself is the fusion target. This leads to a long operating lifetime, which is an improvement over solid target neutron generators, whose targets can degrade after hours of strenuous use. Also, the collisional gaseous fusion mono-energetic neutron source has benefits over isotopic sources with "dirty" neutron emission spectra, and simple on/off operation to generate neutrons only when they are needed, for added safety.

In addition, there is the ability to fashion the gas-target HPHRGD device into different geometries to create different neutron source profiles. In a long, cylindrical discharge device, a linear-cylindrical neutron generating volume is formed, which provides a nearly uniform flux along the cylinder's length. A short cylindrical discharge system or a planar discharge system will produce a disk or rectangular neutron generating volume, providing a uniform neutron flux across a flat surface. A toroidal or annular discharge system will produce a doughnut-shaped neutron-generating region, which can surround an object and irradiate it with great intensity. This innovation area is significant because it provides neutron generators of different geometries, which can increase the efficacy of many neutron applications.

Other sub-components complete the description of the basic HPHRGD neutron generator. The gas injection and regulation system for the neutron generator can include a flow control system, or a getter system, which is preferred for use in hermetically-sealed systems. The external surface of the device is optimized through the addition of cooling fins and/or coolant channels, which remove heat to allow the generator to operate at a greater input power level and thus produce more fusion neutrons. The control system for the HPHRGD neutron generator can be automated to control the various power supplies and pressure regulation equipment for the neutron source. The control system can also be further integrated with the radiation detection analysis and industrial process control systems to be used in many neutron applications with minimal operator involvement.

The second innovation area is the electron suppression and collection system for improved neutron generation power efficiency in the gas-target HPHRGD device. This innovation implements a double cathode arrangement to remove electrons from the intra-cathode region before they can escape to the anode. The cathode assembly consists of the inner leeching electrode, which attracts low-energy electrons from within the cathode assembly, and the outer suppressor electrode, which suppresses low-energy electron motion out toward the anode. Both leeching and suppressor electrodes are semi-transparent with openings aligned so that there are paths through the cathode assembly for high-energy ions and fast neutrals to sustain the high-resistance gaseous discharge. By actively biasing the suppressor electrode at a different potential than the leeching electrode, the electric potentials in the leeching-suppressor gap can inhibit the motion of electrons toward the anode. When the bias difference is sufficient, low-energy electron escape paths to the anode can be completely closed off. This establishes an intra-leeching region potential that is more negative than the leeching electrode. As a result, electrons from the central region are drawn into the leeching electrode and extracted with a lower power loss (lower electric potential), instead of being drawn toward the anode at a greater power loss (greater electric potential). Another version of this innovation utilizes an un-biased, or floating, leeching electrode. In this case, electrons collide with the inner electrode due to their greater mobility, charging it more negative than the average local potential. The floating leeching electrode attracts low energy ions and provides sites for electron-ion recombination, thus removing low-energy ions from the central region as well as electrons. In both the biased and un-biased leeching electrode cases, the removal of the charged particles further increases the effective resistance of the gaseous discharge, allowing for a higher operating pressure and/or longer intra-cathode path lengths to maintain an equivalent impact-ionization rate to maintain the discharge. The reduced electron losses, higher-pressure operation, and longer particle path lengths result in improved neutron generating efficiency of the HPHRGD neutron generator. A unique, floating power supply arrangement for the double cathode HPHRGD neutron generator is also described.

The third innovation area is the means to repress secondary electron production from the cathode surface within the HPHRGD neutron generator. As particles pass through the cathode region, they ionize background gas, generating low-energy ion and electron pairs. Also, high-energy ions that undergo charge exchange collisions in the intra-cathode region will leave behind low-energy ions. The low-energy ions, regardless of how they are produced, will be attracted toward the cathode, and the potential difference between the electrode and where the ions are formed determines the energy with which these ions strike the cathode surface. The semi-transparent nature of the electrode openings allows high-energy particles to pass through the electrode, and also allows the electric field from the anode-cathode gap to penetrate into the cathode region, producing a potential difference in the intra-cathode region. The electric potential inside the cathode region is affected by altering the size, shape, and number of the electrode openings. By reducing this potential difference, the low-energy ions generated in the intra-cathode region will have less energy when impacting the electrode surface. In general, lower energy ions will release fewer secondary electrons when striking an electrode surface. The openings of the semi-transparent electrodes should be optimized to minimize secondary electron production while allowing sufficient high-energy particles to pass through the intra-cathode region. By repressing the production of secondary electrons in this manner, less electrical power will be devoted toward accelerating electrons, providing more power to the ions and fast neutrals. Electron repression increases the effective resistance of the gaseous discharge, which allows for the increase in the size of the intra-cathode region, and hence allows increases in the high-energy particle path length, rate of high-energy charge-exchange collisions, and total high-energy particle production rate. Not only does this further enforce the ion and fast neutral dominance of the gaseous discharge, but it also increases the fusion neutron yield without increasing the overall power supplied to the system.

The fourth innovation area is the implementation of a baffling system inside the cathode region of the HPHRGD neutron generator to intercept particles that do not travel in the preferred direction for the electrode geometry. This system inhibits charged particle generation within the intra-cathode region, which would lead to low-resistance discharge operation. The baffle system can be an independent electrode, electrically attached to the leeching electrode, or electrically attached to the cathode of a single-cathode HPHRGD neutron source. If the baffles are attached to either a powered or floating leeching electrode, the baffles act as an extension of the leeching electrode decreasing the path length particles have to traverse before reaching an electrode. As a separate electrode, the baffle system can take the place of the leeching electrode in a powered or floating (un-powered) capacity. Additionally, a floating baffle system can be used in conjunction with the powered leeching and suppressor electrodes to provide a negative potential to draw low-energy ions from the discharge at a very low energy to further inhibit charged particle generation. The baffle system innovation provides means to remove unwanted particles from the discharge and, in some configurations, without consuming electrical power. This leads to a further increase of the discharge resistance, which allows higher operating pressures or increased cathode diameters to maintain an equivalent current, increasing the neutron generating efficiency of the HPHRGD neutron source.

The fifth area of innovation lies in the choice of electrode and structural materials for the optimization of the gas-target HPHRGD neutron generator. Each component of the neutron generator has different material properties that affect performance and neutron yield. By decreasing processes that lead to electron generation at the cathode surfaces and other unfavorable locations, the neutron generating power efficiency can be increased. Likewise, by increasing ion production at the anode surfaces or other beneficial heavy-particle effects, the neutron generating power efficiency can also be increased. The anode electrode, usually the vacuum chamber, can consist of a material that readily absorbs deuterium and/or tritium gas on its surface. This material can also allow fast-neutrals and particles to reflect off the anode with a high-degree of surface ionization to increase the source of ions at the edge of the device. The cathode surfaces (including suppressor, leeching, and baffle electrodes) should be made of a low secondary-electron emitting material. If passive electrodes are implemented, their surfaces can have improved surface attachment sites for ion-electron recombination and should also resist secondary electron emission from heavy particle impacts. By implementing the proper materials, the gaseous discharge can be operated at a higher pressure or with longer path lengths to provide an equivalent current. As a result, the neutron generation rate can be increased without increasing the power supplied to the system, thus optimizing the HPHRGD neutron generator.

The sixth area of innovation is the physical optimization of the electrode gap spacing for improving neutron emission from the HPHRGD gas-target neutron generator with the implementation of the innovations in the first five innovation areas. The preceding improvements effectively increased the discharge resistance by minimizing the fraction of current carried by electrons and promoting current carried by less mobile heavy particles. To maintain the equivalent voltage and current from unimproved systems, the discharge conductance is to be increased by providing more targets for ionizing collisions. This can be accomplished by increasing the operating pressure, providing a longer path for high-energy heavy particles, or a combination of both. This is represented graphically in FIG. 5 by shifting the operating voltage vs. pressure times distance (P-d) curve up and to the right. Because the pressure-times-distance parameter is nearly constant for a gaseous discharge at a particular voltage, the operating gas pressure for a particular voltage will be larger in a system with a smaller anode-cathode gap distance. Likewise, if the anode size remains unchanged, decreasing the anode-cathode gap distance will increase the size of the intra-cathode region, providing longer paths for high-energy heavy particles. Both single cathode and double cathode sizes can be designed to take advantage of the benefits of electron repression, baffles, and material selection to provide systems that operate at higher pressures and provide longer heavy-particle path length. By operating with increased pressure and longer path lengths, the number of fusion collisions is increased. These electron management optimizations result in increased neutron generation per unit of input power, which makes the HPHRGD neutron generator commercially attractive.

Many applications can benefit from the advantages of the gas-target neutron generator, such as the HPHRGD preferred embodiment. Four specific applications have been identified and are detailed in this invention.

The first application area of innovation is the use of a gas-target neutron generator to measure material properties with various neutron analysis techniques and to use that data to control an industrial process. The HPHRGD gas-target neutron generator is used to irradiate industrial material to measure certain material properties in real-time, such as: elemental composition, density, moisture-content, thickness, porosity, and flow rate. An accurate online measurement of such material properties allows a responsive control system to monitor and maintain the quality of material being processed. The control system for the neutron generator is integrated with the radiation detection and analysis system, and the industrial process controller to provide a common interface to handle all operational aspects of the process control system. The utilization of the HPHRGD neutron source in an integrated industrial process control has the benefit of a configurable neutron emission profile for the effective irradiation of the material to provide a more accurate measurement than existing point-source neutron irradiating systems provide. The HPHRGD system is inherently safe due to its hermetically sealed design and on/off switching capability. It has increased neutron source lifetime with constant output due to its gaseous fusion target that does not erode. Its simple design and semi-portable size lead to lower system costs, higher reliability, and easier integration into industrial settings compared to other neutron sources.

The second application area of innovation is the use of the gas-target neutron generator in a security inspection system. Individual items, such as packages or baggage, are analyzed for elemental content by irradiating them with a HPHRGD neutron source to detect chemicals found in contraband or explosives. Three-dimensional imaging and concentration analysis can provide superior measurements to locate dangerous materials that have been camouflaged or separated. The key components of the inspection security system with the HPHRGD neutron generator are an array of energy-sensitive gamma-ray detectors, a data acquisition and analysis system, and a loading mechanism to position items near the neutron source and detection array. The array of gamma detectors and data acquisition system can determine which chemicals are present, the amounts of each chemical present, and where within the item certain chemicals are located. A cylindrical or planar HPHRGD neutron generator can be used to provide a wide and uniform region of neutron flux to interrogate items, reliably over a long lifetime and safely with on/off switching. A common interface is used to control the HPHRGD neutron generator, detection equipment, and hazardous material analysis system to provide simple and effective item interrogation while minimizing false positive alarms. These components compromise a low-cost security inspection system that can be widely used to prevent terrorism and other illegal or dangerous activities.

The third application area is related to the use of the gas-target neutron generator with its associated improvements to the state of the art to environmental scanning and analysis. Similar to security interrogation, environmental analysis is a subset of neutron-based interrogation for a specific application area. In this application, remote monitoring and mobile scanning processes with a HPHRGD neutron generator and detection diagnostics provide continuous scanning of effluent streams for the detection of pollutants and waste products. There is also emphasis for the creation of a mobile neutron analysis system for remote and in-the-field inspection of soil, including potential landmine fields, farmland, superfund sites, and aquifers. Specific applications include the identification of hidden underground explosives, such as anti-personnel, anti-tank landmines and unexploded ordinance providing substantial innovation over conventional de-mining detection systems; and agricultural soil quality analysis to provide specific data, such as nitrogen concentration, for determining specific amounts of fertilizer to minimize costs and runoff. In the preferred embodiment, the long cylindrical HPHRGD neutron generator configuration provides a near-uniform linear source for superior sweeping width across terrain.

The fourth application area applies the state-of-the-art improvements in gas-target neutron generation to two medical categories: imaging and treatment. In the subset of medical imaging, neutron analysis techniques provide diagnostic imaging, including Single Photon Emission Computed Tomography (SPECT), without the use of radioactive tracer compounds. Harmless non-radioactive tracer compounds are taken into the body and subsequently located and imaged via PGNA, DGNA and/or SPECT systems. This bimodal imaging allows the utilization of a greater number of biological compounds, for improved analysis capability. In the subset of medical treatment, neutrons can be directed to interact with materials present within the patient for a desired treatment effect. A specific application is BNCT, where neutrons, from the HPHRGD advanced source, are directed to interact with a drug compound containing the element boron present significantly within the patient's cancer cells. The neutron interaction with the boron releases high-energy particles with a range limited to approximately one cell diameter, effectively destroying the cancerous tissue without harming normal healthy cells in close proximity. BNCT is a bimodal therapy in which only the combination of the neutrons and boron will cause significant damage to local tissue; either independently will cause little harm. The HPHRGD neutron generator technology improves the state-of-the-art in medical treatment, in addition to the aforementioned gas-target advantages, the capability of small size and minimal support infrastructure to retrofit existing hospital radiotherapy centers without substantial capital improvements, and the capability to provide whole-body treatment with different geometrical source distributions.

BRIEF DESCRIPTIONS OF THE DRAWINGS

FIG. 3 contains informational diagrams about material analysis techniques that use neutrons, including (a) PGNA, (b) DGNA, and (c, d, e) neutron thermalization analysis.

Figure 4A:
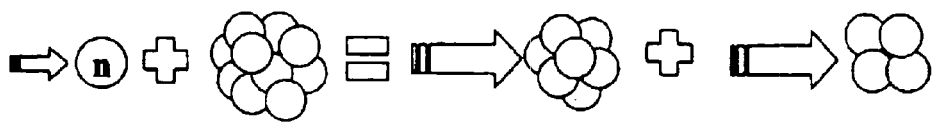
Figure 4B:
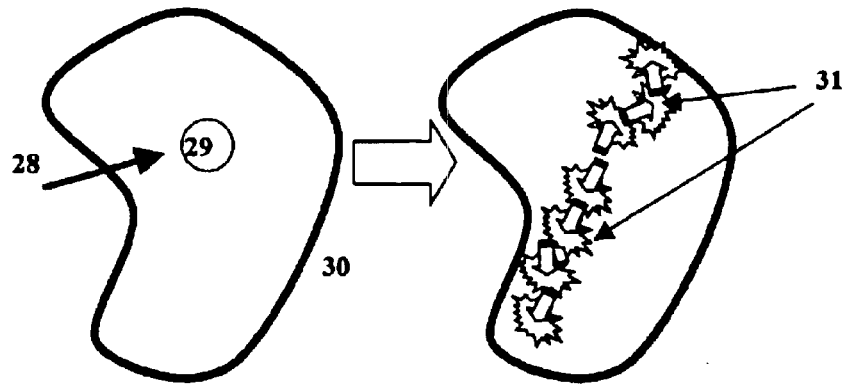

FIG. 4 contains informational diagrams about BNCT, specifically (a) the neutron reaction with boron-10 and (b) the resulting collisions that can destroy a cancerous cell.

Figure 5:
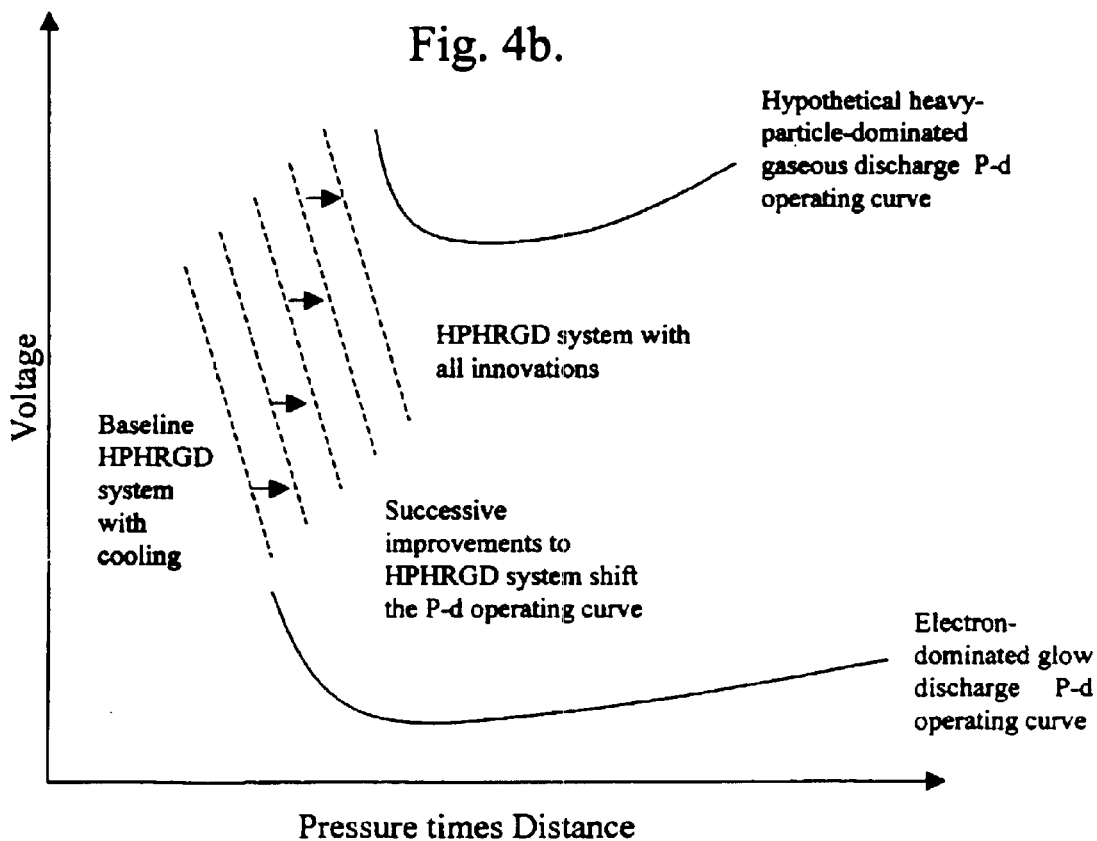

FIG. 5 is a diagram depicting operating voltage vs. P-d curve shifts resulting from improvements to the HPHRGD neutron generator, as well as curves for typical gaseous discharges and heavy-particle dominated discharges.

Figure 6:
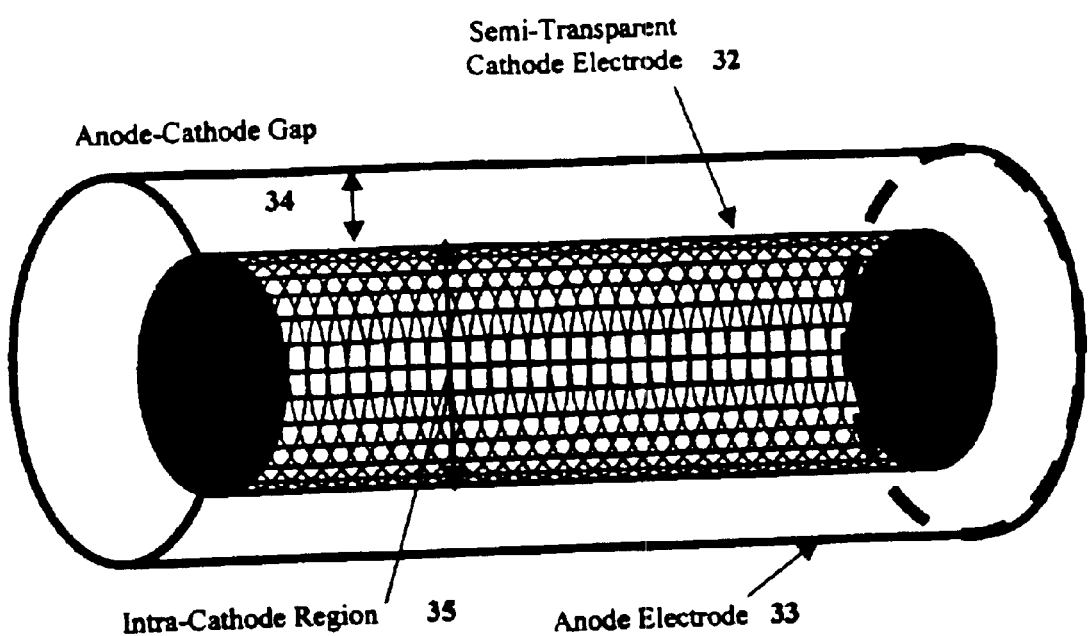

FIG. 6 is a drawing of the anode and cathode of the single-cathode HPHRGD device.

Figure 7:
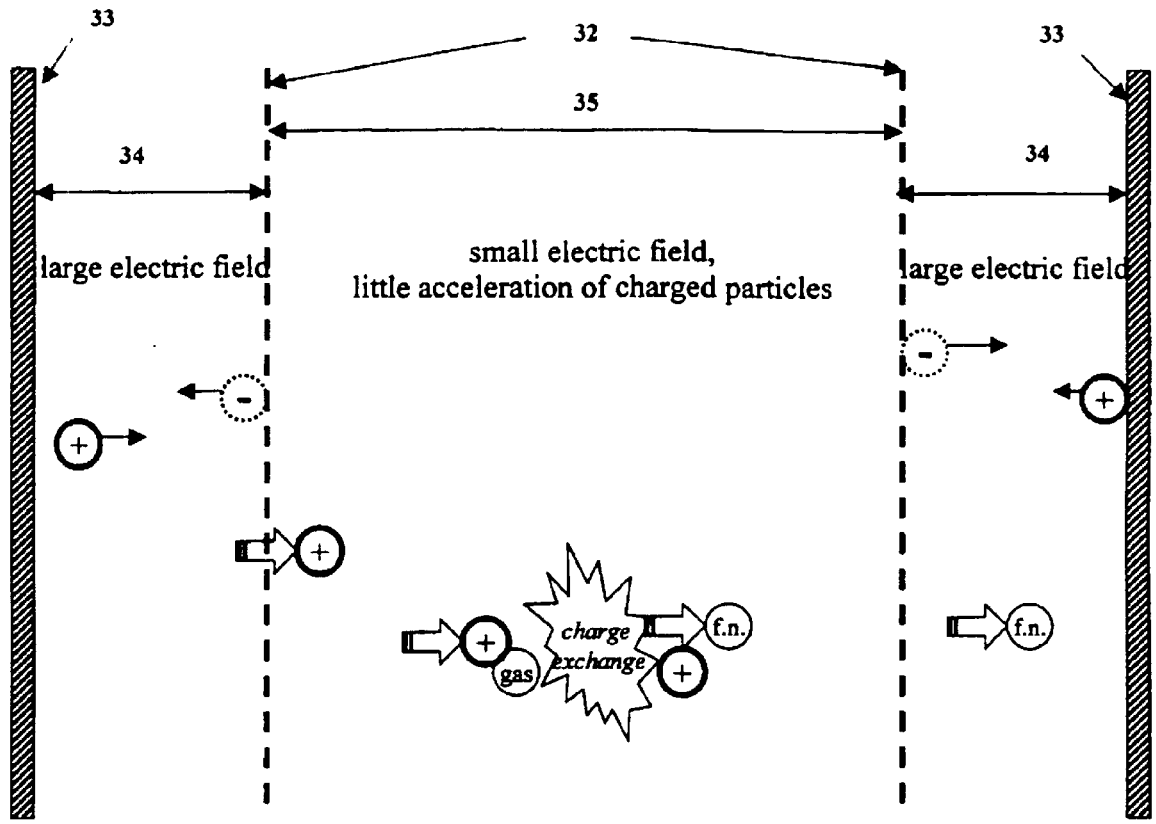

FIG. 7 is a simplified diagram that depicts basic particle motion within the high-pressure high-resistance gaseous discharge device.

Figure 8:
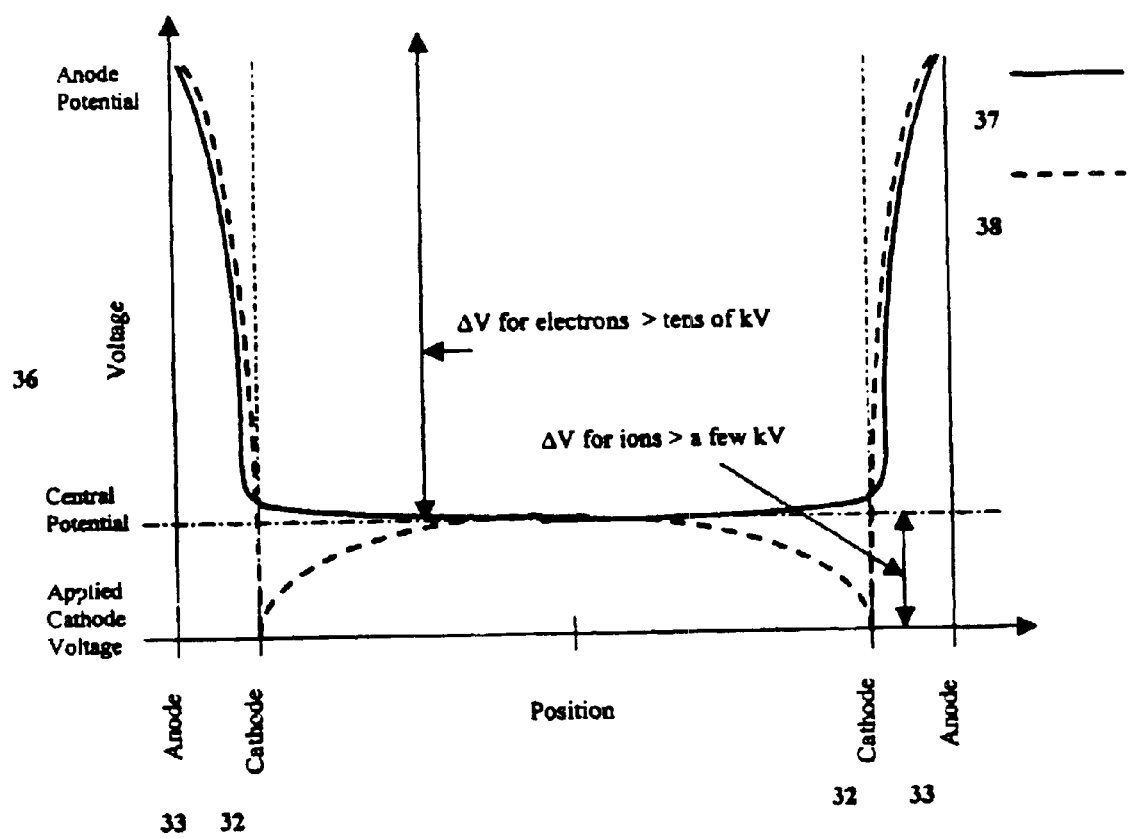

FIG. 8 is a generalized electric potential diagram of the basic HPHRGD device (not to scale) showing high-voltage acceleration regions for charged particles to gain energy.

Figure 9:
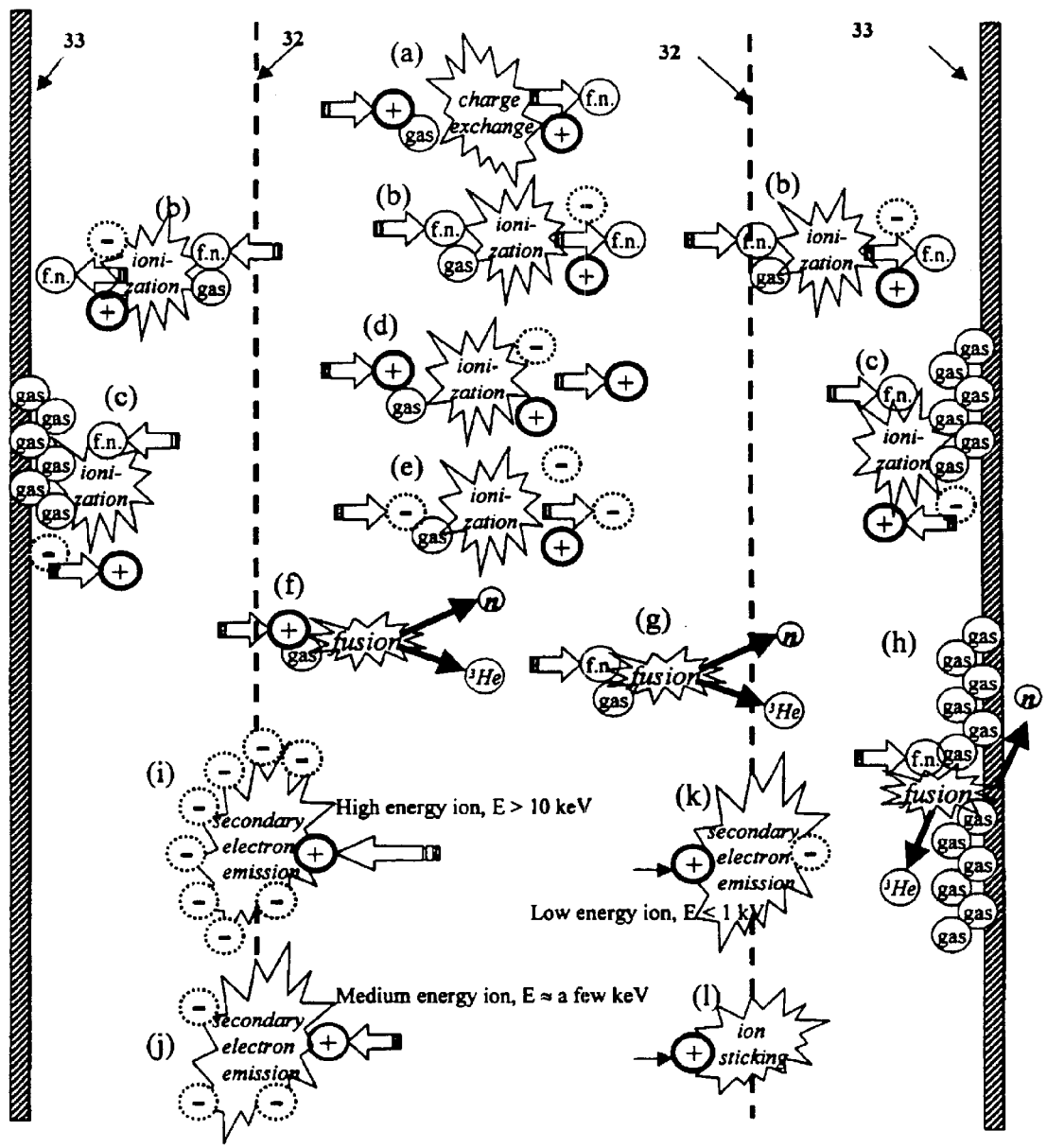

FIG. 9 is a simplified diagram showing twelve different particle collisions within the high-pressure high-resistance neutron generator.

FIG. 10 depicts five of the many possible HPHRGD geometries: (a) long cylindrical (linear), (b) short cylindrical (disc), (c) rectangular prism (planar), (d) annular, and (e) toroidal, and the preferred direction of particle motion in each geometry.

Figure 11:
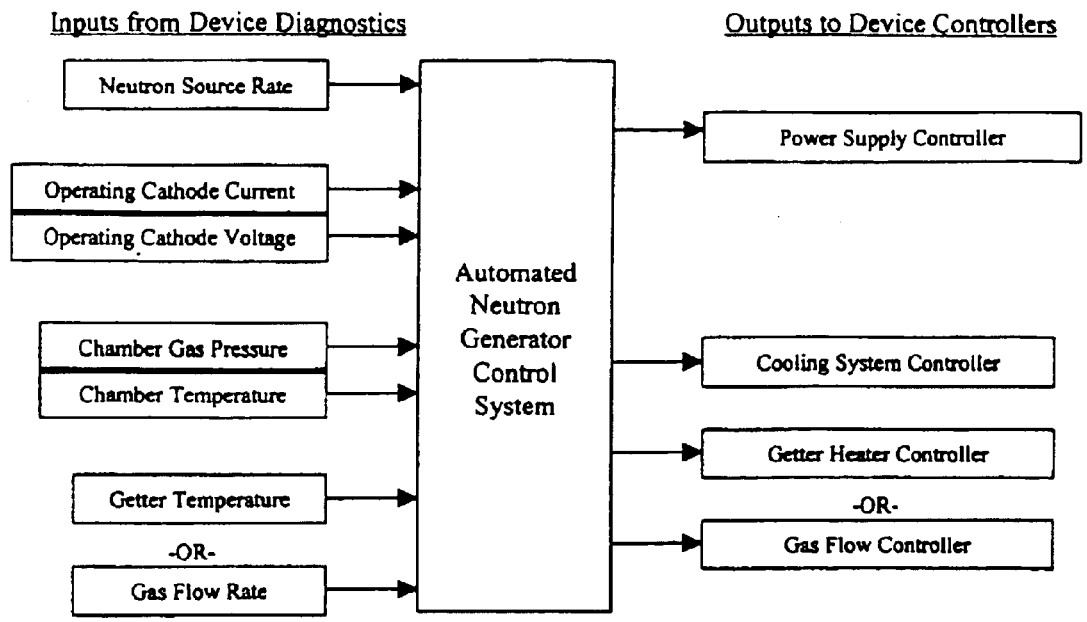

FIG. 11 is a sample illustration of the many inputs and outputs desired for a control system to operate the high-pressure high-resistance gaseous discharge neutron generator.

Figure 12:
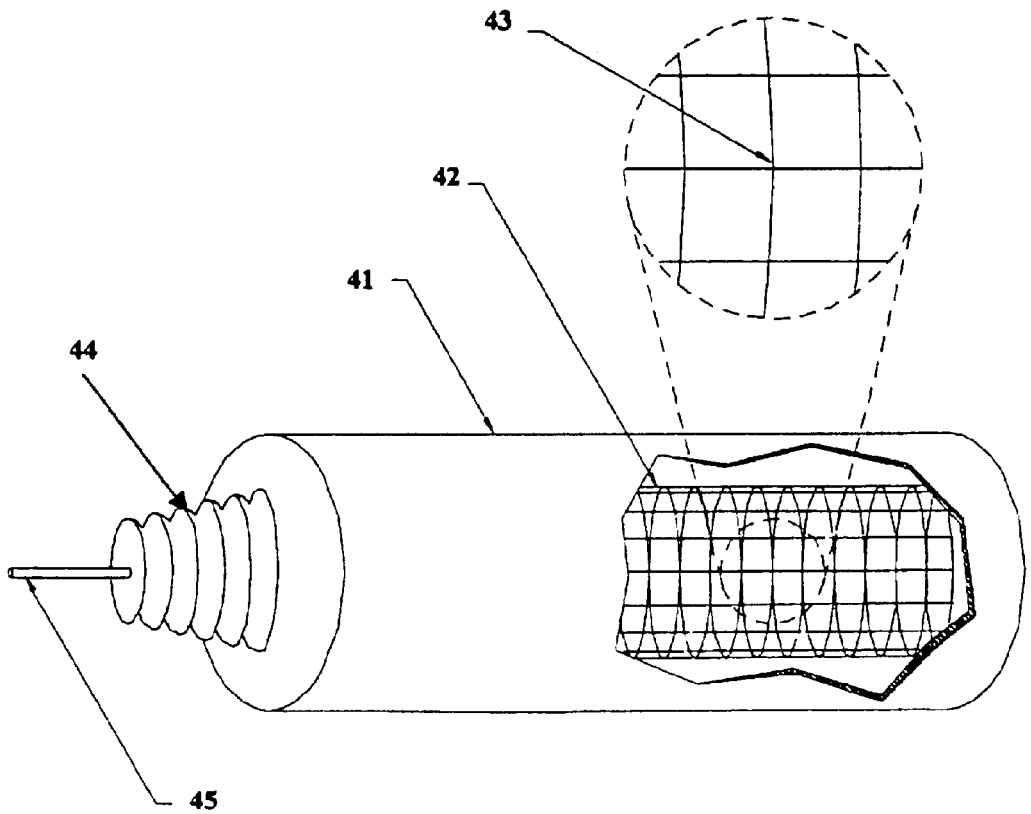

FIG. 12 is a drawing of the basic HPHRGD neutron generator with a single, wire-frame cathode.

Figure 13:
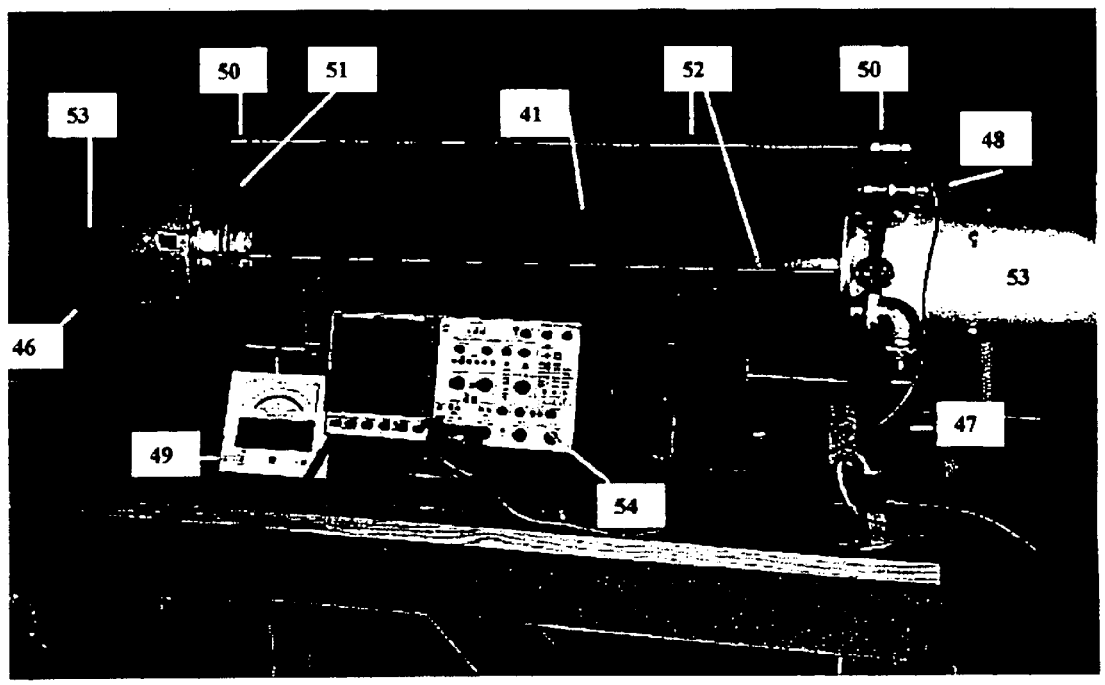

FIG. 13 shows a photograph of the reduction to practice of the HPHRGD neutron generator.

Figure 14:
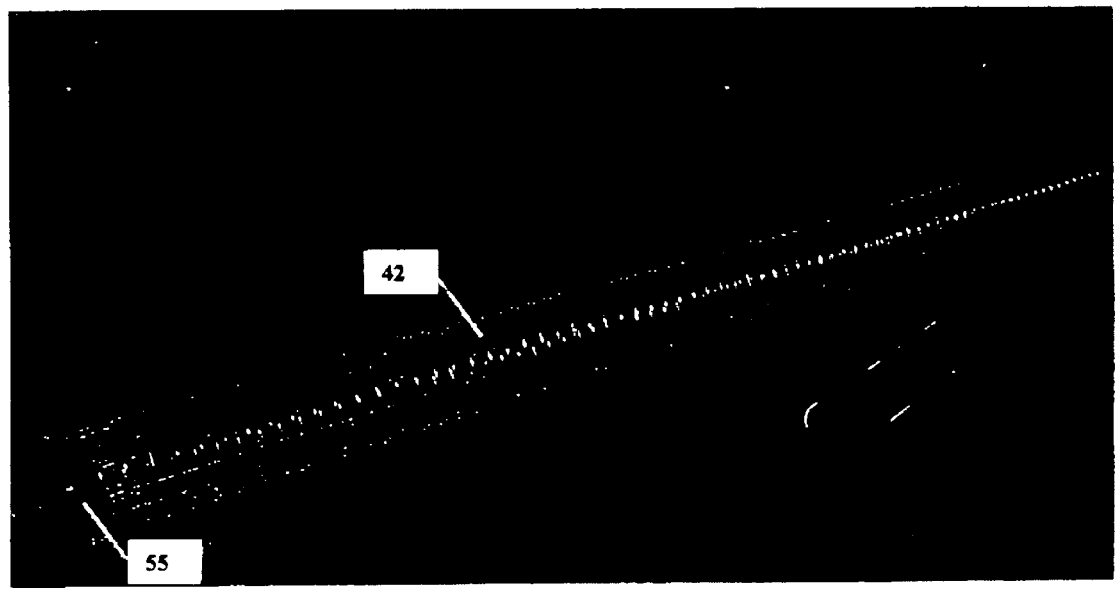

FIG. 14 shows a photograph of the reduction to practice of the wire-frame cathode electrode used in the HPHRGD neutron generator.

Figure 15:

FIG. 15 shows a photograph of the high-pressure high-resistance gaseous discharge operating with a single wire-frame cathode.

Figure 16:
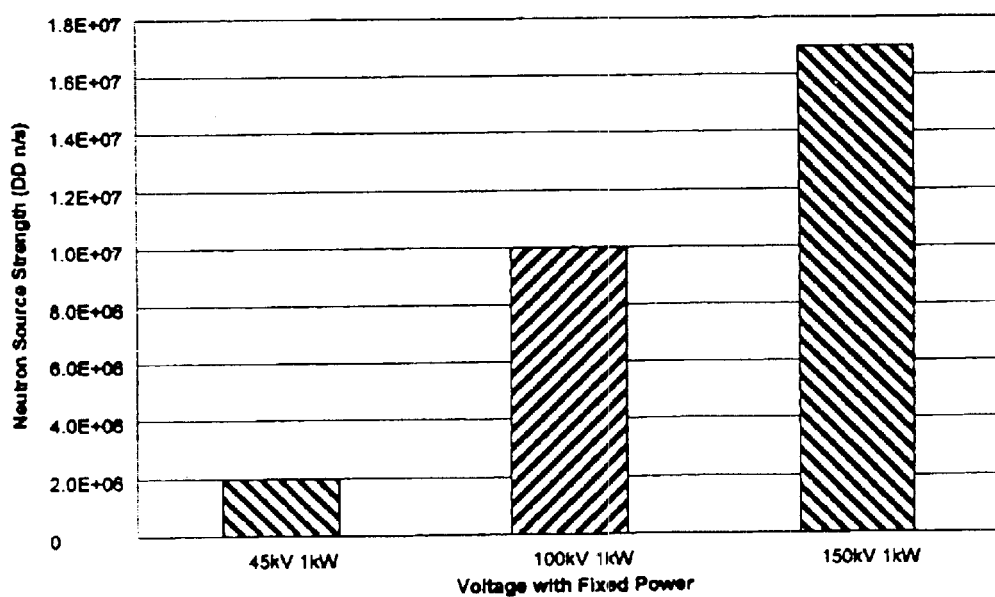

FIG. 16 is a plot of estimated neutron yield for the basic HPHRGD neutron generator during preliminary reduction to practice runs.

Figure 17:
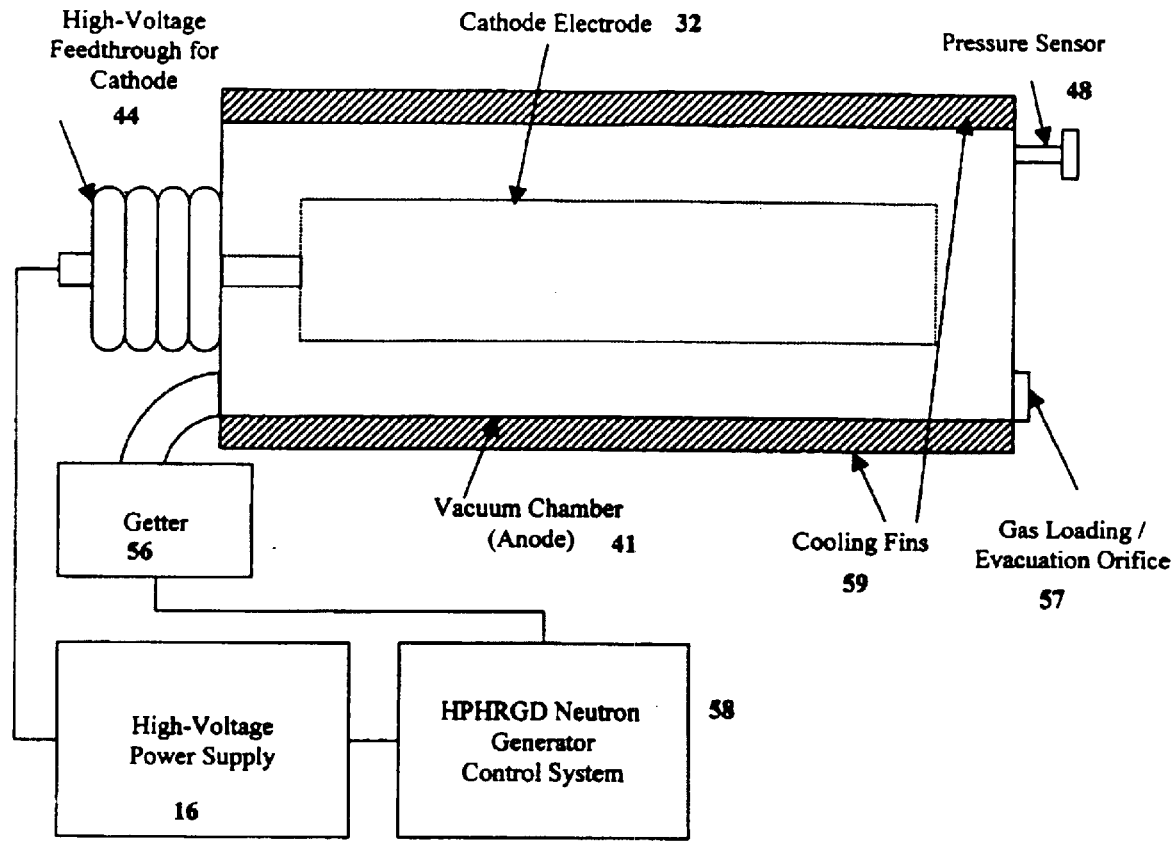

FIG. 17 is a drawing of the preferred embodiment of a single-cathode HPHRGD neutron generator.

Figure 18:
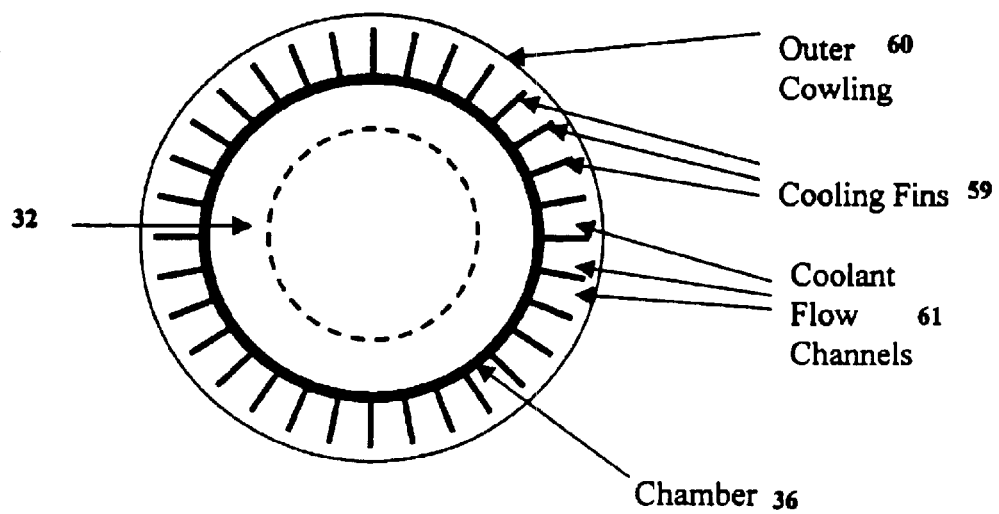

FIG. 18 is an end-view drawing of the preferred embodiment of the single-cathode HPHRGD neutron generator.

Figure 19:
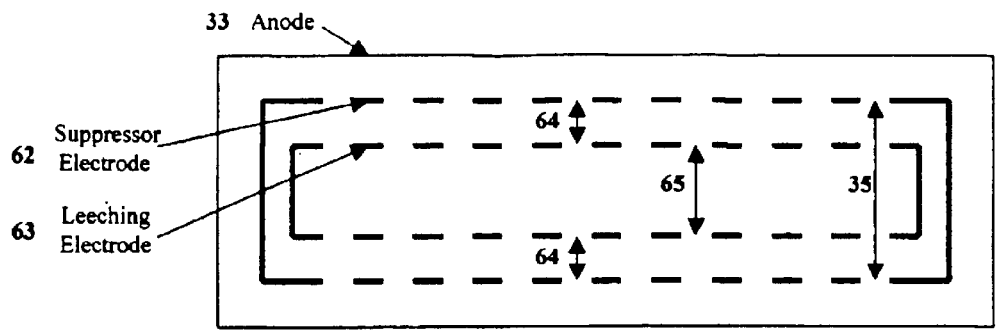

FIG. 19 is a diagram of the leeching electrode and a repression-style suppressor electrode for the double-cathode HPHRGD neutron generator.

Figure 20:
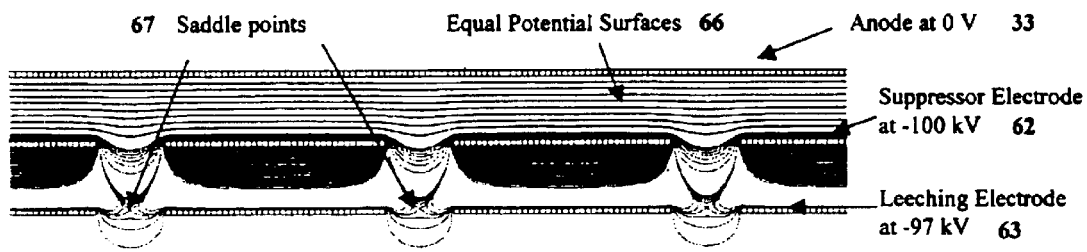

FIG. 20 is a close-up view of the sample vacuum electric potential diagram showing the saddle points between the leeching and suppressor electrode to drive low-energy electrons into the leeching electrode.

Figure 21:
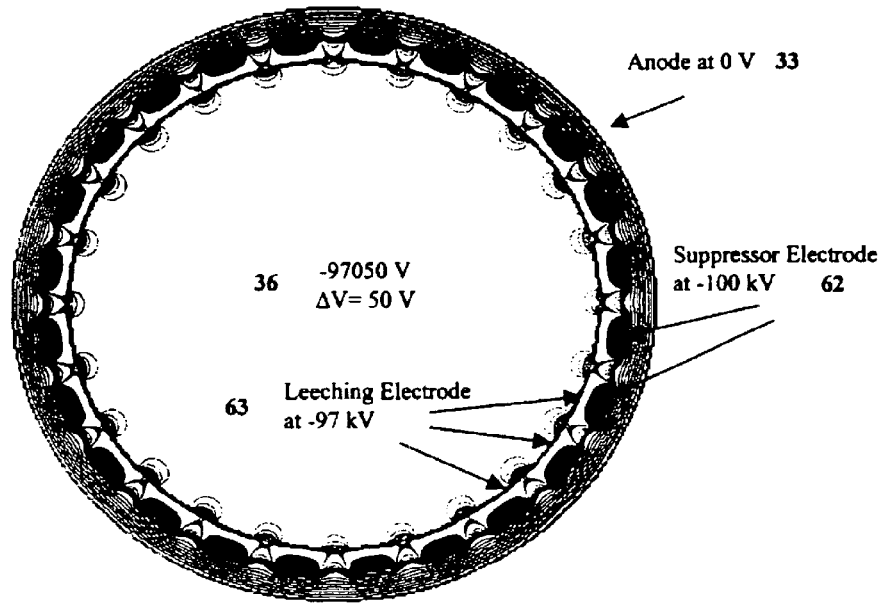

FIG. 21 is an end view of the sample vacuum electric potential diagram of the double-cathode HPHRGD neutron generator with a leeching electrode and suppressor electrode demonstrating a central potential more negative than the leeching electrode.

Figure 22:
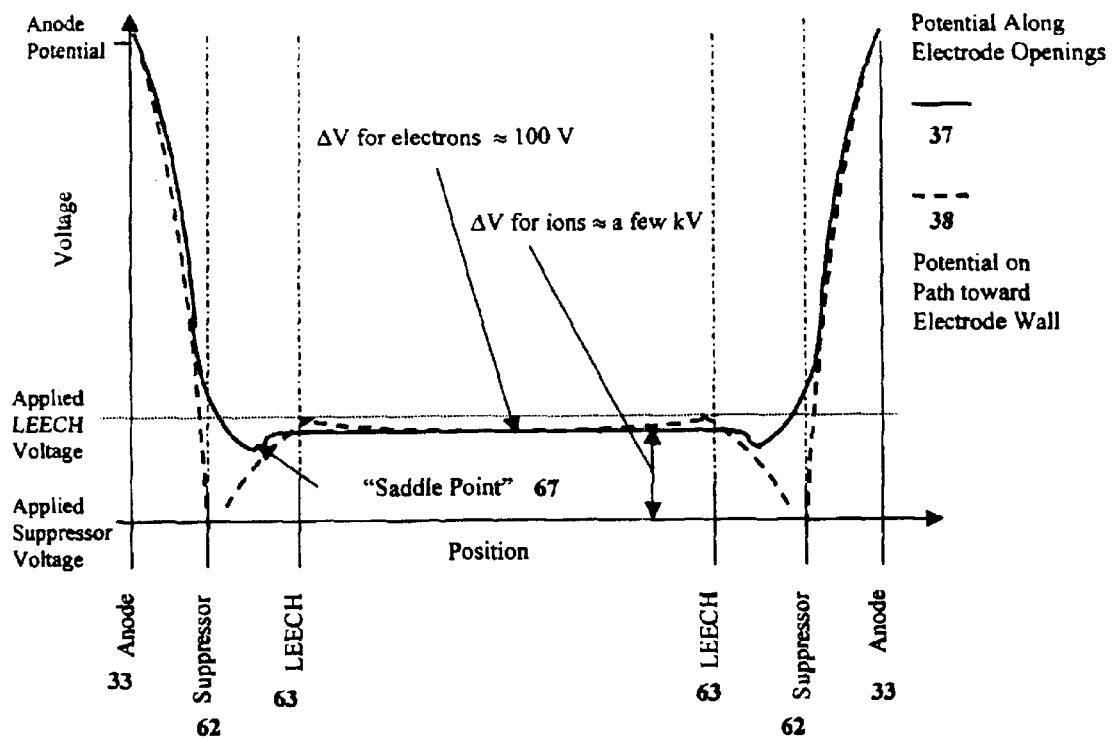

FIG. 22 is a sample electric potential diagram of the double-cathode HPHRGD neutron generator with a leeching electrode and suppressor electrode, indicating the voltage potential differences that ions and electrons experience (not to scale).

Figure 23:
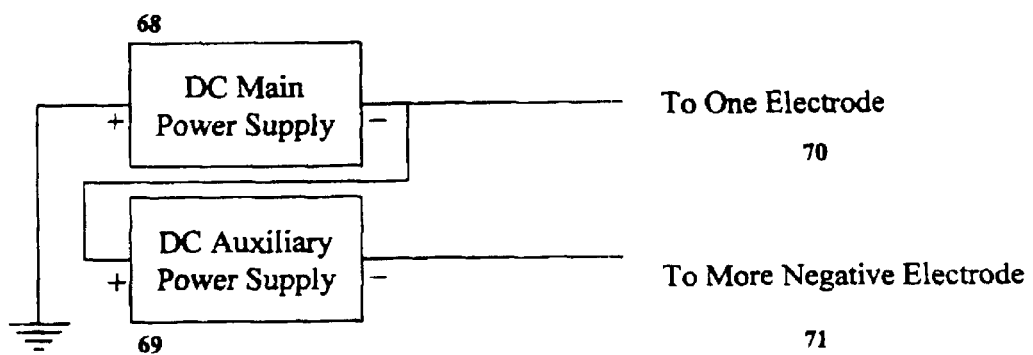

FIG. 23 shows an ideal circuit diagram for a "floating" power supply arrangement that could be used to supply voltage and current to the leeching and suppressor electrodes in the HPHRGD neutron generator.

Figure 24:
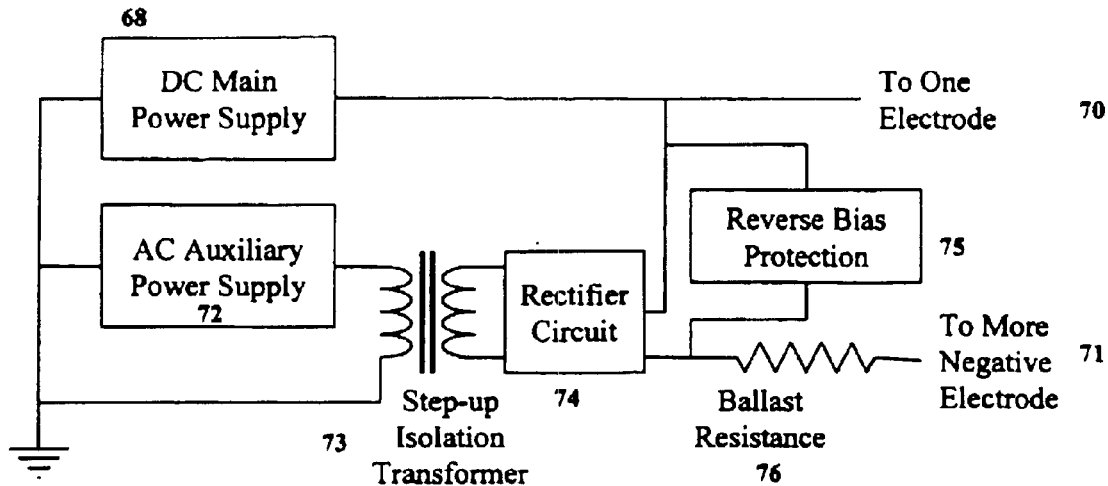
Figure 25:
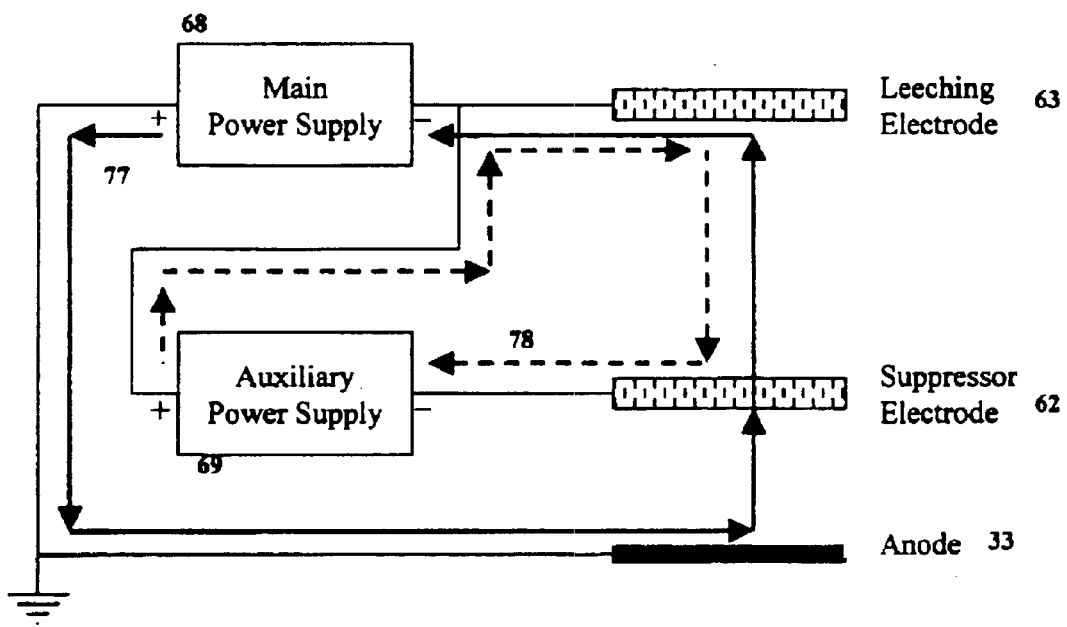

FIG. 24 shows a simplified diagram of the "floating" power supply arrangement to supply power for the leeching and suppressor electrodes used in the reduction to practice of the double-cathode HPHRGD neutron generator FIG. 25 shows a current flow diagram for the ideal "floating" power supply arrangement for the HPHRGD neutron generator.

Figure 26:
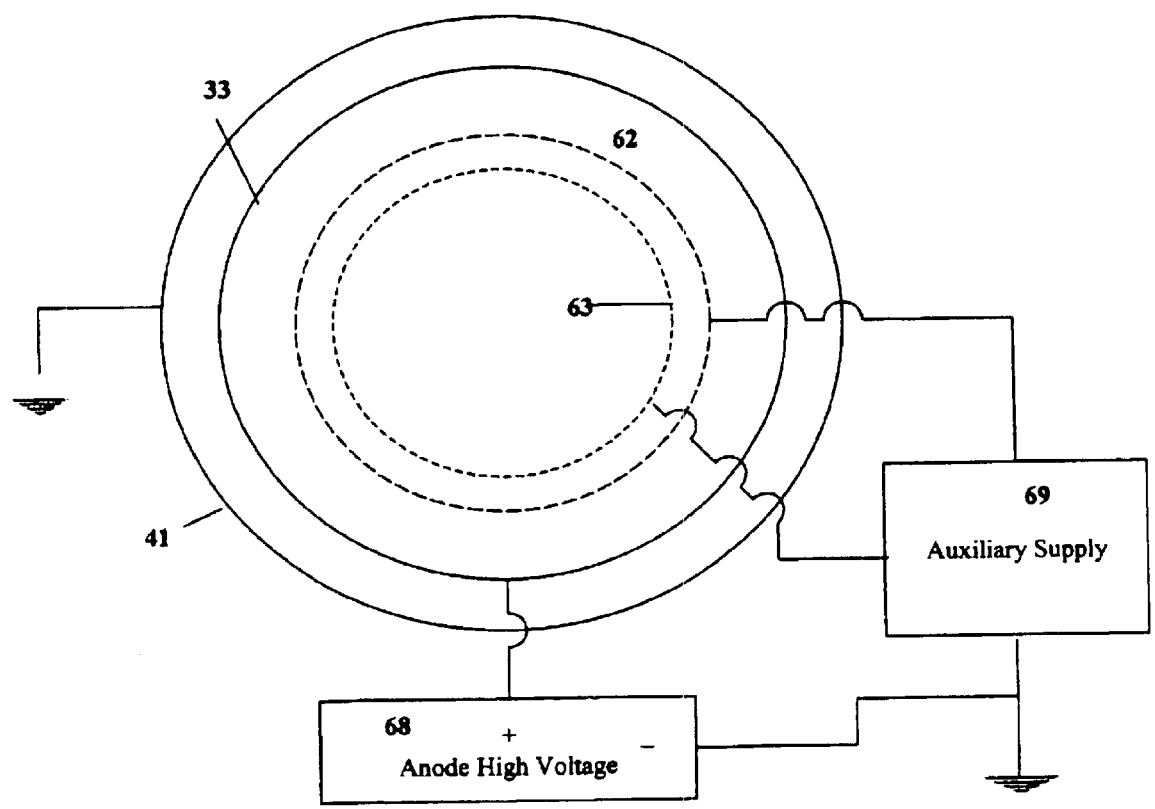

FIG. 26 shows a simplified circuit arrangement for a positively biased anode and a negatively biased suppressor electrode in the double-cathode HPHRGD neutron generator.

FIG. 27 is a drawing of the (a) double-cathode HPHRGD neutron generator, showing close-up views of (b) the suppressor electrode connection and (c) the leeching electrode connection.

Figure 28:
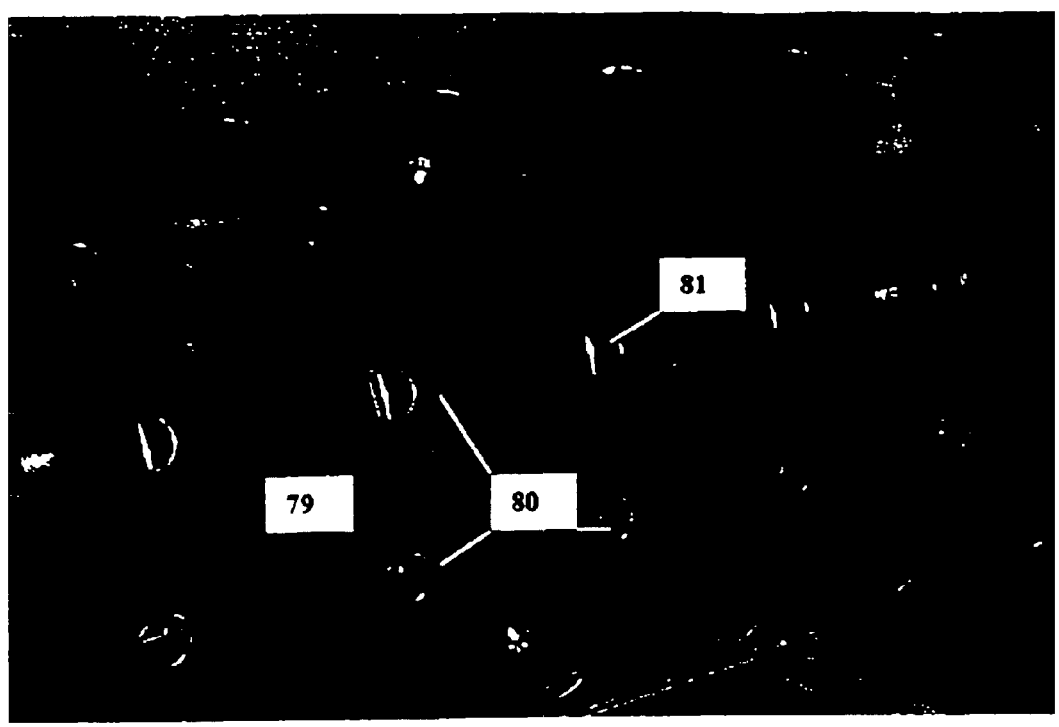

FIG. 28 shows a photograph of the reduction to practice of the leeching and suppressor electrode arrangement.

Figure 29:
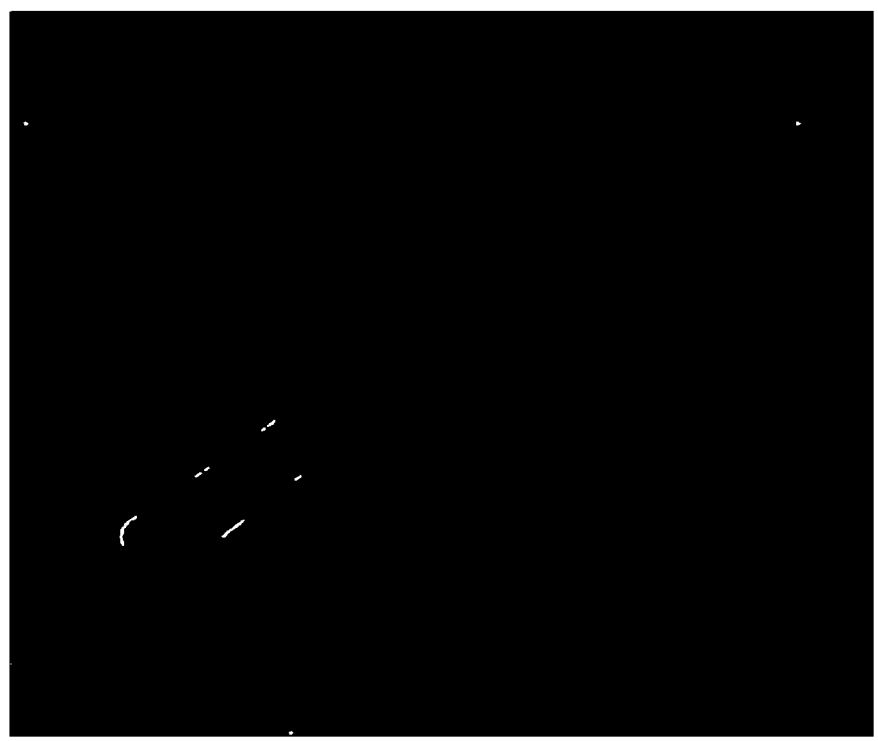

FIG. 29 shows a operational photograph of the double-cathode HPHRGD showing the leeching and suppressor electrode arrangement.

FIG. 30 shows four sample vacuum electric potential diagrams of single-cathode HPHRGD neutron generators that illustrate the effects of electrode geometry on intra-cathode potentials.

Figure 31:
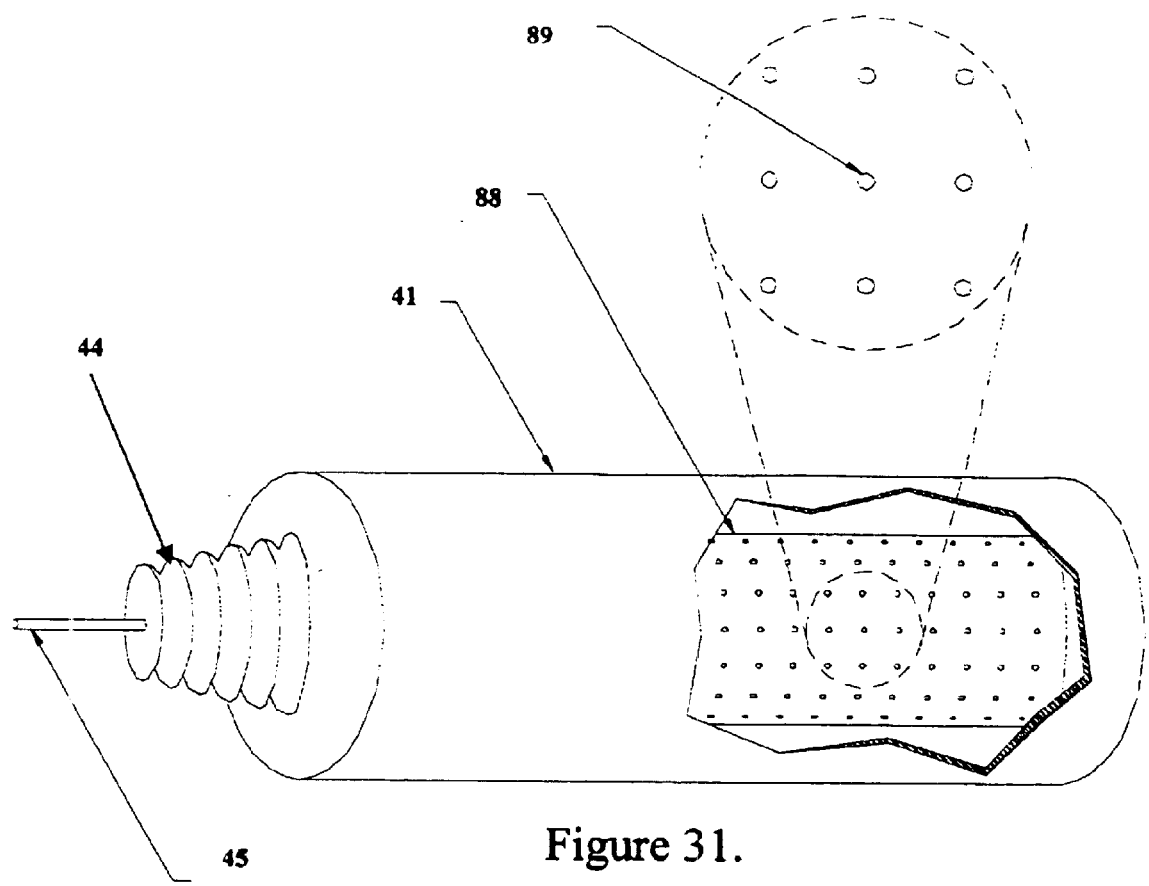

FIG. 31 is a drawing of a single-cathode HPHRGD neutron generator with a repression-style cathode electrode.

Figure 32:
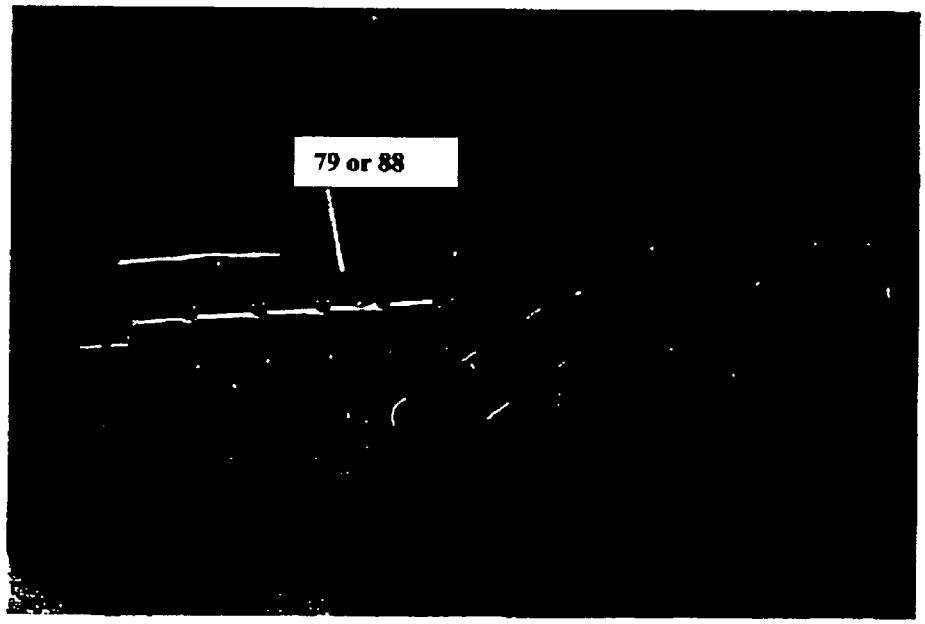

FIG. 32 shows a photograph of the reduction to practice of a repression-style cathode electrode.

FIG. 33 is a simplified diagram representing intra-cathode particle motion and collisions in an HPHRGD neutron generator (a) without baffle inhibitors and (b) with baffle inhibitors.

Figure 34A:
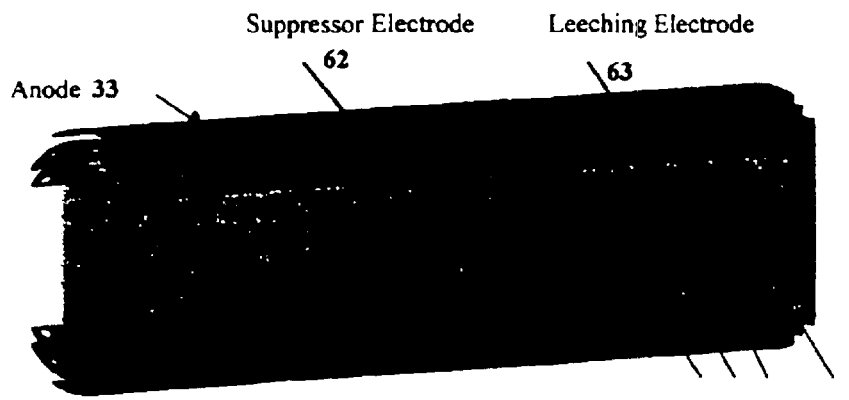
Figure 34B:
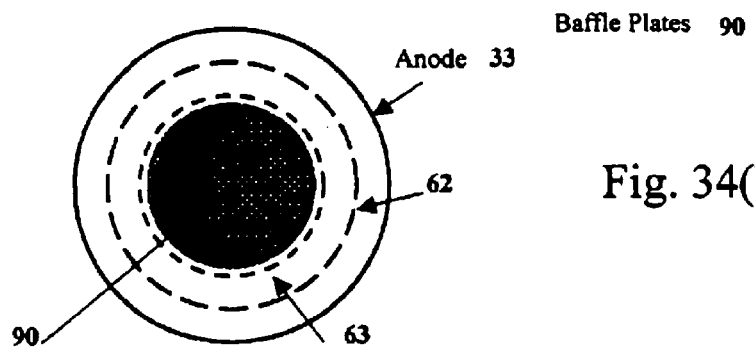

FIG. 34 shows (a) a cut-away view of the HPHRGD neutron generator with leeching electrode, suppressor electrode and baffle plates attached to the leeching electrode and (b) an end view.

Figure 35A:
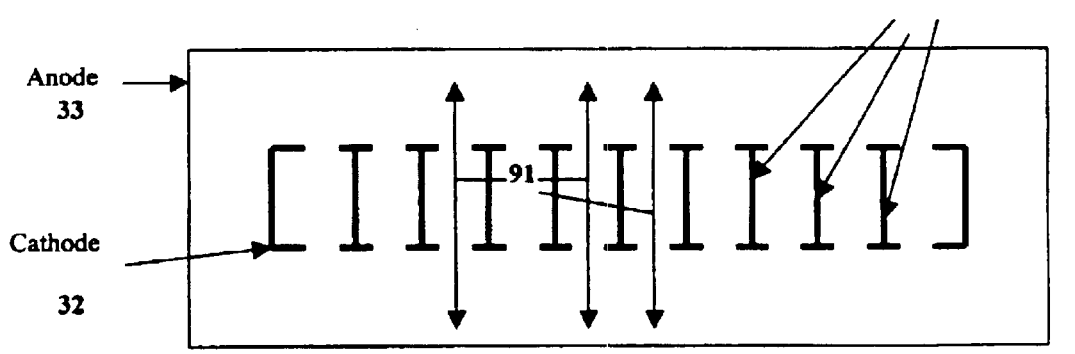
Figure 35B:
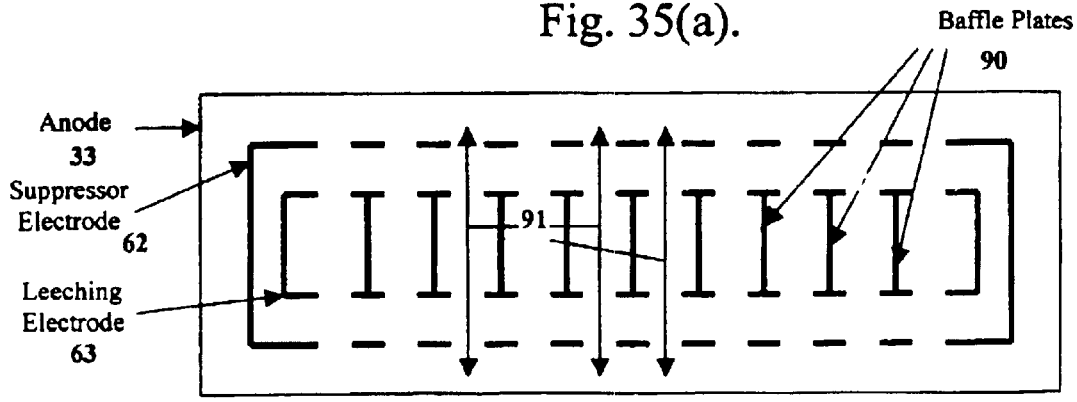

FIG. 35($a$) is a cross-sectional view of a single-cathode configuration with baffles, showing direct paths for particles to travel across the device, and ($b$) is another view of the HPHRGD neutron generator with leeching electrode, suppressor electrode and baffle plates, and showing direct paths for particles to travel across the device.

Figure 36:
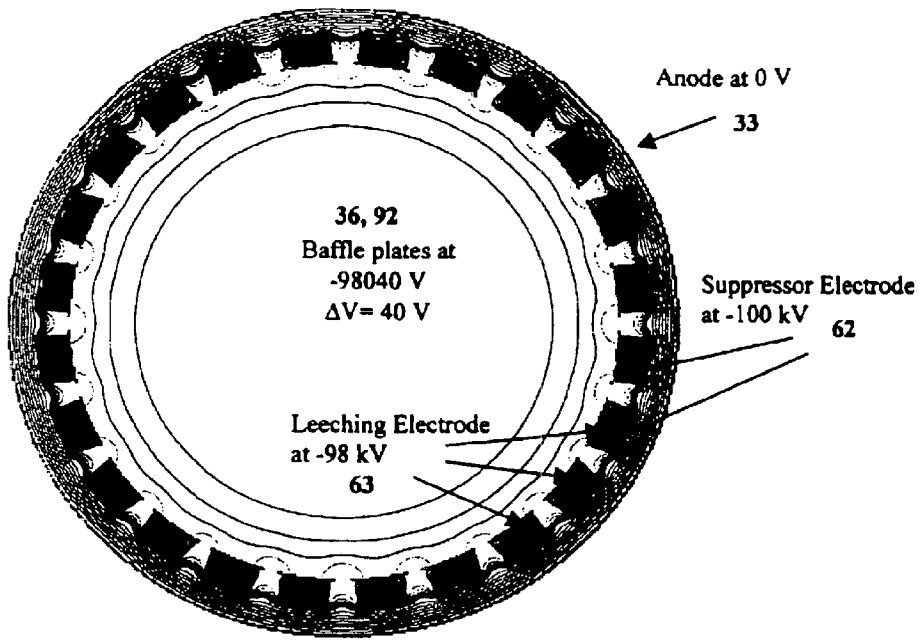

FIG. 36 is a sample vacuum electric potential diagram of the HPHRGD neutron generator with a leeching electrode, suppressor electrode and floating baffle system.

Figure 37:
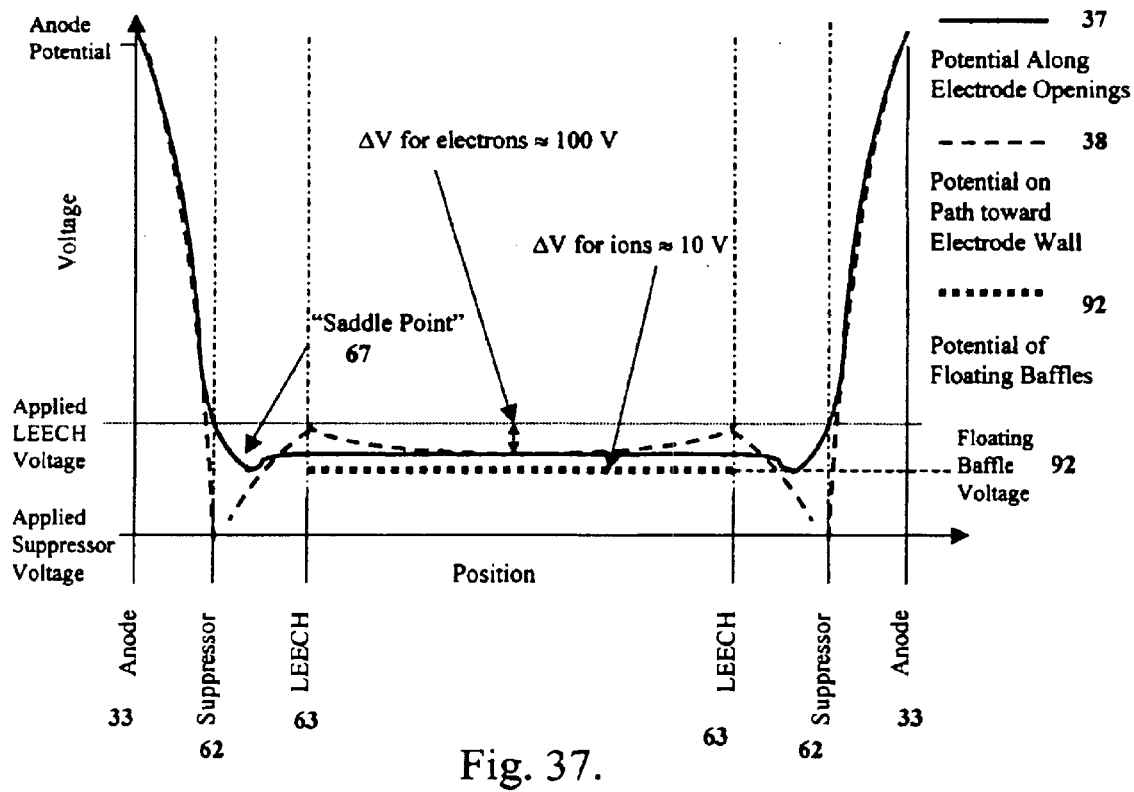

FIG. 37 is a sample electric potential diagram of a double-cathode HPHRGD neutron generator with a leeching electrode, suppressor electrode, and floating baffle system indicating the voltage potential differences that ions and electrons experience (not to scale).

Figure 38:
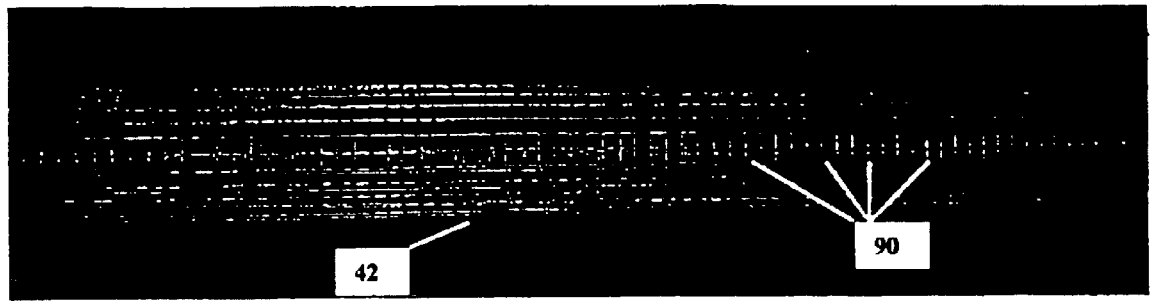

FIG. 38 shows a photograph of the reduction to practice of baffle inhibitors in a cathode assembly.

Figure 39:
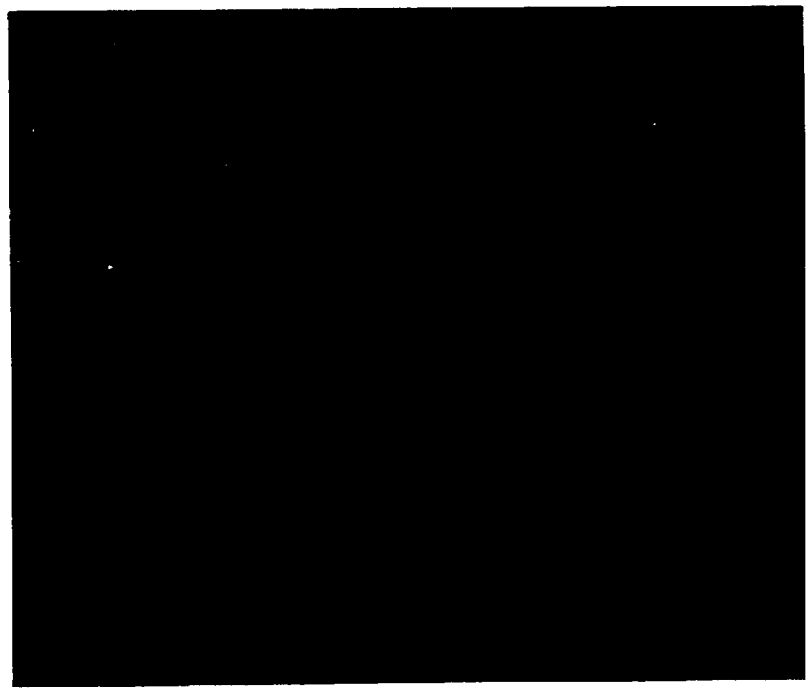

FIG. 39 shows a photograph of the HPHRGD operating with baffle inhibitors in the cathode.

Figure 40:
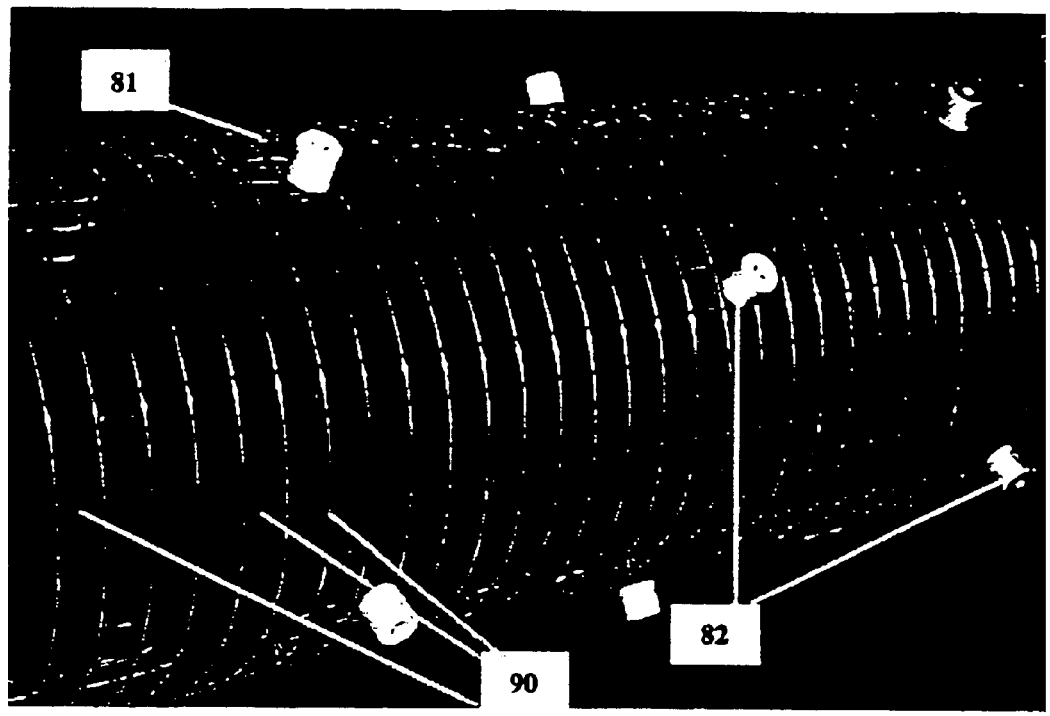

FIG. 40 shows a photograph of the leeching electrode with baffle inhibitors used in the reduction to practice of optimizing a HPHRGD neutron generator.

Figure 41:
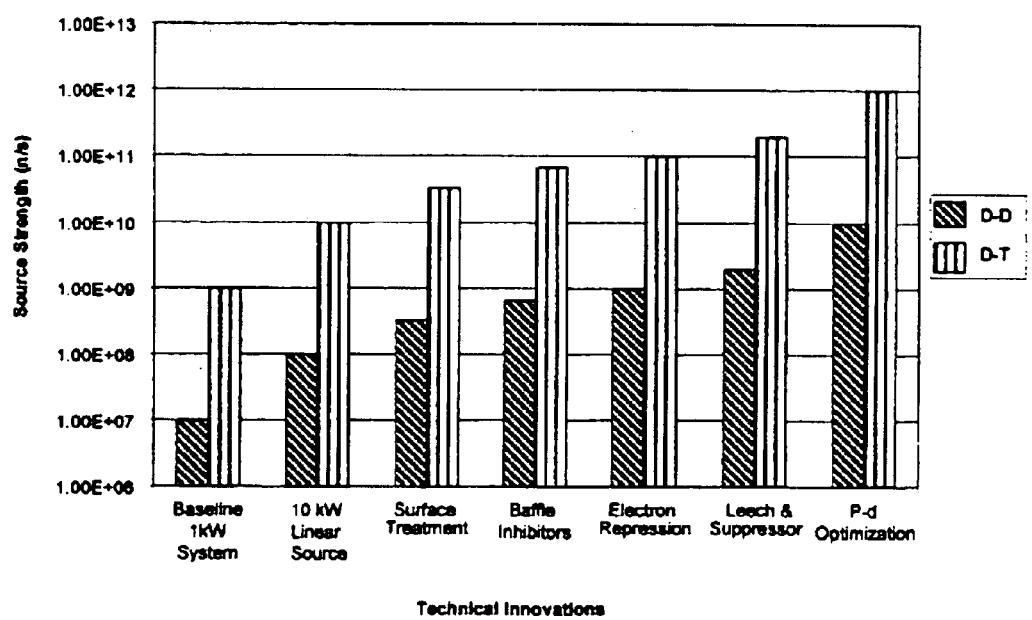

FIG. 41 shows a bar graph representing predicted neutron yields for a sample HPHRGD neutron generator using various combinations of innovations.

Figure 42:
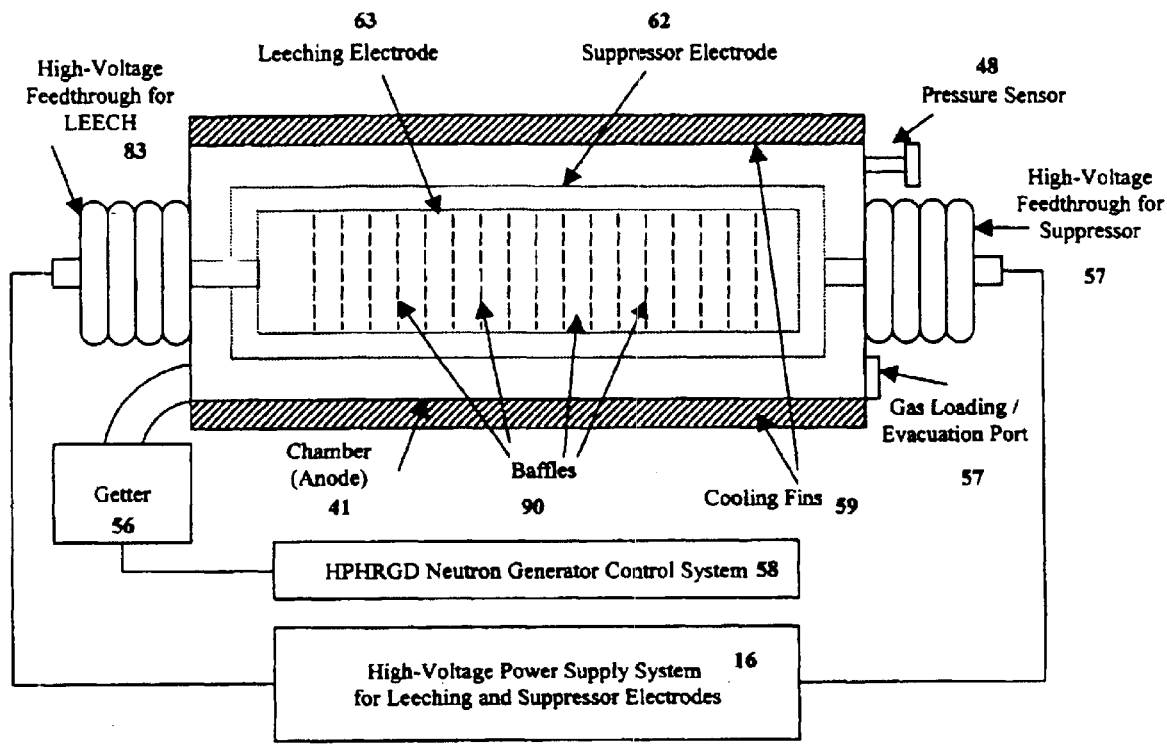

FIG. 42 is a drawing of the preferred embodiment of the double-cathode HPHRGD neutron generator with electron management, including leeching electrode, suppressor, baffle inhibitors, getter, and insulators.

Figure 43:
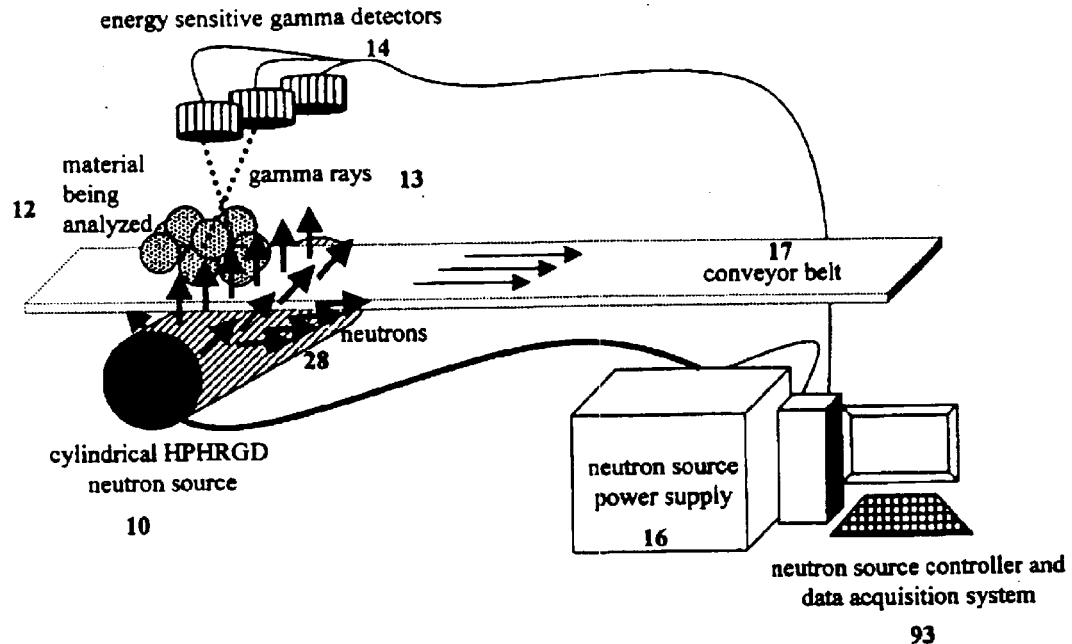

FIG. 43 is a sample illustration of a non-destructive evaluation (NDE) system using a long cylindrical HPHRGD neutron generator to analyze material passing on a conveyor belt.

Figure 44:
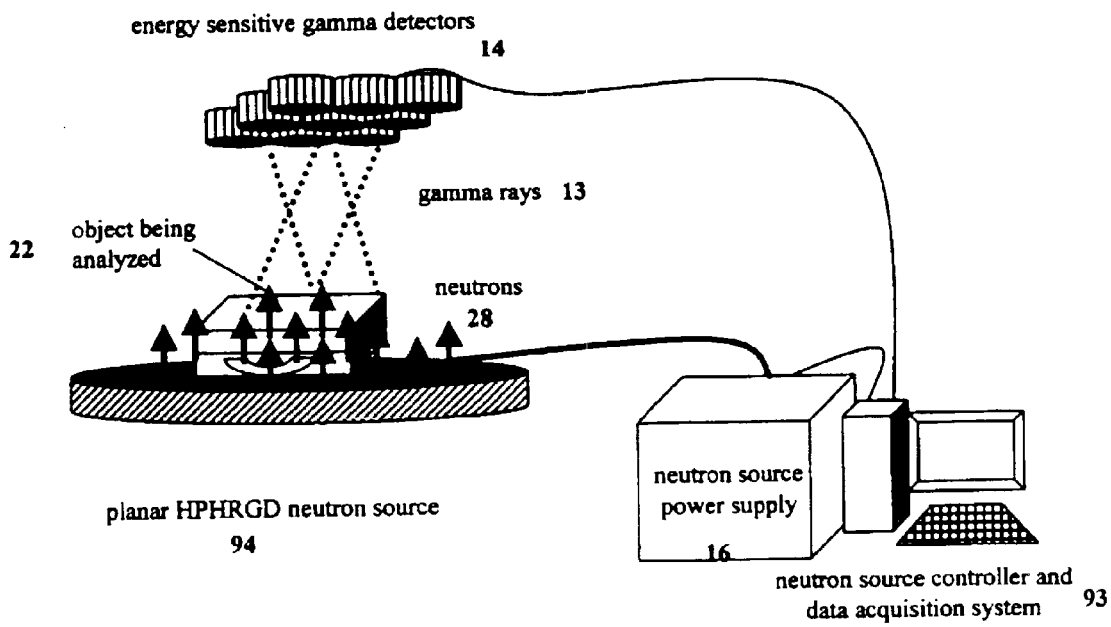

FIG. 44 is a sample illustration of an NDE system using a short cylindrical HPHRGD neutron generator to analyze stationary material.

Figure 45:
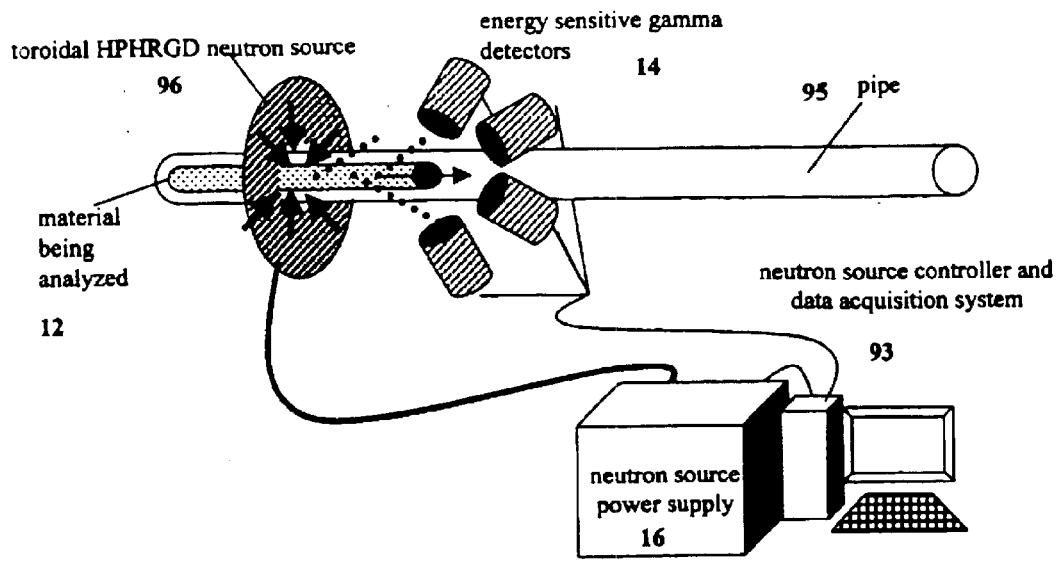

FIG. 45 is a sample illustration of an NDE system using a toroidal HPHRGD neutron generator to analyze material passing through a pipe.

Figure 46:
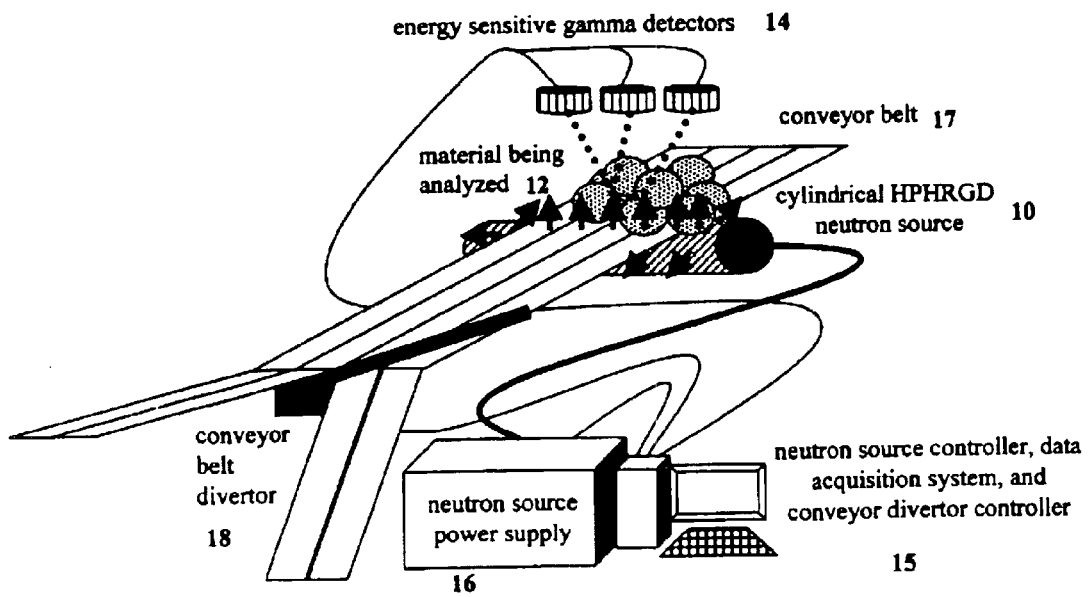

FIG. 46 is a sample illustration of an integrated material analysis and sorting system using a long cylindrical HPHRGD neutron generator.

Figure 47:
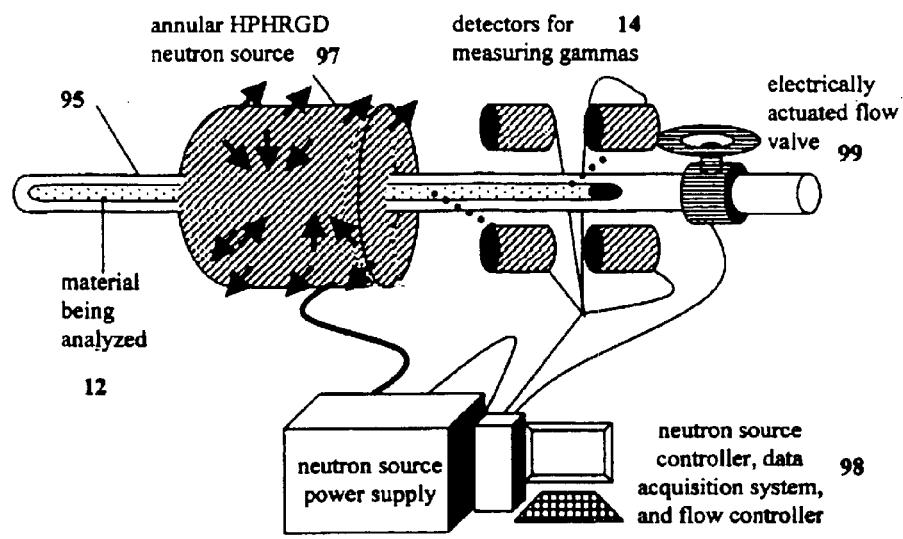

FIG. 47 is a sample illustration of an integrated material analysis and flow control system using an annular HPHRGD neutron generator.

Figure 48:
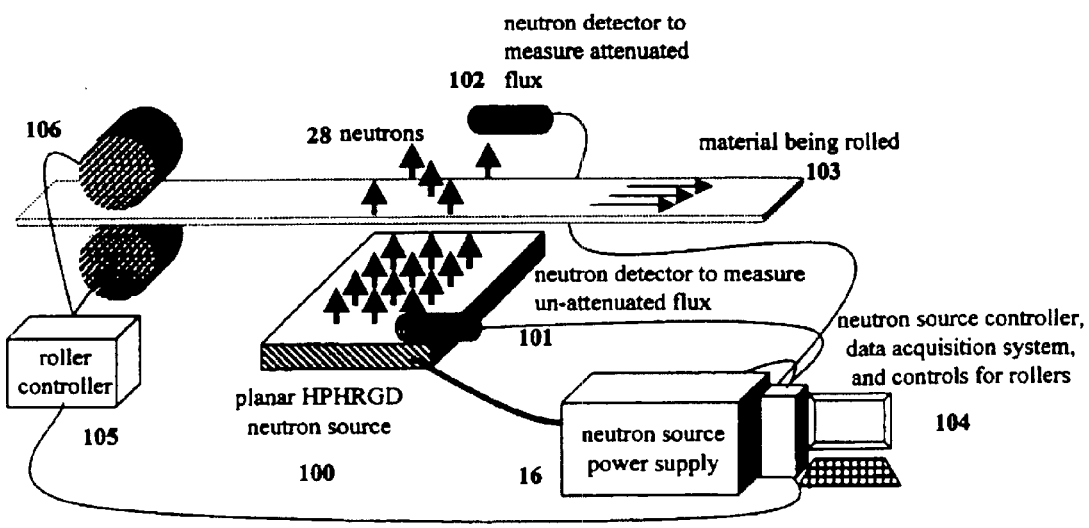

FIG. 48 is a sample illustration of an integrated material rolling system using a planar HPHRGD neutron generator.

Figure 49:
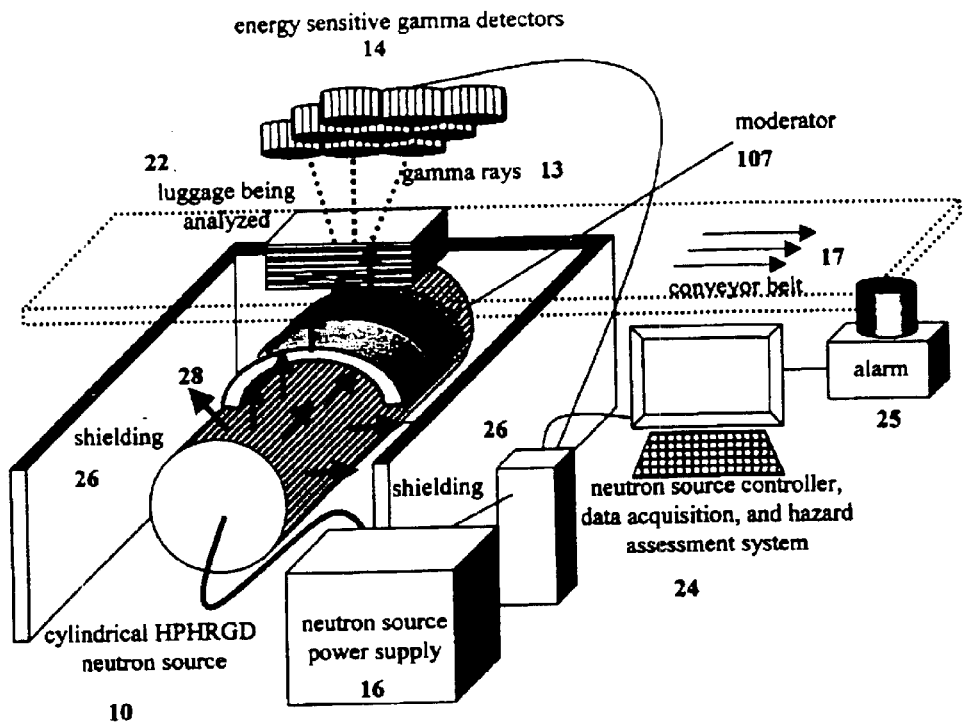

FIG. 49 is a sample illustration of an integrated security inspection system using a long cylindrical HPHRGD neutron generator.

Figure 50:
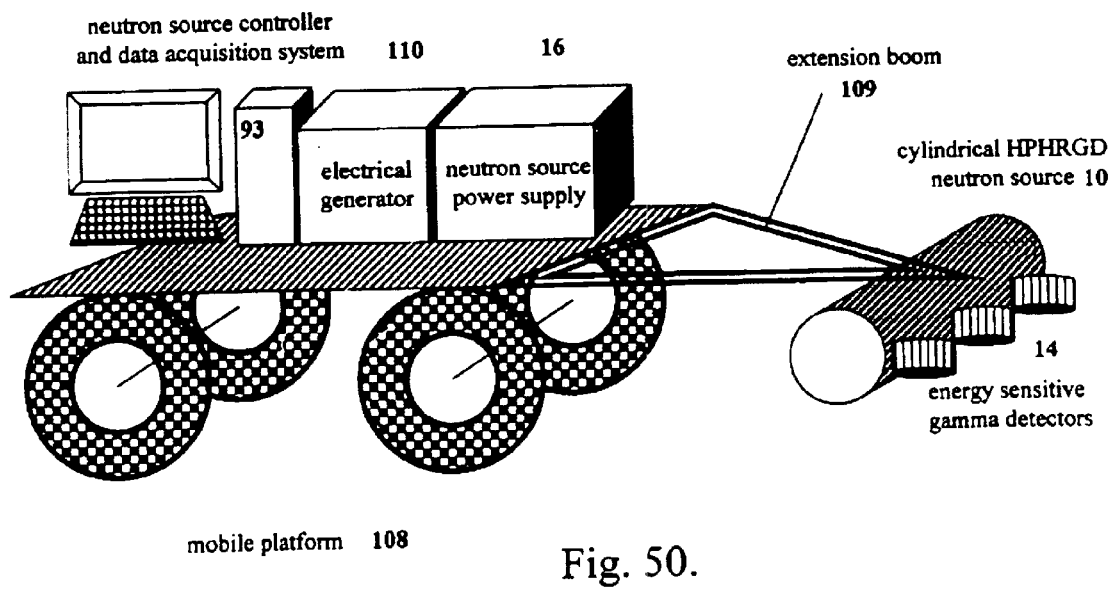

FIG. 50 is a sample illustration of a mobile environmental inspection system using a long cylindrical HPHRGD neutron generator.

Figure 51:
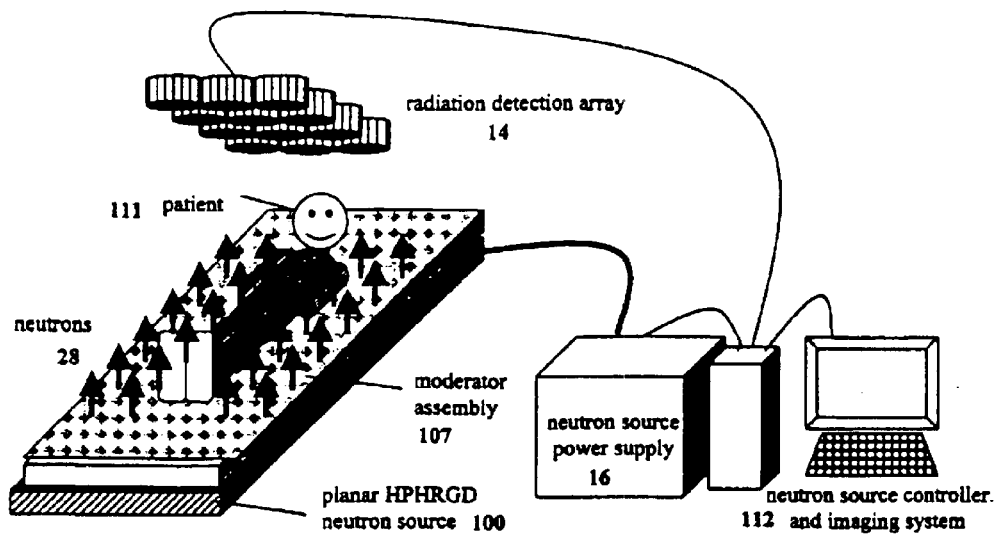

FIG. 51 is a sample illustration of a whole-body medical imaging and treatment system using a planar HPHRGD neutron generator.

Figure 52:
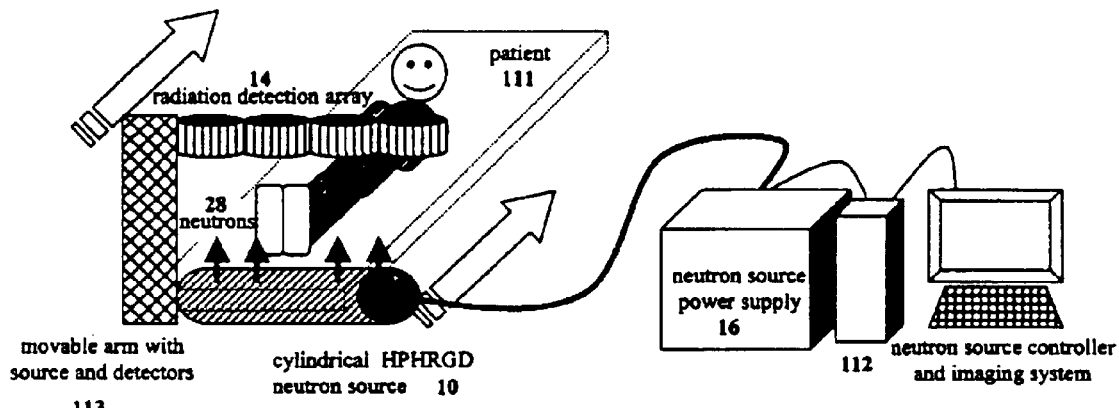

FIG. 52 is a sample illustration of a whole-body medical imaging and treatment system using a movable, long cylindrical HPHRGD neutron generator and detection array.

Figure 53:
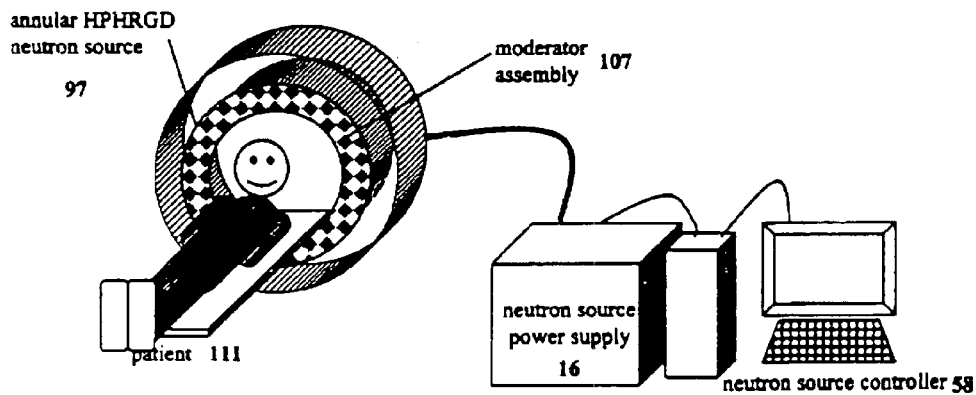

FIG. 53 is a sample illustration of a medical treatment system using an annular HPHRGD neutron generator.

Figure 54:
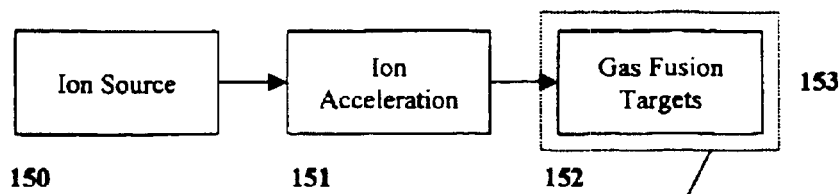
Figure 54:
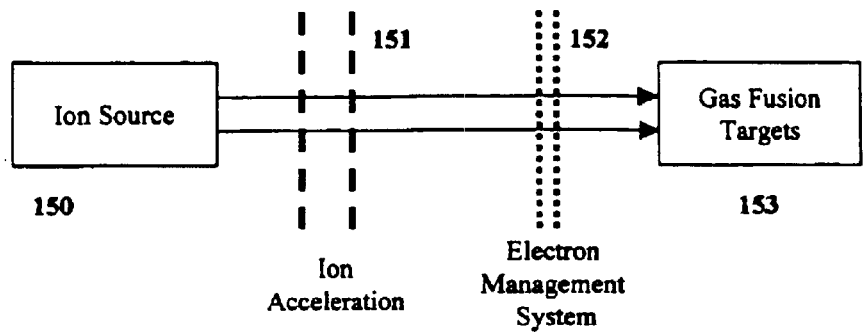

FIG. 54 is (a) a block diagram of the gas-target neutron generator components, and (b) showing the movement of ions from the source region, through the accelerator region and into the gas-target region bounded by an electron management system.

Figure 55:
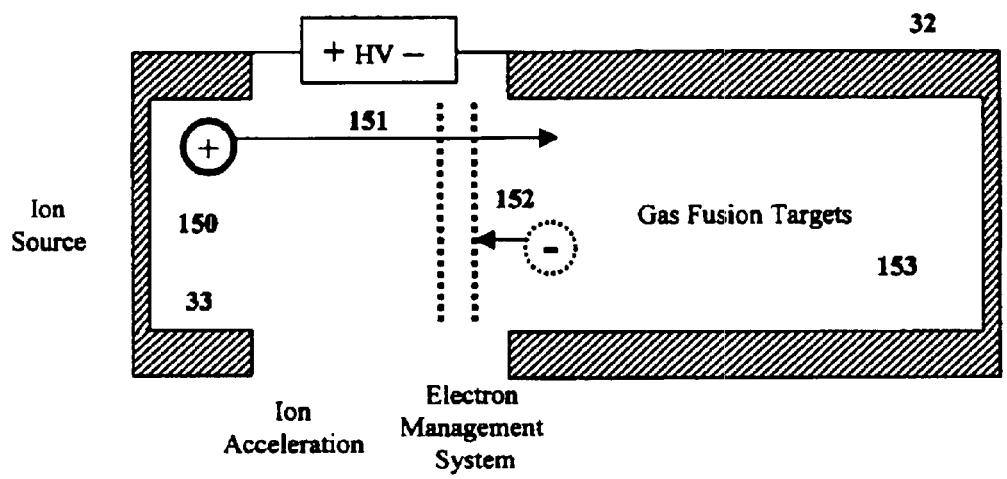
Figure 55:
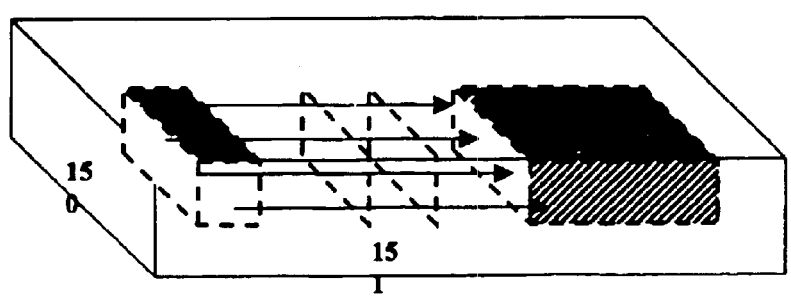

FIG. 55 is a drawing of: (a) a 2D generic gas-target neutron generator with single anode-cathode arrangement with electron management, where the ion source is attached to the high-voltage power supply and the bounded cathode contains the gas-target region, (b) a 3D generic rectangular parallelepiped gas-target configuration, and (c) an illustration of a gas-target neutron generator with optimized neutron production efficiency, utilizing very high energy ions to maximize the fusion probability vs. other collisions, advanced electron management for high power efficiency, and large gas volume and target density for maximum collisions.

Figure 56:
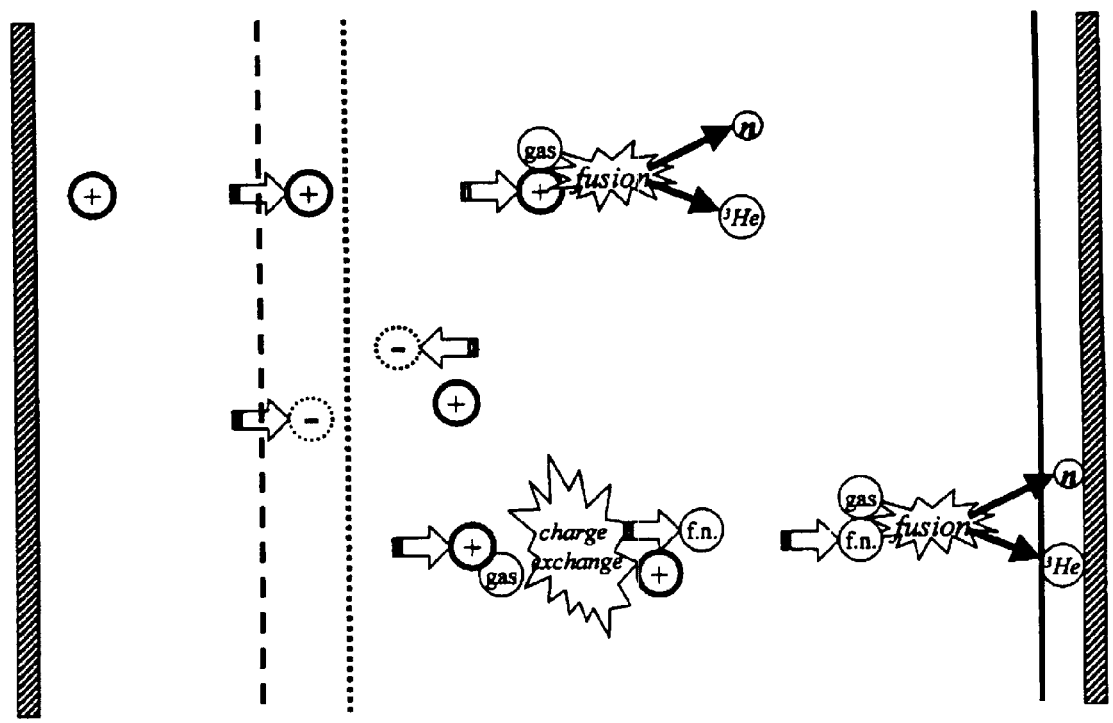

FIG. 56 is a simplified drawing of several important particle collisions and motions that occur in the gas-target neutron generator, with specific reference to electron management.

Figure 57:
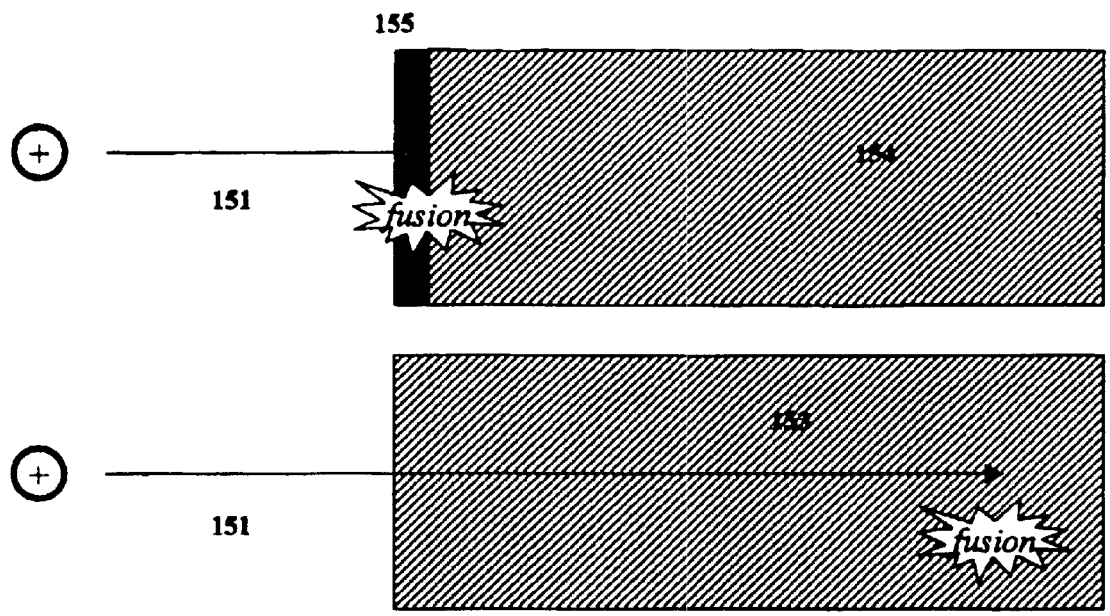

FIG. 57(a) represents the shallow interaction layer for solid-target neutron generation, and (b) represents the larger gas-target interaction volume.

Figure 58:
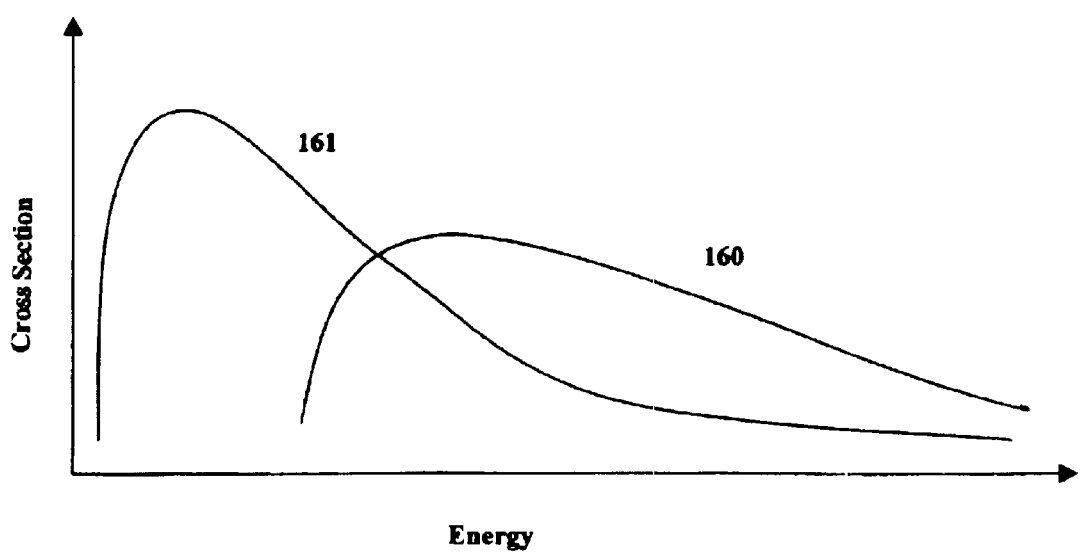

FIG. 58 is an illustration of the difference in the fusion cross-section vs. energy and the atomic interaction cross-section vs. energy.

Figure 59:
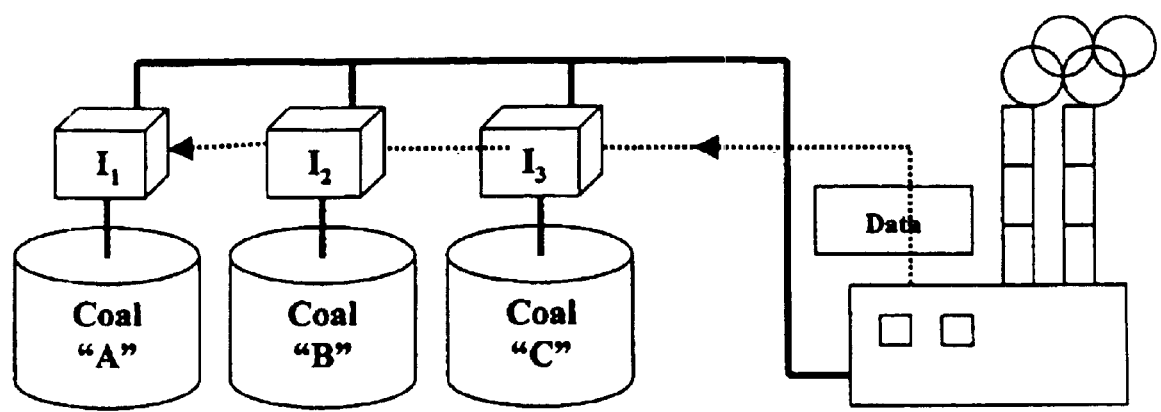

FIG. 59 is a block diagram depicting three gas-target neutron identification systems monitoring three input streams in to an industrial process, in this case coal entering a power plant mixed for optimum quality from three different grades of coal.

DETAILED DESCRIPTION OF THE INVENTION

The following references and technology classes give information useful to one of skill in the art in understanding the general technology of neutron generation and use.

| U.S. Pat. Documents | |
|---|---|
| 3,258,402 | |
| 3,386,883 | |
| 3,530,036 | |
| 3,530,497 | |
| 3,609,369 | 376/107 |
| 3,761,712 | 250/392 |

| U.S. Pat. Documents (continued) | |
|---|---|
| 3,794,843 | 250/390.05 |
| 3,885,160 | 250/269.4 |
| 4,076,990 | 376/115 |
| 4,112,306 | 376/112 |
| 4,233,539 | 313/106 |
| 4,244,782 | 376/139 |
| 4,263,528 | 313/293 |
| 4,414,472 | 250/390.04 |
| 4,480,185 | 250/251 |
| 4,581,194 | 376/119 |
| 4,582,992 | 376/159 |
| 4,645,635 | 250/390.05 |
| 4,671,256 | 376/159 |
| 4,694,165 | |
| 4,696,782 | 376/117 |
| 4,830,193 | 376/159 |
| 4,884,288 | 378/051 |
| 5,053,185 | |
| 5,098,640 | 376/159 |
| 5,112,564 | 376/116 |
| 5,153,439 | 250/390.04 |
| 5,162,095 | 376/159 |
| 5,200,626 | 250/390.04 |
| 5,252,832 | 250/269.4 |
| 5,330,621 | 250/390.04 |
| 5,342,158 | |
| 5,373,538 | 376/159 |
| 5,392,319 | 376/151 |
| 5,396071 | |
| 5,410,575 | 376/159 |
| 5,414,195 | 376/157 |
| 5,433,693 | 600/001 |
| 5,606,167 | 250/390.04 |
| 5,732,115 | |
| 5,818,054 | 250/390.02 |
| 5,825,030 | 376/159 |
| 5,949,069 | 250/269.1 |
| 5,959,870 | |
| 6,026,135 | 250/392 |
| 6,157,034 | 376/159 |
| 6,218,943 | 378/057 |

Other Publications

De Soete, D. et al., *Neutron Activation Analysis,* Wiley Inter-Science, New York, 1972.

Dobretsov, L. N., "Electron and Ion Emission", *Technical Translation F-73,* US-Soviet Technical Exchange Program, 1970.

Fowler, J. F., "Nuclear Particles in Cancer Treatment", *Medical Physics Handbook* 8, Adam Hilger Ltd., Bristol, 1980.

Hirsch, R. L., "Inertial-Electrostatic Confinement of Ionized Fusion Gases", *Journal of Applied Physics,* V 18, N 11, October 1967.

Lieberman, M. A., and A. J. Lichtenberg, *Principles of Plasma Discharges and Materials Processing,* John Wiley and Sons, NY, 1994

McClure, G. W., "High-Voltage Glow Discharges in $D_2$ Gas. I. Diagnostic Measurements", *Journal of Physical Review,* V 124, N 1, Nov. 15, 1961, McGrath, R., *Landmines and Unexploded Ordinance, a Resource Book,* Pluto Press, 2001.

Miley, G. H. et al., "Discharge Characteristics of the Spherical Inertial Electrostatic Confinement (IEC) Device", *IEEE Transactions on Plasma Science,* V 25, N 4, August 1997

Miller, C. M., "Flashover of Insulators in Vacuum. Review of Techniques to Improve Holdoff Voltage", *IEEE Transactions on Electrical Insulation,* V 28, N 4, August 1993.

Nargowalla, S. S. and E. Przybylowicz, *Activation Analysis with Neutron Generators, Chemical Analysis Volume* 39, J. Wiley and Sons, New York, 1973.

Yates, C., "Airport Security: Standards and Technology (Jane's Special Report)", Jane's Information Group, 1999.

In order to keep this presentation orderly, the description of the invention has been divided into the eleven areas. Certain innovation areas are further subdivided to further elucidate important aspects of the innovation. Each innovation area includes a description of its preferred embodiment. Some areas also include descriptions about the reduction to practice of those innovations.

1) The Gas-Target Neutron Generator
   a) Basic Methodology
   b) System Components
   c) Electron Management System
   d) Optimization and Efficiency
2) The Single Cathode HPHRGD Neutron Generator.
   a) High-Pressure High-Resistance Gaseous Discharge Concept and Basic Device
   b) Process for Generating Neutrons in a Gaseous Discharge Device.
   c) Geometries of the HPHRGD Neutron Generator.
   d) Gas Management, Cooling System, and Control System for the HPHRGD Neutron Generator
   e) Reduction to Practice
   f) Preferred Embodiment
3) The Double Cathode HPHRGD Neutron Generator.
   a) Active Electron Suppression and Collection Means
   b) Passive Electron Suppression and Collection Means
   c) Power Supply Arrangement
   d) Reduction to Practice
   e) Preferred Embodiment
4) Electron Repression Means for the HPHRGD Neutron Generator
   a) Concept
   b) Reduction to Practice
   c) Preferred Embodiment
5) Baffling System for the HPHRGD Neutron Generator.
   a) Concept
   b) Reduction to Practice
   c) Preferred Embodiment
6) Surface Material Selection for Optimization of the HPHRGD Neutron Generator.
   a) Concept
   b) Reduction to Practice
   c) Preferred Embodiment
7) Optimization of Electrode Gap Spacing for the HPHRGD Neutron Generator.
   a) Concept
   b) Reduction to Practice
   c) Preferred Embodiment
8) Online Process Control and Material Analysis with the HPHRGD Neutron Generator
   a) Concept
   b) Preferred Embodiment
9) Security Package Inspection and Contraband Material Analysis with the HPHRGD Neutron Generator
   a) Concept
   b) Preferred Embodiment
10) Mobile Environmental Land Analysis with the HPHRGD Neutron Generator
    a) Concept
    b) Preferred Embodiment
11) HPHRGD Neutron Generator for Medical Imaging and Treatment
    a) Concept
    b) Preferred Embodiment 1. The Gas-Target Neutron Generator The basic methodology behind the gas-target neutron generator is to create an accelerator device that has the potential to have long lifetime. Currently, there exists no long-life stable commercial neutron source, beyond large linear accelerators and nuclear reactors. Solid-target accelerators have problems with lifetime, due to the degradation in the metal lattice that contains the high-density fusion targets. A gas-target system does not have any metal lattice to damage, undergo thermal stresses, or degrade from ion impact, potentially offering a significant advantage. However, the gas-target density is significantly lower than the target density found in solid-target materials, affecting the fusion neutron production rate.

In solid-target machines, high-energy ions impinging on the target material 154 penetrate to depths on the order of 1–10 micrometers 155, as shown in FIG. 57(a). This is due to the large Coulomb drag force that the ion experiences inside the metal lattice containing the target atoms. This drag very quickly lowers the energy of the incoming ion, thus it is only able to interact with target atoms in this shallow layer for the fusion reaction. Also, it is this rapid stopping power within solid-targets that locally heats, sputters and degrades the target material, limiting solid-target lifetime. In a gas-target system, there is no metal lattice to produce these Coulomb drag forces, and high-energy ions can interact over larger target distances. Thus, the target collision rate density is an integral of the ion macroscopic fusion cross-section probability (dependent on energy) over the distance traveled. In solid-target systems, the target density is high, but the distance traveled at high energy is short. In a gas-target system, the target density is low, but the distance traveled can be high, as shown in FIG. 57(b). A gas-target neutron generator can be constructed such that high-energy ions can interact with a collision rate over the larger target volume equivalent to that found in a solid-target system 153.

A. Gas-Target System Components

The basic gas-target neutron generation system consists of an ion source region 150, an acceleration region 151, and a gas-target region 153, as shown in FIG. 54(a). The methodology for building a gas-target neutron generation system allows any means of ion generation, such as a Penning ion source, a duoplasmatrons, RF excitation, ECR ionization, etc., and any means of acceleration, such as electrostatic and magnetic. The system is controlled by introducing a fusible gas, such as deuterium or a deuterium-tritium mixture, into the gas target region that is aligned with the direction of ion flow from the ion source and acceleration regions. Ions are generated in the source region, accelerated through a high-voltage difference, greater than 1 kV, and impacted into the gas-targets to yield fusion reaction collisions, as shown in FIG. 56.

Due to the simple nature of the gas-target neutron generator methodology, it can be adapted into a variety of shapes and geometries to produce varying gas-target regions for neutron generation. For example, a long cylindrical gas-target region can yield a linear neutron emission profile that is useful in many practical industrial applications for neutron analysis. Thus, the gas-target neutron generator offers enhanced neutron production characteristics not found in current neutron sources.

B. Electron Management System and System Efficiency

As the high-energy ions interact with the target material, a significant number of ionizations occur. In solid-target systems, this ionization process occurs predominately inside the metal lattice where the resulting charged particles, formed from the ionization event, cannot escape. They recombine with other ions and electrons present and generate heat. In the gas-target system, there is no metal lattice to recapture these charged particles generated by ionization events in the gas. The electrons generated in the gas-target region can feedback into the acceleration region and draw power from the system, reducing power efficiency. As a result, gas-target neutron generation systems operate with a balance of ion current into the gas-target region and electron-current out of the gas-target region.

Electron management systems 152 have been devised to mitigate the effect of charged particle production in the gas-target neutron generator and allow the optimization of neutron production efficiency, possibly to levels greater than solid-target systems. The basic principle of electron management in gas-target neutron generators is to limit electron current through the high-voltage circuit powering ions into the gas-target. Many electron management techniques were first applied in vacuum tube transistors and switches in the early 1900s, and can be applied to the gas-target neutron generator to optimize neutron production power efficiency. The gas-target region must be permeable to high-energy ions from the ion source and accelerator region, and can apply such techniques as suppression, repression, screening, extraction, and collection to inhibit the formation and flow of electrons through the power circuit, represented in FIG. 54(b).

To increase the neutron output from a given gas-target geometry configuration, the gas pressure can be increased to increase the number of targets with which high-energy ions can interact. This also increases the electron generation rate in the gas-target region, decreasing efficiency. The electron management system 152 counters the effects of increased electron generation, allowing higher gas target density for a greater neutron output efficiency per unit power input.

D. Preferred Embodiment

The basic gas-target neutron generator preferred embodiment is a planar source or tube, where an ion source 150 is located at one end and the gas-target region 153 at the other, as shown in FIG. 55(a-b). A single accelerator region 151 is created between the ion source, serving as the anode, and the gas-target region, serving at the cathode. Ions are generated with a conventional ion source, and accelerated into the gas-target region through a permeable surface. An electron management system 152 minimizes electron feedback across the anode-cathode gap through the use of low secondary electron emission materials, a suppression screen to limit electrons from entering the anode-cathode gap region, and an extraction mechanism to remove surplus charged particles from the gas-target region.

Figure 55C:
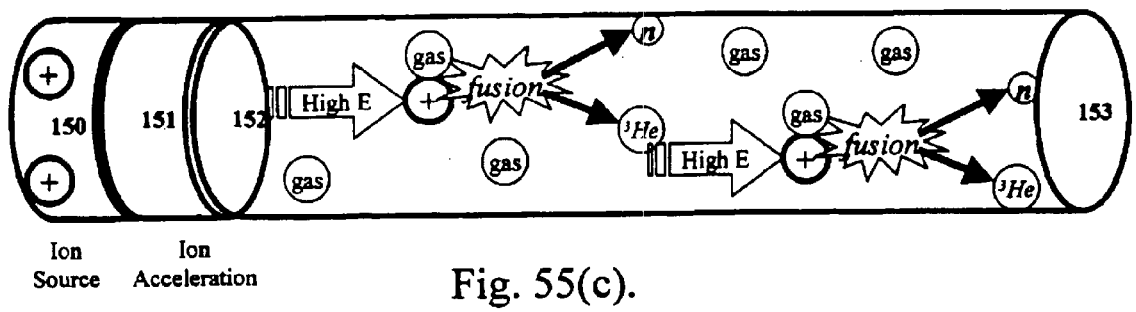

The gas-target neutron generator can also be further optimized for neutron production power efficiency by injecting ions into the gas-target region at very high energy (~1–10 MV) to maximize the fusion cross-sectional probability 160 relative to other collisions 161, as shown in FIG. 58. Such a condition results in superior power efficiency if the gas-target region volume is large enough to allow the very high-energy ions to deposit a significant fraction of their energy into the gas-target region before encountering a boundary. The preferred embodiment of this gas target system is a long cylindrical pipe with an ion source region and acceleration region located at one end, shown in FIG. 55(c). The ions are injected into the gas-target volume containing a suitable electron management system to minimize the effects of charged particle production, leading to superior neutron production efficiency. The gas is regulated and maintained at high pressure to produce a very high target density for the very high-energy ions to interact with.

2. Single Cathode High-Pressure High-Resistance Gaseous Discharge (HPHRGD) Neutron Generator.

The HPHRGD neutron generator is comprised of several parts that together constitute a complete system. The key components are the anode and cathode electrodes. Typically, a metal vacuum chamber serves as the anode electrode, however the anode could be a separate electrode within the vacuum chamber. The electrode and chamber assembly is evacuated with a vacuum pumping system and back-filled with deuterium gas (or a deuterium and tritium mixture). The pressure of the background target gas material is regulated by controlling the gas flow rate through the system (in a flowing system), or by controlling the temperature of the gas reservoir getter assembly (in a hermetically sealed system with a getter). A power supply delivers power to the electrodes via high-voltage electrical feedthroughs, typically made with a non-porous ceramic. Pressure, current and voltage of the system are the primary controlling parameters; they are measured with appropriate gauges and adjusted to sustain the desired discharge mode.

A. High-Pressure High-Resistance Gaseous Discharge (HPHRGD) Device

In its simplest embodiment, the HPHRGD device is a two-electrode system used to accelerate ions to high energy to impact with background gas targets. As shown in FIG. 6, the primary components of the system are a semi-transparent cathode electrode 32 and an anode electrode 33. These electrodes establish an anode-cathode gap region 34 and an intra-cathode region 35. Other important components are a vacuum chamber 41(which often serves as the anode electrode), a high-voltage electrical feedthrough for delivering power to the cathode, means of evacuating the chamber, and a controllable supply of gas for the discharge, which are discussed in more detail later. The configuration shown in FIG. 6 has a cylindrical geometry, although the system could be formed into a variety of shapes, as discussed in section C.

When a gaseous discharge is formed between two electrodes, electrons are accelerated toward the anode and the ions are accelerated toward and through the cathode, as shown in FIG. 7. The cathode is semi-transparent to allow high-energy ions and other particles to pass through it to sustain the discharge. Accelerated ions can be used in many different applications, such as ion implantation and deposition. Although in this innovation, their primary purpose is to undergo collisions with the background gas to sustain the discharge. Instead of ions accelerating to high energy to impact the cathode generating secondary electrons to sustain the discharge, the high-energy ions (and fast neutral particles) in the HPHRGD system are able to directly ionize background gas to provide discharge sustainment.

The factors of the pressure times the distance (P-d) and the amount of electrical current flowing through the discharge influence the operation of most discharges, since they determine the collision rate in the discharge. FIG. 5 shows generalized graphs of operating voltage versus the pressure times distance parameter. DC and RF glow discharge devices operate in an electron-dominated mode where most of the ionizing collisions that sustain the discharge are caused by electrons. This operation generally occurs at low voltages due to the relatively low amounts of energy that electrons need to ionize gas, as shown by the lower curve in FIG. 5. The left side of the lower curve represents obstructed and abnormal glow discharge modes, where reduced electron impact ionizations with the background gas are compensated by large plasma sheaths that accelerate ions into the cathode to liberate more secondary electrons to sustain the discharge.

Conversely, ions and fast-neutral particles, collectively called heavy particles throughout this document, require relatively large amounts of energy to ionize gas. The voltage needed to accelerate the heavy-particles to ionization energies is approximately three orders of magnitude above the voltage needed to drive an electron-dominated discharge. In deuterium gas ($D_2$), for example, the peak in the ion-impact ionization cross section occurs when the projectile ion has nearly 70 keV of energy. A deuterium ion cannot easily transfer momentum to an electron to remove it from its orbit, due to the mass difference between it and an electron. This energy is large compared to only 0.07 keV of energy needed to reach the peak electron-impact ionization cross section. Theoretically, it is possible to have a gaseous discharge with ionizations caused only by heavy-particles. Such operation would also be characterized by a voltage versus P-d parameter curve, as shown by the upper curve in FIG. 5. However, since electrons would still exist in such discharges, there would be some fraction of discharge current carried by electrons, and some fraction of ionizations caused by electrons.

As the heavy-particle-dominated and electron-dominated curves are separate from each other, there should be some form of transition regime. As the ionizations caused by electrons are diminished and the ionizations caused by heavy-particles are promoted, the voltage versus P-d parameter curve should be moved upward to reflect the transition toward a heavy-particle-dominated discharge, as shown by the lines on the left side of FIG. 5. This is the voltage versus pressure-times-distance regime where the HPHRGD system operates, in the transition region between electron-dominated and heavy-particle-dominated discharges.

The present innovation calls for the application of a large voltage differential across a pair of electrodes, typically in the range of tens to hundreds of kilovolts. The resulting electric field accelerates heavy particles to impact with background gas causing gas ionization and charge-exchange collisions necessary for discharge sustainment. Electrons are also accelerated by the electric field, but they are accelerated so quickly that their energy is usually too large to effectively ionize the background gas. The discharge is characterized as a high-resistance discharge because the total resistance of the discharge is on the order of mega-ohms, allowing high-voltage operation where heavy particles can accelerate to high energy. Further innovations described later will allow high-voltage operation at greater pressure-distance parameters through the removal of charged particles and increased discharge resistance, leading to the designation of "high-pressure".

The innovation utilizes a semi-transparent cathode 32 to create zones in the discharge. In the zone between the anode and cathode, called the anode-cathode gap 34, positive ions are accelerated to a high energy before they pass through openings in the semi-transparent cathode. These openings lead to the second discharge zone, called the intra-cathode region 35, which has a fraction of the potential difference compared to the applied potential on the cathode. Here, the ions travel at high energy, having ionizing collisions and charge-exchange reactions with background gas particles to sustain current flow through the device. FIG. 8 depicts the electric potentials within both the anode-cathode gap zone 34 and the intra-cathode zone 35. It should be noted that the potential at the center of the intra-cathode region 36 is not as low as the potential on the cathode itself. Two potential curves are drawn, one represents the electric potential on paths through the openings of the semi-transparent cathode 37, and the other represents the potential on paths toward an electrode surface 38. Ions that originate in the anode-cathode gap region typically follow a path through the electrode openings 37 until their energy is diminished. After undergoing collisions, the low-energy ions in the intra-cathode region may take a direct path toward a solid portion the cathode 32, traveling along the dashed line path 38 in FIG. 8.

Electrons originating inside the intra-cathode region 35 will typically follow a path through the electrode openings (37 of FIG. 8) to reach the anode. Nearly every electron generated inside the semi-transparent cathode escapes through an opening in the cathode surface and accelerates to the device anode. These electrons are accelerated to very high energies and then "run away" from further collisions; meaning that they do not ionize much gas and contribute little to the generation of high-energy deuterium particles. These electrons draw large amounts of power from the system, with each electron losing energy up to the full applied electric potential, which can be tens or hundreds of keV per electron. Such power losses should be mitigated to conserve electrical power and improve the efficiency of the device. Many of the forthcoming innovation areas describe means to limit such power losses.

It is important to note that although the semi-transparent types of cathodes 32 are physically hollow, they are not "hollow cathodes" in the traditional sense. The innovation being disclosed does not employ the "hollow cathode effect," nor does it attempt to trap or confine particles, which would result in an electron dominated discharge. Rather, the purpose of the semi-transparent cathode is to permit ions and fast neutral particles to transit from one discharge zone to the other, providing a longer path length for high-energy charge-exchange collisions or other desirable high-energy heavy-particle collisions to occur.

Fast-neutral particles are formed through the charge-exchange reaction of ions with background gas, as shown in FIG. 7. Essentially, the ion takes an electron from a nearby neutral gas particle, resulting in a "fast" neutral particle with about the same energy as it had when it was an ion. Because they have no net charge, the fast neutrals are unaffected by the electric fields within the device, and they transit across the device on a straight-line path until they collide with an electrode or another particle. The fast-neutral particles create electron-ion pairs via impact ionization with the background gas across the device by passing through the openings of the semi-transparent cathode. Charged particle production from fast-neutral impact ionizations helps sustain the discharge. In addition to collisions with the background gas, fast neutral particles interact with the electrode surfaces to produce localized ionizations at the electrode surfaces, due to the presence of gas attached to them. Ions generated near the anode surface are accelerated across the entire anode-cathode gap and can gain the most energy possible. These processes all contribute to the sustainment of high-resistance operation with high particle energies. The critical aspect of the high-pressure high-resistance gaseous discharge is the formation of additional charged particles in regions that will contribute to further high-energy particle formation to perpetuate the high-resistance discharge—hence an ion and fast-neutral dominated discharge, as opposed to an electron dominated discharge.

Electrons are a major component of current flow within typical gaseous discharges. Electrons that are released from ionization collisions and surface interactions are collected at the more positive electrode (anode 33). In an HPHRGD device, electrons rapidly accelerate across the anode-cathode gap 34 to high energies, where the probability of electron impact ionization is significantly reduced. However, in the intra-cathode region 35, where the electric potential difference is a fraction of anode-cathode gap difference, electrons may acquire moderate energies to efficiently cause large numbers of impact ionizations. Also, electrons can be liberated from an electrode surface when heavy particles of sufficient energy strike any electrode. These secondary electrons can cause localized ionizations near the electrode surface where they originated, especially inside the intra-cathode region or near the anode.

If charged particles are generated in sufficient quantities, they can shield the electrodes and form plasma sheaths. With sheath regions and the semi-transparent cathode used in the HPHRGD device, electrons can gain enough energy to further ionize the gas and further contribute to sheath formation, decreasing the effective potential around the cathode. The combined effects of increased electron current and decreased electric potential will drastically reduce the resistance of the discharge. If this occurs, electron impact collisions and electron scattering can become the dominant reactions, shifting the gaseous discharge into a conventional glow discharge regime. Such a low-resistance discharge is not desired because the ions and fast neutral particles will receive very little energy—the purpose of this innovation is to generate high-energy ions and fast neutrals. Thus, curtailment of electron processes is important in maintaining a high-pressure high-resistance gaseous discharge.

An HPHRGD device possesses properties that facilitate high-resistance discharge sustainment instead of a low-resistance glow discharge. The electrode spacing prevents/precludes electrical arc formation between the electrodes, caused by field emission for example. The cathode arrangement should be semi-transparent (that is, should have a number of openings) such that heavy-particles can pass through the arrangement. Also, the electrode placement restricts gaseous discharge formation in undesired locations between non-transparent electrode surfaces. In addition, the gas pressure and applied potential difference should be regulated to allow the dominant ionization mechanism to occur from ion and fast neutral particles transiting the system. The electrodes are configured to provide an appropriate discharge path length for the desired voltage and pressure. The semi-transparent electrode in the system allows the heavy-particles to transit greater distances compared to a system with only solid, non-transparent electrodes. The increased path length provides a greater probability of generating further charged particles for a system at the same gas pressure.

For a given system of electrodes, type of background gas or gas mixture, gas pressure, and electrode spacing distance, the P-d parameter determines sustaining or operating voltage. The voltage-P-d relationship is also influenced by the arrangement of the electrodes, their geometry, material choice, transparency, surface effects and condition. The sustaining voltage vs. P-d curve is also influenced by the amount of current flowing through the gaseous discharge.

The HPHRGD system utilizes a semi-transparent electrode to allow transit of ions and fast-neutral particles to other regions of the discharge device to promote high-energy particle generation. It does not require ion focusing, ion convergence, or the intentional generation of space charge fields to generate high-energy particles or allow them to fuse. The semi-transparent electrode can be optimized for the minimization of electron generation, maximum high-energy particle path length, and to increase the pressure of operation. This can result in very large cathode sizes relative to the anode size.

B. Process for Generating Neutrons in a Gaseous Discharge Device

Fusion is a nuclear process where two nuclei undergo a high-energy collision that produces two (or more) different nuclei. There are two principal fusion reactions of interest that produce neutrons. One is the reaction between deuterium and tritium, which produces 14.1 MeV neutrons, along with 3.5 MeV alpha particles. The other neutron producing reaction is between two deuterium nuclei; however, this reaction has two possible outcomes. Either a 2.45 MeV neutron and a 0.82 MeV helium-3 nucleus are produced, or a 3.06 MeV proton and a 1.02 MeV triton (tritium nucleus) are produced when two deuterons (deuterium nuclei) fuse.

There are many advantages to using deuterium and tritium fusion reactions. Every D-T fusion reaction produces a neutron, whereas about half of D-D fusion reactions generate neutrons. The probability of fusing deuterium and tritium (the D-T fusion cross section) is about 100 times the D-D fusion cross section. Also, certain neutron applications require the higher energy 14.1 MeV D-T fusion neutrons because 2.45 MeV D-D fusion neutrons do not meet an energy threshold for some gamma-producing reactions. However, tritium is more massive than deuterium, which poses a challenge to maintain a D-T mixture ratio with a getter material, and is also radioactive.

This invention can utilize either a deuterium and tritium gas mixture, or it can use just deuterium gas to produce neutrons. For the sake of simplicity, ions, fast-neutrals, and background gas particles are often referred to as "deuterium particles" instead of "deuterium and/or tritium particles." This convention is not intended to endorse deuterium operation over deuterium and tritium operation. Therefore, except where D-D fusion is specifically discussed, "deuterium particles" can be replaced with "deuterium or tritium particles" to reflect D-T operation.

In this innovation, a high-pressure high-resistance gaseous discharge is utilized to generate and accelerate deuterium particles to energies sufficient to undergo fusion reaction collisions. The gaseous discharge serves three purposes: to generate the ions and fast neutrals for fusion, to accelerate the ions to achieve enough energy to readily fuse, and to provide a suitable number collision targets for the ions and fast neutrals to fuse with and generate neutrons.

Operation of the device is achieved by breaking down the gas present in the device and modulating the pressure and input current to achieve a stable high-resistance gaseous discharge between the electrodes. In order for D-D fusion reactions to occur at a significant rate, deuterium particles should be accelerated to high energies, usually well above 10 keV, and travel a long enough distance with a given number of targets. The fusion cross section is very small compared to cross sections for collisions that take place on the atomic scale, about ten orders of magnitude separate the nuclear and atomic cross sections. The peak in deuterium-deuterium impact ionization cross section occurs at 70 keV in energy. At this energy, the fusion cross section is about one-tenth of a barn ($10^{-25}$ cm$^2$) while the ionization cross section is above one hundred million barns ($10^{-16}$ cm$^2$). The fusion reaction cross section has a peak value for energies between 3 and 4 MeV for deuteron-deuteron collisions.

FIG. 9 shows the important collisions that are possible within a deuterium high-resistance discharge. In reaction (a), a positive ion undergoes a charge-exchange collision with a background gas atom or molecule. The ion acquires one electron from the gas particle and becomes a fast neutral particle, leaving behind a slow moving ion. The high-energy fast neutral particle can ionize background gas, as shown in the reactions labeled (b). These reactions can occur in the intra-cathode region 35, or in the anode-cathode gap region 34. Fast neutral particles can also ionize free gas atoms or molecules, or gas that is present on or near electrode surfaces, such as on the anode in collisions labeled (c). Additionally, ionizations can be initiated by high-energy ions (d) and low-energy electrons (e). Fusion reactions occur between target background gas particles and high-energy ions (f) or high-energy fast neutrals (g). Fast-neutral particles colliding with gas on or near electrode surfaces can also produce fusion reactions (h). Finally, ions, fast neutrals and electrons can release secondary electrons when they collide with an electrode surface (i) (j) (k). The number of electrons released depends on the energy of the incident particle. If the particle has a low enough energy, it can stick to the electrode surface, as shown in the collision labeled (l). Although collisions between high-energy ions and fast-neutrals (or combinations thereof) can occur, they are not shown in FIG. 9 because such events have a low probability of occurring.

The high-resistance discharge mode is sustained by deuterium ions (which may be molecular ions, $D_2^+$ or $D_3^+$ or monatomic ions, $D^+$) that are accelerated to high energy, pass through the semi-transparent electrode, and charge exchange at high energy. The charge-exchange collisions can occur either in the anode-cathode gap region, or the intra-cathode region. While no longer being influenced by the electric field, the fast neutral particles propagate through the system causing ionizations to sustain the discharge and current flow. This is in sharp contrast with conventional DC and RF glow discharges previously mentioned, where electrons are responsible for the discharge sustainment. A few of these collisions will happen on the nuclear level with other deuterons in the background gas material, yielding neutron-producing fusion reactions. Essentially, the fusion reaction collision is a "by-product" of atomic scale collisions necessary for discharge sustainment. The neutron output is therefore a function of these atomic-scale collision rates and is heavily dependent on the energy of the interacting particles. The high-pressure high-resistance gaseous discharge is excellently suited for this process. The target can be neutral background gas in the discharge volume, gas that is attached to an electrode surface, or (in very rare cases) other ions and neutral particles.

The HPHRGD neutron generator can achieve neutron source strengths of $10^8$ D-D neutrons per second because it can drive a high-power gaseous discharge with high-pressure operation and increased neutron production efficiency. The HPHRGD system relies on relatively high-pressure operation to increase the number of targets for fusion collisions and to increase the charge-exchange rate for the production of fast neutrals to sustain the high-resistance discharge. Charge-exchange collisions involving high-energy ions are desired since the resulting high-energy fast-neutrals can cause ionizations and fuse with the background gas.

C. Geometries of the HPHRGD Neutron Generator

The electrodes are key components of the HPHRGD neutron generator. Their size, shape, and design have a great influence on the performance of the high-resistance gaseous discharge, and consequently on the neutron production rate. To optimize the particle path length and increase the likelihood of fusion collisions, a semi-transparent cathode 32 (i.e., an electrode with openings to allow particle passage) should be used. The most convenient application of this geometry is to use the external vacuum chamber as the anode electrode, as it reduces the number of components in the system The semi-transparent surfaces of the cathode have openings to allow ions and fast neutral particles to travel through the intra-cathode region. This cathode should be flanked by anode electrodes on ends opposing the openings of the cathode, or should be completely surrounded by the anode 33. If the openings are symmetrical, particles can traverse the entire length of the device: traveling from one side of the anode, through the cathode, to the other anode location. This provides a traveling distance for high-energy heavy-particles that is significantly longer than the anode-cathode gap distance. Charge-exchange and ionization collisions that occur along this longer distance, within the intra-cathode region, contribute to high-resistance discharge sustainment and current flow. Without such a high-energy heavy-particle path length at a given gas pressure, there may not be enough ionization collisions to sustain the high-resistance discharge mode.

The cathode can also have non-transparent and structural supporting surfaces 55 to prevent particle flow in directions that would pass through such surfaces. The non-transparent surfaces, in effect, orient the discharge pathways to occur only through the semi-transparent surfaces of the cathode. Such non-transparent surfaces are used as connection and support areas for high-voltage feedthrough connections and to locate other insulators and support structures so as not to interfere with the gaseous discharge.

There are a large number of electrode size, shape, and spacing combinations provided by the design flexibility of the HPHRGD system. The general rule is that the anode and cathode electrodes should be designed so that the discharge occurs between the anode and a cathode surface with openings. Otherwise, a discharge may form between two non-transparent surfaces, and the particles will not be able to pass through the cathode to travel longer distances and have the collisions necessary to support a high-resistance discharge mode. For gaseous discharge initiation (breakdown) any non-transparent surfaces of the cathode should be located closer to the anode than the cathode surfaces with openings, and such distances should not be so short as to promote electrical arcing between the anode and cathode. However, there are a number of ignition mechanisms to promote the desired high-pressure high-resistance gaseous discharge mode, including filament heaters, sparkers, laser-assisted ionizers, to name a few.

The high-resistance gaseous discharge is also affected by the presence of absorbed gas material on or near the electrode surfaces, especially the anode. An anode gas layer can add a small layer of high-density targets for fusion and ionizations that contribute to high-energy ion production for discharge sustainment. As a result, some neutrons are generated near the surface of the anode while other neutrons are generated throughout the discharge volume. This essentially provides a neutron generator with a configurable volumetric source distributed across the discharge region. This feature can be implemented in almost any geometrical shape to suit the needs of various applications, especially near-uniform neutron source distributions to enhance neutron analysis applications. Four distinct and useful geometries for the HPHRGD neutron generator are described in the following paragraphs, although many other geometries are possible.

In the radially-accelerated cylindrical geometry, both the anode and the cathode are cylindrical in shape, and the semi-transparent cathode electrode 32 is placed concentrically within the cylindrical anode 33. The curved surface of the cathode has openings to allow ions and fast neutral particles to travel through the cathode across its diameter. Ideally, the flat circular ends of the cylindrical cathode are non-transparent to inhibit particle motion along the length of the cylinder, and provide locations for electrical connections and support structures. The separation distance between the curved surfaces of the electrodes is intended to be the distance for the P-d factor that determines the breakdown and the operating voltages of the system in high-resistance discharge mode. The diameter of the cathode should provide a path length suitable for high-energy particles to fuse with background gas.

Figure 10A:
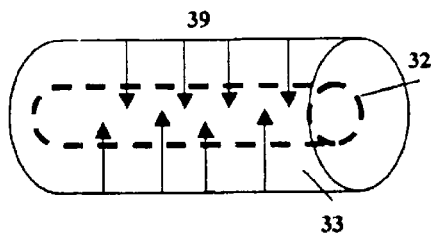
Figure 10B:
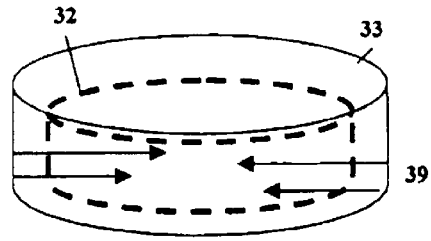

Because fusion reactions take place throughout the discharge volume, the length of the cylindrical electrodes can be selected to provide distinctly different neutron sources. As shown in FIG. 10a, the system can be made long, such that its length is greater than its diameter. In this geometry, a distinct linear neutron source is created, which is ideally suited for scanning in industrial conveyor applications, among many others. In an alternative design, shown in FIG. 10b, the system can be shortened (with a length less than its diameter) to produce a flat, disk-shaped neutron source. Such a neutron source can be used to irradiate items uniformly over a circular area for elemental and material analysis. It is important to note that in the radially-accelerated geometry, the desired direction of particle flow is across the diameter of the cylinder, not along the length of the cylinder, as indicated by the arrows 39 in FIG. 10.

Figure 10C:
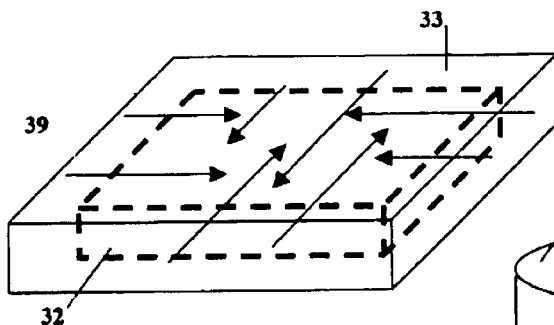
Figure 10D:
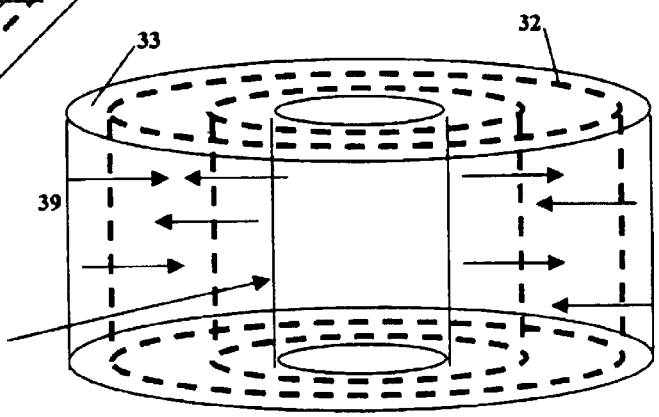
Figure 10E:
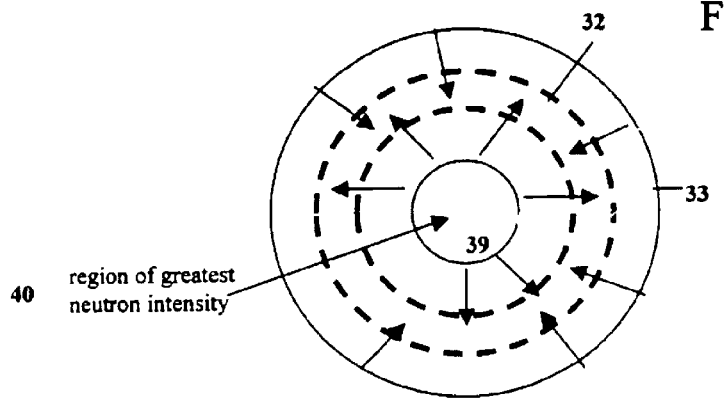

The short cylindrical system can be converted into a rectangular system simply by using box shaped components instead of cylinders. Again, the semi-transparent cathode 32 is placed within the anode 33. As shown in FIG. 10c, the rectangular system could have one dimension shorter than the others to provide at least one flat surface for direct neutron irradiation. The preferred direction of ion and fast-neutral particle travel 39 is along the two longer dimensions of the system, as indicated by the arrows in FIG. 10c, allowing the high-energy particles to travel longer distances within the discharge to have more fusion collisions. A multitude of device dimensions could be selected to provide an effectively planar neutron source, which could be used in many neutron analysis applications with interrogated material moving past the source, or in a stationary position on or near the source The next HPHRGD neutron generator geometry concept presented here is an annular geometry. As shown in FIG. 10d, both the anode 33 and cathode 32 are concentric and annular in shape. The cylindrical surfaces of the semi-transparent cathode have openings to allow particles to travel generally perpendicular to the surface, through the intra-cathode region, as indicated by the arrows 39 in FIG. 10d. The flat annular ends of the cathode can be non-transparent to prevent particles from traveling down the length (or height) of the system. The charged particles should not travel around the annulus, as there are no magnetic fields present to drive particles around the annulus or to confine particles. Again, there are multiple options for the system dimensions with this geometry, and the following statements are general rules for designing the annular HPHRGD neutron generator. As in the concentric cylindrical system, the ends of the anode and cathode should be spaced close enough together to promote a radial gaseous discharge, but far enough apart to prevent arcing between the two surfaces. There is a central opening to place materials to be irradiated where the total neutron flux is intense 40 and nearly constant. The annular system can also be extended to any length to irradiate long items such as pipes (or material flowing in the pipes).

Additionally, the annular system can be extended into a toroidal (donut-shaped) configuration. Conceptually, the annular system can be formed with circular cross sections, forming the toroidal shape. Both the anode 33 and the semi-transparent cathode 32 are toroids, with the anode completely enveloping the cathode. In this geometry, the electrodes are continuous loops and do not require flat, non-transparent surfaces. The preferred direction for ion and fast-neutral particle flow 39 is radially toward or away from the center of the toroid, as indicated by the arrows in FIG. 10e. Particle motion around the toroid is not desired, as this may promote ionizations in unfavorable locations. Neutrons are generated throughout the toroidal discharge geometry, creating an intense neutron flux 40 at the hole of the toroid. Again, there are many possible device dimensions for the toroidal HPHRGD system. The general rules are that the dimensions of the system should be designed to accommodate objects that will be irradiated inside the system's hole, to provide a suitable P-d for breakdown and operating voltage, and to provide an intra-cathode path length to allow high-energy particles to fuse and produce neutrons.

The HPHRGD system is based on simple gaseous discharge accelerator mechanics, which does not require a fixed geometry to function. Thus, the technology can embody favorable configurations to maximize power utilization, increase neutron emission, and lower the cost of manufacturing. One geometry that does not seem as favorable as other geometries for neutron analysis applications is the spherical geometry. While it is possible to construct a concentrically spherical anode and cathode, the resulting spherical neutron generating volume would approximate a point source of neutrons located at the center of the system. Such a point source of neutrons would not be favorable for uniformly irradiating wide and flat items, a disadvantage shared with point-like accelerator-solid-target and spallation neutron sources. Also, a spherical system would be more difficult and expensive to construct, and would not provide wide electrode surface areas for efficient cooling desired to achieve high-power operation.

D. Gas Management, Cooling System, and Control System for the HPHRGD Neutron Generator In accelerator-solid-target neutron generator systems, the lifetime of the device is limited by target degradation. The HPHRGD neutron generator's lifetime is not limited by the target material in the same manner, since gas is the source of both the high-energy particles and the fusion target particles. In a commercial-grade HPHRGD system, it is desired for the neutron generator to operate with a hermetically sealed system to avoid fire and explosion hazards. The use of a getter material for storage and control of the deuterium gas is desirable during sealed operation. In addition, the effects of impurities are mitigated by the absorptive properties of the getter lattice. These factors extend the operational lifetime of a gaseous discharge neutron generator far beyond the lifetime of accelerator tubes and spallation sources, which is a key feature of this technology. A flowing gas system is an alternative to the getter system, but is not preferred because of gas throughput issues, impurity build-up concerns, and possible wasting of gas, especially in a system using tritium.

During operating conditions in a high-resistance mode, slight changes in the background fill gas pressure can significantly alter the current and voltage discharge characteristics due to the exponential nature of charged particle generation. The response characteristics of the pressure supply system can be tailored to adapt to any pressure changes to sustain the high-resistance discharge within acceptable parameters, including handling changes in system temperature to account for the gas absorption and desorption characteristics of the electrode surfaces. For operation with deuterium and tritium gas, the getter gas storage system can be designed to minimize the total tritium inventory. The molecular weights of the two different gases and their different diffusion coefficients within the getter material should also be considered in the design of a deuterium and tritium getter system As mentioned above, a flowing gas system is an alternative to the getter system to provide gas for the high-pressure high-resistance neutron generator. To accomplish this, a flow control valve should regulate the gas as it enters the vacuum chamber and a vacuum pump should remove gas from the chamber to maintain a constant gas pressure. If the gas is constantly pumped through the system, the effects of impurities can be mitigated as they are actively pumped out of the system. The gas could be contained within a complicated closed-loop gas recycling system, or could be vented to the atmosphere. Although it is possible to vent deuterium gas; for safety, environmental, economic, and legal reasons, tritium gas cannot be released to the air in large quantities.

Another tool to increase the neutron output and/or maintain stability of the HPHRGD neutron generator is a sustained low temperature of the device. Thermal management considerations affect the ultimate power handling characteristics of any neutron generator, including the HPHRGD neutron generator. Factors such as the device geometry, electrode materials and surface area, and heat transfer properties can determine the maximum operating temperature and maximum neutron output. The surface of the cathode electrode can be constructed to easily transfer heat to the vacuum chamber, via radiation or convection.

The exterior surface of the device can be fitted with cooling fins or coolant channels to keep the surface at a reasonable temperature. Active cooling of the outer surface with air, water, oil, or other coolants will allow the HPHRGD neutron generator to operate at higher power levels for larger neutron outputs with a constant electrode geometry. Also, temperature can affect the presence of deuterium gas on or near the electrode surfaces. Thus, cooling of the anode surface can increase the amount of gas at the anode surface, improving the characteristics of the HPHRGD neutron generator.

The HPHRGD neutron generator benefits from a control system that regulates discharge parameters and provides a customizable, steady-state neutron output for the desired end-user application. FIG. 11 shows a block diagram depicting some general inputs and outputs that could be used for the HPHRGD neutron generator control system. The key feature of such a control system is the ability to be integrated with any industrial process controller, environmental scanner, or any other hardware in applications where feedback about the neutron source strength is desired.

One possible alternative to steady-state operation is the pulsed operation mode. Certain neutron material analysis techniques, such as time-of-flight analysis and pulsed fast neutron analysis (PFNA), benefit from a rapidly switched or pulsed source of neutrons. The HPHRGD neutron generator can be operated in such a mode with an appropriate power supply and pulse-forming network. Another means of generating pulsed neutrons in the HPHRGD system is with a hybrid operation mode where pulse power is superimposed on a minimal power steady-state discharge. This hybrid mode has the advantage of using pulsed power for accelerating particles from the existing steady-state discharge for neutron generation, rather than using the pulsed power to initiate the gaseous discharge and accelerate particles within the same power burst.

The goal of pulsed operation is to achieve high neutron outputs only when the source is needed during pulses. This can be achieved by supplying power levels above normal (steady-state) levels to generate more neutrons while not exceeding the maximum average input power restrictions from thermal heating of the device. Accelerator-solid-target systems and spallation neutron sources also employ pulsed operation to mitigate thermal stresses and to increase neutron outputs. However, in applications where a pulsed source is not required, steady-state operation of the HPHRGD neutron source is still preferred for its simplicity and flexibility of operation.

E. Reduction to Practice of the Single Cathode HPHRGD Neutron Generator

A demonstration version of the HPHRGD neutron generator has been designed, constructed, and tested to verify basic operation principles. A simple drawing of the electrode structure of the system appears is FIG. 12. In this system, the cylindrical external vacuum chamber 41 is used as the grounded anode. A wire-frame cathode electrode 42 is constructed out of a wire mesh with square openings 43 that has been curved around to form a cylinder. Power is supplied to the cathode from an external high-voltage source 16 through a ceramic feedthrough 44 to insulate the conductive rod 45 from the grounded vacuum chamber.

Other components are shown in the photograph of the HPHRGD demonstration unit in FIG. 13. Since a getter unit 56 is not used in the demonstration unit, deuterium gas is fed into the chamber through a small gas line 46. Regulating the flow of gas through the gas line controls the pressure inside the vacuum chamber. The vacuum chamber 41 is evacuated through an exhaust port 47, which is connected to a series of vacuum pumps (oil diffusion and rotary vane mechanical pumps not shown) that continuously remove gas during operation. The pressure inside the chamber is measured by a pressure sensor 48 (a thermocouple gauge) and displayed on a pressure metering system 49.

This demonstration unit uses a vacuum chamber that is approximately 1 m long and 27 cm in diameter. The vacuum chamber has two removable end plates 50 for ease of assembly, and to provide two high-voltage feedthroughs 44, 45 for operation (one to supply power and the other for structural support). Vacuum seals are made with rubber O-rings 51 between the end plates and the chamber tube, and long threaded rods 52 hold the end plates in position tightly. Insulative coverings 53 have been placed over each of the ceramic feedthroughs to reduce the risk of electrical shock to personnel during experiments. An oscilloscope 54, which is a very useful diagnostic tool for analyzing signals from almost any electrical device, appears in FIG. 13 even though it is not required for operation. A diagnostic glass viewing port has also been placed in one of the vacuum chamber end plates (not shown in FIG. 13), but is also not required for operation.

A photograph of a wire-frame cathode electrode 42 built for the demonstration unit appears in FIG. 14. Stainless steel wire mesh hardware cloth 43 has been wrapped into a 5-cm diameter cylinder to form the semi-transparent surface of the cathode. The ends of the 91-cm long electrode were fitted with thin steel plates 55 and connections to accommodate the conductive rod of the high-voltage feedthrough. A photograph of this electrode 42 during operation of the HPHRGD demonstration unit appears in FIG. 15. The discharge appears prominently along the length of the center of the cathode.

Neutron measurements were made with a paraffin-moderated helium-3 neutron detector. However, the detector was not calibrated in situ and an estimated conversion factor from a prior calibration was used. When the HPHRGD demonstration unit was operated with −45 kV applied to the cathode and 22 mA of current, the counts from the neutron detector corresponded to a neutron source of approximately $2*10^6$ D-D fusion neutrons per second. As shown in FIG. 16, the neutron source strength for 1 kW of input power at −100 kV is extrapolated to be $1*10^7$ neutrons per second. This extrapolation is based on the increase in the D-D fusion cross-section for particles with 100 keV of energy and the decrease in amount of current. A similar extrapolation for −150 kV at 1 kW showed $1.7*10^7$ neutrons per second. By increasing the input power to 10 kW, the demonstration HPHRGD unit neutron generation rates could be over $10^8$ neutrons per second. However, the demonstration unit lacks the insulation and pressure control properties needed to achieve such conditions.

F. Preferred Embodiment of the Single Cathode HPHRGD Neutron Generator

The preferred embodiment of the high-resistance discharge utilizes a linear-cylindrical configuration with a large semi-transparent wire-frame electrode, as shown in FIG. 17. The vacuum vessel 41 is electrically grounded to serve as the anode of the HPHRGD device, and is hermetically sealed with metal flanges or direct welding. The vessel and cathode 32 are made from stainless steel, or other material, with sufficient corrosion and sputtering resistance and relative ease of manufacturing. The high-voltage is supplied to the interior electrode through the use of a vacuum-tight electrical feedthrough 45 that should include a non-porous ceramic material insulator 44, such as alumina ($Al_2O_3$).

Gas management in the preferred embodiment is accomplished by using a gettering material. The getter 56 can be loaded with deuterium gas or a D-T mixture through an orifice 57 that is sealed after filling. The pressure can be monitored with an appropriate pressure gauge 48. A control system 58 monitors key operating parameters and can adjust the power supply 16 and getter 56 as needed. Convection cooling fins 59 can be placed on the neutron generator to increase the cooling effectiveness while maintaining or increasing neutron yield with additional power. An end view diagram of the HPHRGD system with cooling fins appears in FIG. 18. If the coolant is a flowing gas, such as air, an outer cowling 60 can be used to keep the air in the flow channels 61. However, if the coolant is liquid, the flow channels 61 should be leak-free for safety and to conserve coolant.

3. The Double Cathode HPHRGD Neutron Generator

The preceding innovation introduced means to generate neutrons with a high-pressure high-resistance gaseous discharge. As stated earlier, nearly every electron generated inside the single semi-transparent cathode escapes through openings in the cathode surface, accelerates to the anode, and draws electrical power from the power supply. These electrons are also capable of ionizing gas while they are still within the intra-cathode region, however, they contribute little to ion generation inside the anode-cathode gap. This innovation describes another means of generating a high-pressure high-resistance gaseous discharge that handles intra-cathode electrons more effectively. This is accomplished using a double-cathode arrangement with a suppressor electrode and a "leeching" electrode.

A. Active Leeching and Suppression Electrode Arrangement

The innovation discussed in this section takes an "active" role to minimize electron power losses in the HPHRGD system by forcing the removal of many electrons from the intra-cathode region before they accelerate toward the anode. This is accomplished by using a double cathode arrangement, as shown in FIG. 19. In the double cathode HPHRGD neutron generator, the exterior cathode is called the suppressor electrode 62 and the interior cathode is called the leeching electrode 63. These electrodes divide the intra-cathode region into a leeching-suppressor gap region 64 and an intra-leeching region 65. Unobstructed paths across the device are provided by the alignment of openings of both semi-transparent leeching and suppressor electrodes.

Low-energy electrons generated inside the cathode region 35 from impact ionizations or secondary electron emission can be manipulated by the bias voltages applied to each electrode in the double cathode arrangement. In the case where the suppressor 62 is biased more negatively than the leeching electrode 63, the electric potentials 66 are configured to drive low-energy electrons of the intra-cathode region into the more positive leeching electrode. It will be energetically favorable for some electrons present in the intra-cathode region 35 to be extracted from the gaseous discharge through the leeching electrode. The fraction of electrons extracted by this "leeching effect" will greatly depend on the charged particle generation rates within the intra-cathode region, the local electric potential where each electron is released, the voltages of the leeching and suppressor electrodes, and electrode configuration, including the opening geometry and suppressor-leeching gap spacing.

When the leeching electrode removes electrons, they have energies below the potential difference between the leeching and suppressor electrodes. Since the electrons previously would have traveled to the anode and consumed energy on the order of the full leeching electrode potential, less discharge power will be consumed. The double cathode configuration allows the adjustment of electron leakage from the intra-cathode region and directly affects the gaseous discharge resistance.

If the leeching-suppressor voltage difference is sufficiently large, the escape path for most intra-cathode electrons to the anode-suppressor gap can be completely blocked from the region inside the leeching electrode. In the vacuum potential case, this effect is marked by "saddle points" 67 in the electric potential surfaces 66, as shown in FIG. 20, and the resulting vacuum potential 36 inside the semi-transparent leeching electrode is more negative than the leeching electrode 63 itself due to the bias on the suppressor electrode 62. This result is demonstrated in FIG. 21, a sample equal-potential diagram of a cross sectional view of an HPHRGD neutron generator with leeching and suppressor electrodes, and in FIG. 22, a generalized plot of electric potential as a function of position (not to scale).

Electrons generated in the system are accelerated along electric field lines in an attempt to reach the nearest, more positive potential. As shown in FIG. 22, low-energy electrons generated inside the leeching electrode region will likely originate at a potential between the two lines 37, 38. Such electrons do not have enough energy to travel on a path through an electrode opening 37 to overcome the "suppressing" potential of the saddle point, which is slightly more negative than the potential of the leeching electrode itself. This forces the electrons to seek another path to an electrode with a less negative potential, namely a direct path to the leeching electrode 38 (the dashed line). In this case, such electrons collide with the leeching electrode after gaining low amounts of energy, instead of escaping to the anode 33 after gaining large amounts of energy.

For comparison, FIG. 8 shows an electric potential diagram for a single cathode HPHRGD system. Electrons generated inside the cathode region follow a path through the electrode openings 37 toward the anode. The electrons can gain an energy approximately corresponding to the applied potential before reaching the anode, representing a tremendous power loss, since the electrons contribute little to high-energy heavy-particle production. The biased leeching and suppressor system reduces these power losses by collecting low-energy electrons after they are generated.

Low-energy ions generated inside the leeching electrode will follow a path toward the suppressor electrode 38 (the dashed line in FIG. 22) and gain energy from to the leeching and suppressor potential difference before striking the suppressor. The leeching and suppressor bias voltages can be configured to minimize the potential difference while still providing an electric potential to suppress electrons from reaching the anode While all other properties are constant, the removal of electron charge inside the cathode region decreases the conductance of the gaseous discharge. To maintain an equivalent voltage and current, the high-resistance gaseous discharge requires an increased supply of ions and/or fast-neutral particles. This is accomplished with an increase in pressure, a lengthening of the intra-cathode region in the direction of desired particle motion, or a combination of the two changes. This is manifested as a shift in the operating voltage vs. P-d curve up and to the right, as shown in FIG. 5, to represent the increase in pressure and/or distance (collision density) needed to maintain equivalent voltage and current. The effects of the leeching action improve the neutron generating efficiency of the system, as a greater fraction of the total discharge current is supplied by high-energy ions. As pressures increase to maintain a given voltage of operation, the neutron yield from high-energy collisions with background gas also increases. Also, as the intra-cathode distance increases, high-energy particles will travel longer distances, increasing the number of neutron generating collisions.

B. Passive Leeching Electrode Arrangement

Another double cathode arrangement that could be implemented in the HPHRGD neutron generator is the "passive" leeching concept where the inner leeching electrode is electrically floating instead of being actively biased. The floating leeching electrode is electrically isolated from the suppressor electrode and is physically supported inside the intra-cathode region. When high-energy particles produce ionizations from collisions with the target gas material, the higher mobility electrons impinge on the leeching electrode surface and charge it electrically negative with respect to the local potential. This attracts slow ions generated in the intra-cathode region to the surface of the leeching electrode with little energy where they can recombine with the electrons on the leeching electrode surface and become neutral gas.

The "passive" recombination effect removes both energy lossy particles of an electron-ion pair with zero power removed from the system. However since it relies on self-charging fields, some electrons can still escape through the suppressor electrode and reach the anode.

The net results of the "active" biasing scheme, and the simpler "passive" scheme, are reduced electron power losses, an increased intra-cathode region, and/or an increased operating pressure to continue the high-resistance discharge for a given applied current and voltage. The leeching effect with electron suppression has the capability to increase the efficiency of neutron production by several orders of magnitude.

C. Leeching and Suppressor Electrode Power Supply Arrangement

Having the leeching and suppressor electrodes biased at two different voltages provides for the "active" removal of electrons. The leeching and suppressor electrodes can out-source large amounts of current (large numbers of low-energy electrons and ions) with only a small voltage difference between then. Two separate, independent high-voltage power supplies could be used to provide power to each cathode electrode; however, this arrangement may consume large amounts of power. An alternate "floating"-bias supply configuration has been developed to allow an auxiliary power supply to drive large amounts of current between the leeching and suppressor electrodes without having to supply the full cathode voltage.

This floating biasing supply consists of a main power supply and an auxiliary power supply, which supplies a voltage that is superimposed onto the applied voltage from the main power supply. Ideally, this can be accomplished by feeding the voltage from a main supply 68 into the positive terminal of an auxiliary supply 69, as shown in FIG. 23. With this arrangement, one electrode can be biased by the main supply 70, and the other electrode can be biased by the sum (or difference) of the main and auxiliary supplies 71.

This floating bias supply arrangement is more power efficient than supplying power to the leeching and suppressor electrodes independently. If two separate power supplies biased the two electrodes, both supplies would have to drive their current across the full applied high-voltages (tens of kV). In the floating bias supply arrangement, only the main supply 68 has to drive current 77 across tens of kV, while the auxiliary supply 69 drives current 78 across a voltage difference of, for example, a few kV as shown in FIG. 25. This can result in large power savings, lowering electricity costs for the user.

Another alternate configuration that uses an independently biased anode can dramatically reduce the complexity of the leeching and suppressor power supply arrangement. If an anode electrode is placed within the vacuum chamber and biased very positive with respect to ground (via a main power supply 68), the leeching and suppressor electrode voltages can be close to ground voltage, thus easier to insulate and operate than the floating-supply configuration. Such a scheme is shown in FIG. 26. It should be noted that the auxiliary power supply 69 can be attached to either the suppressor 62 or leeching electrode to achieve the desired effects. However, an exterior electrode (vacuum chamber) biased at tens of thousands of volts is unsafe. The system should be designed to prevent electrical arcing between the anode 33 and the grounded vacuum chamber 41.

D. Reduction to Practice of this Innovation

A demonstration version of the double cathode HPHRGD neutron generator has been designed, constructed, and tested to verify basic operation principles. A drawing of the double-cathode suppressor and leeching arrangement appears in FIG. 27a. The suppressor electrode made from a metal sheet 79 has small circular openings 80 that are aligned with some of the square openings of the wire-frame leeching electrode 81 to allow sufficient particle flow. Not every opening in the leeching electrode requires a corresponding opening in the suppressor electrode. A close-up view of the suppressor electrode connection 84 to its high-voltage feedthrough 83 appears in FIG. 27b. The leeching electrode connection 86 to its high-voltage feedthrough 85 appears in FIG. 27c, where the leeching electrode feedthrough connection 86 passes through the external suppressor electrode without contact. Small ceramic insulators 82 are also used to separate the two cathodes from direct electrical contact and also to provide structural support.

A photograph of the assembled suppressor and leeching electrodes appears in FIG. 28. The wires of the 13-cm diameter leeching electrode 81 can be seen through the openings 80 of the 15-cm diameter suppressor electrode 79. The double electrode configuration placed in the demonstrator HPHRGD unit (shown in FIG. 13) was powered by the floating power supply arrangement shown in FIG. 24. The main supply lead 70 was connected to the leeching electrode 81 and the negative auxiliary lead 71 was connected to the suppressor 79, providing the potential difference between them. A photograph of the discharge during this operation appears in FIG. 29. The discharge is visible primarily at the openings of the suppressor electrode.

E. Preferred Embodiment of this Innovation

Figure 27A:
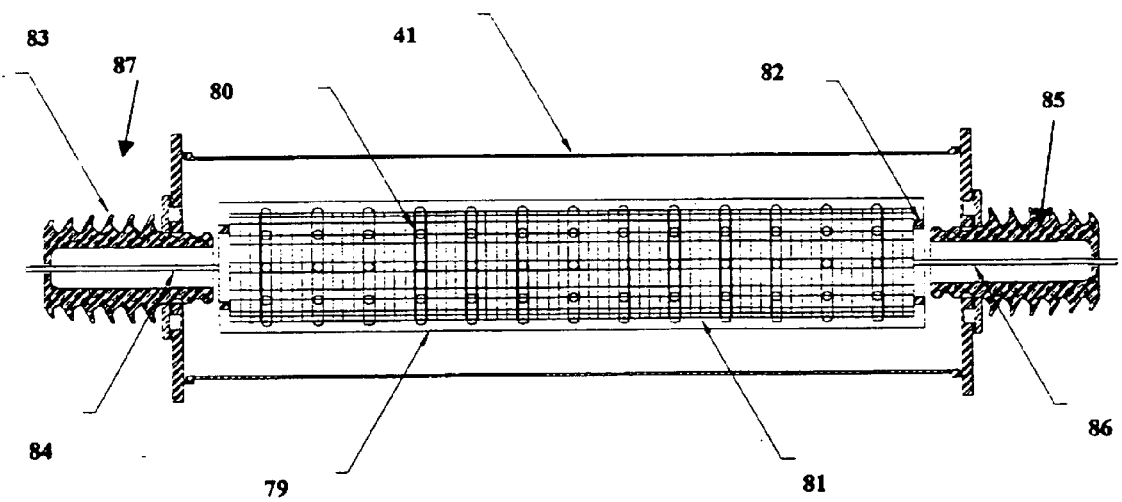
Figures 27B, 27C:
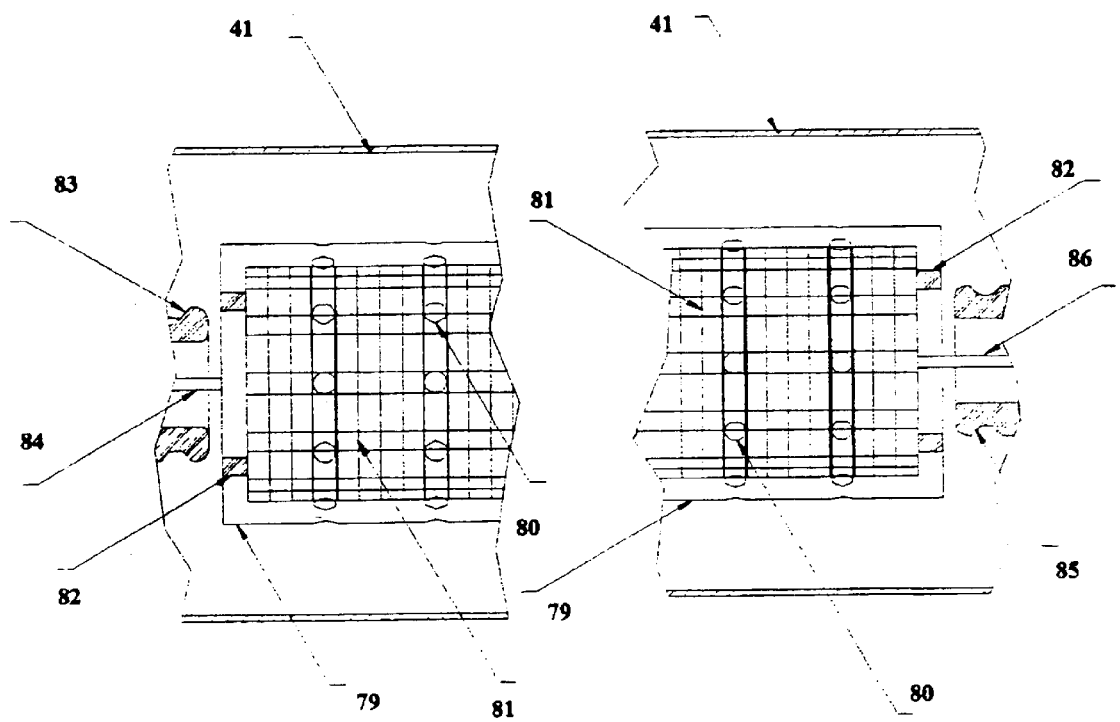

The preferred embodiment of the double cathode configuration of the HPHRGD system utilizes a linear-cylindrical configuration with two semi-transparent electrodes, as shown in FIG. 27a. The vacuum vessel 41 is electrically grounded to serve as the anode of the HPHRGD device, and is hermetically sealed with metal flanges or direct welding 87. The vessel and cathodes are made from stainless steel, or other material, with sufficient corrosion and sputtering resistance and relative ease of manufacturing. The high-voltage is supplied to the interior electrodes through the use of vacuum-tight electrical feedthroughs 83, 85 that should be made of a non-porous ceramic material insulator, such as alumina ($Al_2O_3$). A floating bias supply system is implemented for the proper biasing of the leeching and suppressor electrodes for improved power efficiency.

Other components of the preferred embodiment of the single-cathode HPHRGD neutron generator (as shown in FIG. 17) are desired for the double-cathode version. Gas management in the preferred embodiment is accomplished by using a gettering material. The getter 56 can be loaded with deuterium gas or a D-T mixture through a port or orifice 57 that is sealed after filling. The pressure can be monitored with an appropriate pressure gauge 48, and the system can be operated through an integrated control system 58. Convection cooling fins 59 can be placed on the neutron generator to increase the effectiveness of cooling to maintain or increase neutron yield with additional power.

4. Electron Repression Means for the HPHRGD Neutron Generator

A. Electron Repression Concept

The words "repression" and "suppression" have basically the same literal definition. However, we wish to draw a distinction between the two terms. The previous innovation was concerned with suppressing, or forcibly stopping, intra-cathode electrons by driving them into a second cathode, called a leeching electrode. The innovation described here represses, or limits, the number of secondary electrons produced from ion-impacts with the cathode. This distinction is prudent because the term "suppressor electrode" is used in other areas of electronics to mean an electrode that drives away electrons. In the HPHRGD neutron generator, a "repression electrode" is any electrode that restricts the penetration of electric fields through a semi-transparent electrode to reduce the amount of secondary electrons emitted by ion impacts with the electrode.

This innovation uses modulation of the cathode transparency, hole size, and hole shape to provide electric potential shaping to inhibit the production of secondary electrons from ion impact within the semi-transparent cathode. This electron repression reduces the amount of electron generation and electron current, forcing the discharge to a higher-resistance mode of operation with all other parameters held constant. This allows for the increase in the intra-cathode space for larger high-energy particle path length and for higher pressures of operation to provide more fusion targets for equivalent operating voltage and current. This innovation can be applied to both single-cathode and double-cathode HPHRGD neutron generator systems.

If the cathode surface were completely opaque, the interior region of the cathode would be at the same electric potential as the surface of the cathode. As previously noted, it is important to have long ion and fast neutral particle path lengths to gain enough high-energy particles. Therefore the cathode electrode 32 must have some degree of transparency to allow these ions and fast neutrals to propagate to sustain a high-resistance discharge. However, this transparency also allows some of the electric field from the anode-cathode gap 34 to penetrate the cathode, resulting in potential differences between the cathode and the space of the intra-cathode region 35.

These electric potential differences that exist within a semi-transparent cathode provide energy to slow charged-particle populations generated inside the intra-cathode region which can cause further ionizations or secondary-electron emission from electrode surfaces. This additional charged particle generation provides mobile charges to be drawn through the power supply as electrical current, lowering the fraction of high-energy ion current drawn and decreasing the neutron production efficiency.

The detrimental effects of "slow" charge particle production inside the semi-transparent electrode are mitigated through the electron repression techniques of this innovation. In addition to electrons released by ionization events in the intra-cathode region, "slow" ions are also produced. By reducing the maximum energy that the intra-cathode slow ions can obtain, the number of secondary electrons emitted from impacts with the cathode material is reduced. For example, in some electrode configurations at high operating voltages, over ten secondary electrons may be emitted per ion impact due to large electric potential differences inside the semi-transparent electrode. The repression of this effect increases the ion current efficiency by maximizing the use of the applied cathode potential to accelerate ions, rather than generating and accelerating electrons.

In designing a HPHRGD neutron generator, vacuum potential distributions are examined to estimate the energy of slow ion populations formed inside the intra-cathode region. The maximum "slow" ion energy is the largest potential difference between the cathode and the space inside the cathode. The effects of semi-transparent electrode geometries on the electric potentials within the cathode can be estimated to find configurations with minimal intra-cathode potential differences.

Electrons generated within the intra-cathode region, especially secondary electrons, can also be accelerated by the potential differences within the intra-cathode region. Such electrons can cause additional impact ionizations with the background gas leading to significant charged-particle production, which can possibly promote an electron-dominated glow discharge. The reduction of the intra-cathode potential difference from the electron repression concept also decreases the energy of the electrons generated within the intra-cathode region, curtailing electron-impact ionizations there.

The relationships between the vacuum potential profile and the semi-transparent electrode characteristics are described below:

1. Hole size—larger openings allow more electric field penetration into the cathode region, smaller openings limit the anode potential from entering deep into the cathode 2. Total amount of open area—when dealing with openings of the same size, having more openings (more total open area) will allow more electric field penetration into the cathode. However, individual cathode opening area has the greater effect on potential penetration.
3. Electrode gap spacing—smaller electrode gaps lead to stronger electric fields, which penetrate deeper into the cathode
4. Voltage difference—likewise, a greater voltage difference between the anode and cathode will increase the electric field outside of the cathode, leading to deeper penetration of that field inside the cathode. These changes are linearly proportional to the change in applied voltage.

To illustrate these effects, the electric potential surfaces of four different sample systems have been plotted. FIGS. 30a through 30d contain cross sectional views of the four systems, each showing a grounded anode 33, a semi-transparent cathode 32 biased at −100 kV with circular openings, and the vacuum equal potential lines 66 (potentials calculated by neglecting any presence of charged particles). Table 1 provides detailed information about the size and geometry of the four sample systems.

TABLE 1

Parameters of systems modeled to illustrate the effects of electrode and opening geometry on intra-cathode electric potentials.

| FIG # | Anode radius | Cathode radius | # of openings around cathode | Opening radius | Total opening area (per ring) | % of cathode that is open (transparency) | ΔV between center and cathode |
|---|---|---|---|---|---|---|---|
| 30a | 133 mm | 123 mm | 24 | 7 mm | 3695 mm² | 9.6% | 1400 V |
| 30b | 133 mm | 123 mm | 12 | 7 mm | 1847 mm² | 4.8% | 400 V |
| 30c | 133 mm | 123 mm | 12 | 10 mm | 3770 mm² | 9.8% | 1800 V |
| 30d | 133 mm | 90 mm | 12 | 6 mm | 1357 mm² | 4.8% | 200 V |

Figure 30A:
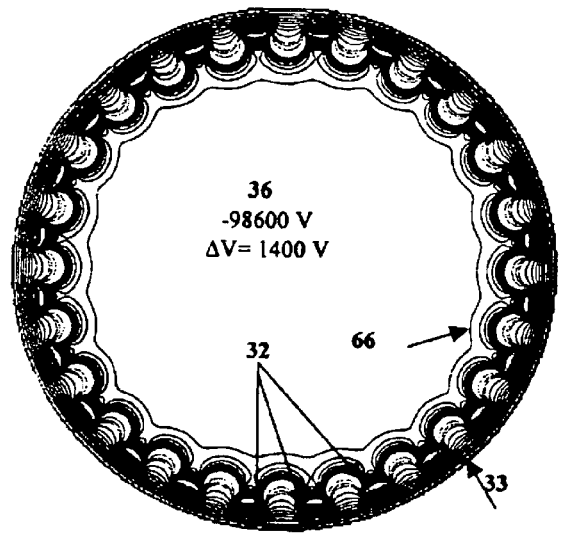

FIG. 30a shows an electric potential diagram cross-sectional view at the center of a cylindrical HPHRGD electrode system. There is a 10-mm gap between the anode and cathode 34 to provide a short distance for the P-d parameter. There are 24 circular openings around the cylindrical electrode, each with a radius of 7 mm. While the applied cathode voltage is −100 kV, the central potential 36 is −98600 V due to penetration of the anode-cathode gap electric field. An ion formed at the center of the intra-cathode region can be accelerated to 1400 eV before striking the cathode. This energy is sufficient to release a few secondary electrons, which can decrease neutron generation efficiency since those electrons carry discharge current and do not significantly contribute to high-energy heavy-particle formation.

Figure 30B:
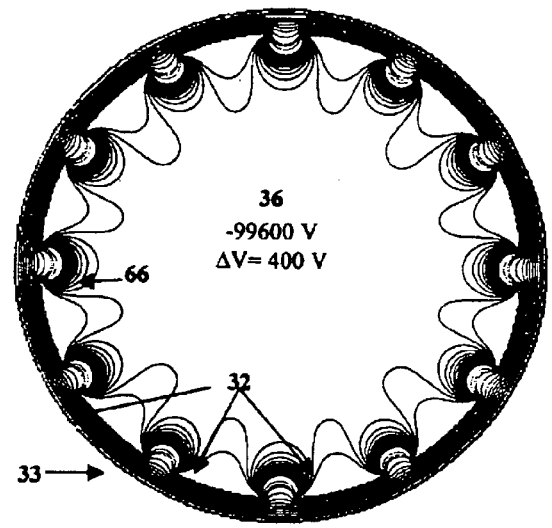

FIG. 30b shows the effects of reducing the number of openings in the cathode 32. There are only 12 openings, each the same size as in the previous figure. Reducing the number of openings in the cathode decreases the surface area through which the anode-cathode potential can penetrate inside the cathode region. As a result, with the same applied voltage the intra-cathode potential 36 is −99600 V, which is very close to the applied potential. With less of an electric potential difference inside the cathode, an ion released at the center of the device will only gain 400 eV before it strikes the cathode. At this energy, an ion-impact is unlikely to release many secondary electrons when it strikes the cathode, demonstrating the electron repression technique.

Figure 30C:
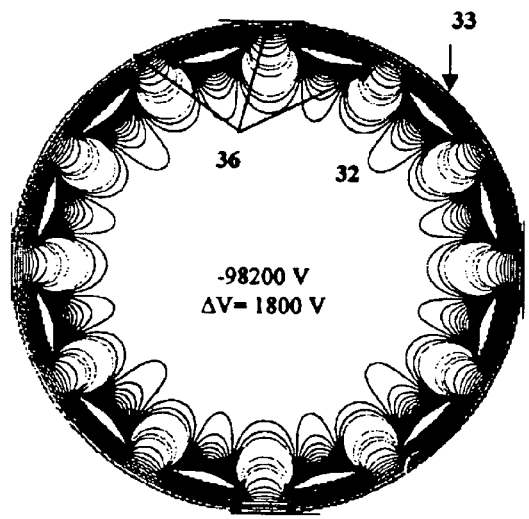

FIG. 30c shows a sample cathode configuration with 12 larger holes around the cylinder, with each hole having a radius of 10 mm. When compared to the system in FIG. 30b, it becomes clear that larger openings lead to greater anode-cathode gap 34 electric field penetration. While the cathode of FIG. 30c has almost the same open surface area and geometric transparency as the electrode in FIG. 30a, the larger openings of this electrode allow more of the anode-cathode potential to penetrate inside the cathode. This increases the potential difference between the cathode and interior region of the cathode 36. The system illustrated in FIG. 30c demonstrates that the individual electrode opening size has the greater effect on electric potentials than total electrode opening area.

Figure 30D:
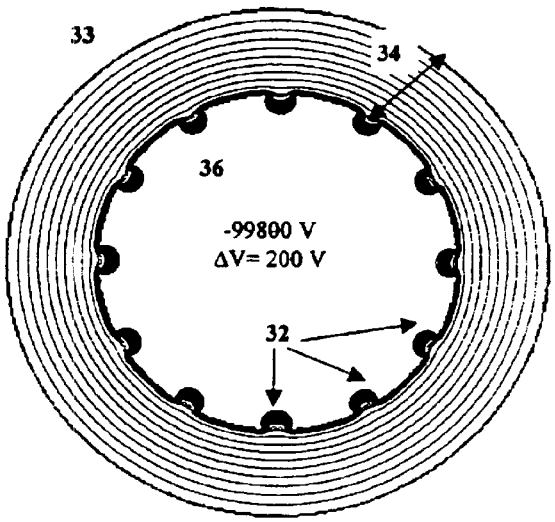

FIG. 30d shows a system with a smaller cathode 32, a larger anode-cathode gap 34, and a weaker anode-cathode electric field. The weaker field does not penetrate deeply into the cathode, resulting in a very small intra-cathode potential difference. The potential difference in FIG. 30d is smaller than the potential difference in FIG. 30b, even though the two cathodes have the same fraction of open surface area (the same transparency). Although the smaller potential difference is desired for reducing secondary electron emission, the larger anode-cathode gap provides a longer distance in the P-d parameter, resulting in a lower operating pressure. This could lead to a reduction in the rate of high-energy particle collisions inside the intra-cathode region, reducing the neutron generation rate.

A larger semi-transparent electrode 32 provides a longer path length for ionization, charge-exchange, and fusion collisions with the background gas material. However, as noted previously, as the path length increases, the number of ionization collisions inside the semi-transparent electrode increases, generating ions that are incapable of accelerating to fusion energies and electrons that are power losses in the system. Electrons and slow ions contribute little to promoting high-energy ion and fast neutral production. Repression of the electric field by limiting the cathode opening size mitigates the detrimental effects of secondary electron production in the larger intra-cathode region.

While the effects of electron repression are beneficial, the techniques should not be carried out to an extreme limit. The reduction of the cathode opening size limits the penetration of the anode-cathode gap electric field, but also limits the number of heavy particles that can pass through the cathode region. If the openings are too small, insufficient amounts of heavy-particles will pass through the intra-cathode region and the gaseous discharge will lose the benefits of the semi-transparent electrode, since the path length of the intra-cathode region helps to sustain the high-resistance discharge mode.

B. Reduction to Practice of this Innovation

A drawing of a repression-style electrode 88 in a long cylindrical HPHRGD system appears in FIG. 31. The cathode openings 89 are small to reduce the electric field penetration into the cathode. A photograph of a repression style-electrode appears in FIG. 32. This particular electrode has served as the suppressor electrode in the double-cathode arrangement shown in FIG. 28. It is made of 0.005-inch (0.127-mm) thick stainless steel shim stock material. The holes are 1 cm in diameter and are symmetrically spaced 5 cm apart.

C. Preferred Embodiment of this Innovation

The preferred embodiment is a long concentric cylindrical system, with one or more cathodes made out of a thin tube of metal with symmetric circular holes cut from it. This symmetric arrangement allows the fast neutrals that are generated from fast ions passing through the intra-cathode space to exit the opposing side of the electrode and transit to the opposing anode. Since neutron generation occurs along high-energy particle pathways, the number and arrangement of holes will also affect the neutron source distribution profile.

The holes in the cathode surface are sized in relation to the anode-cathode gap distance and the total device size to provide adequate ion and fast-neutral passage through the intra-cathode region for each particular P-d parameter and geometric configuration. As stated, these parameters affect the potential field inside the cathode for electron repression. Repression-style electrodes can be used in both single-cathode and double-cathode HPHRGD neutron generator systems.

5. Baffling System for the HPHRGD Neutron Generator

A. Baffle Inhibitor Concept

Figure 33A:
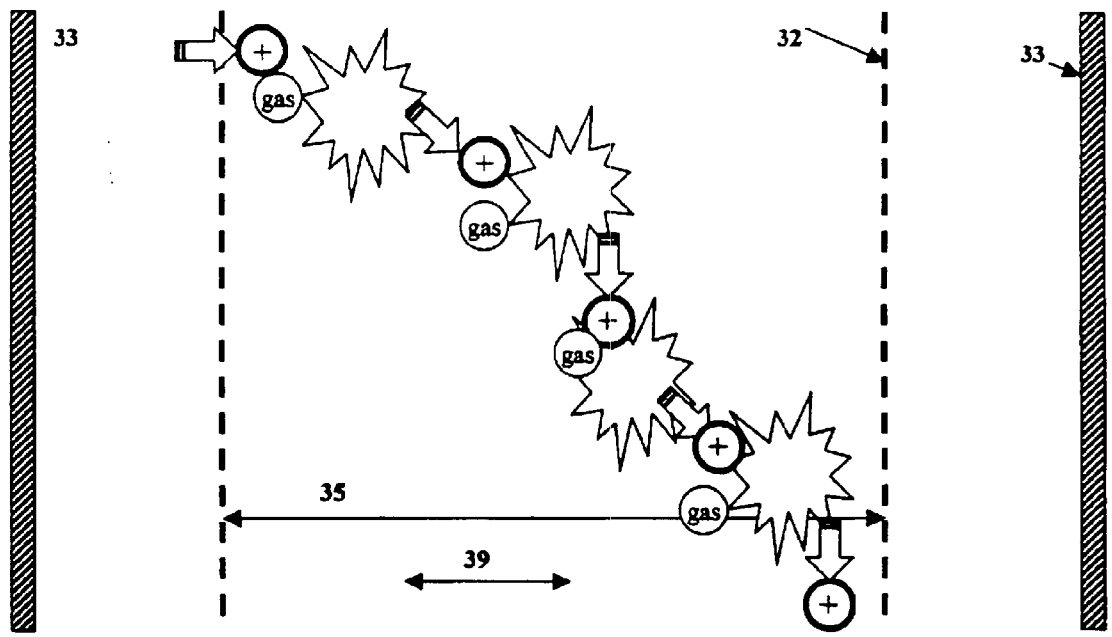

One aspect of particle motion through the cathode region of the HPHRGD neutron generator is that particles do not always have constant, straight-line trajectories. Collisions between particles can cause scattering, sending particles on a path toward a solid portion of an electrode, or in some geometries, across the intra-cathode region 35 perpendicular to the preferred direction of travel 39. After scattering, the errant particles can cause ionizations within the cathode in locations not favorable for sustaining the high-resistance discharge, as shown in FIG. 33a. The errant particles and any ions they create can liberate secondary electrons after colliding with an electrode.

Figure 33B:
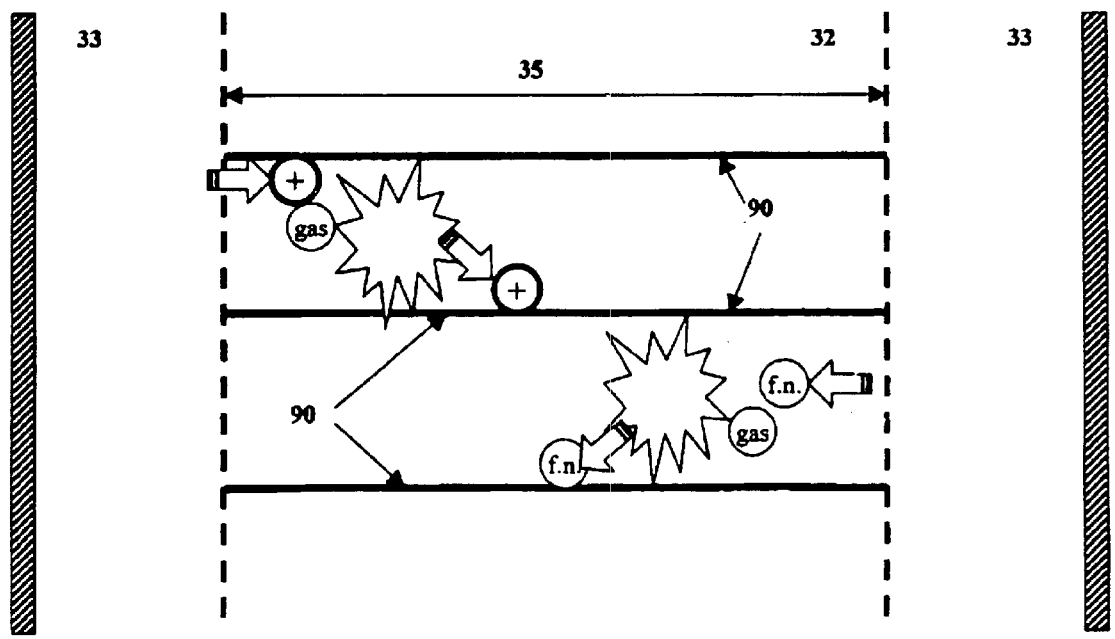

A system of baffles 90 can be placed inside the cathode region of the HPHRGD neutron generator to intercept particles that are not traveling in the preferred direction, as shown in FIG. 33b. By intercepting these particles, the discharge does not develop further in the undesirable locations, limiting discharge to favorable locations with particles traveling in the preferred direction. For systems with the leeching and suppressor arrangement, the baffles should be placed inside the leeching electrode to accomplish this goal. In the case of a long concentric cylindrical system, the baffles 90 are designed to restrict particle flow in the axial (lengthwise) direction inside the intra-cathode region 35. Each individual baffle can be constructed so that it may be semi-transparent, or may be opaque. The semi-transparent baffles will allow some particles to travel in the direction that is not desired, whereas opaque baffles will prevent such motion to keep particles traveling in the preferred direction.

There are several possible combinations of baffling systems that can be used with the HPHRGD neutron generator with varying degrees of effectiveness. The variations depend on the style of individual baffles (semi-transparent or opaque), baffle material (conductor or insulator), and their electrical connections (each baffle floating independently, baffles connected to another electrode, or baffles connected to each other but not to other electrode). The choice of cathode electrode structure (a single cathode, or a leeching and suppressor arrangement) also has an effect on the performance of the baffle system. FIG. 34 depicts an opaque baffling system 90 inside the HPHRGD neutron generator with leeching 63 and suppressor 62 electrodes. As demonstrated in FIG. 35, the baffles 90 must be spaced so as not to interfere with the openings of the semi-transparent electrodes and to provide paths for discharge particles to travel 91.

If the baffle system 90 is electrically connected to the leeching electrode 63, the baffles act as an extension of the leeching electrode. As part of the biased leeching electrode, the baffles will restrict particle motion in directions that are not desired and inhibit plasma sheath formation, which occurs with the transition to an electron-dominated low-resistance glow discharge. The powered leech and baffle system also decreases the distance that electrons must travel before being removed from the discharge and decreases the energy acquired by these electrons before their removal. These factors reduce the probability of those electrons initiating further ionization collisions.

If both the baffle system 90 and the leeching electrode 63 are floating, the entire baffle and leech system provides "passive" recombination sites for ion-electron pairs, removing charged particles with no power loss. The smaller floating potential difference combined with the larger combined surface area of the leeching electrode and baffles readily allows electron absorption.

The baffle system can also be utilized as a separate electrode within both the suppressor and leeching electrodes. The independent baffle electrode system can be electrically isolated from the leeching electrode so as to be electrically floating to intercept mobile electrons and charge negatively with respect to the local potential 92 inside the leeching electrode, as shown in FIG. 36. This will attract low energy-ions toward the baffle surfaces 90, where they can recombine with electrons, removing both ions and electrons from the system without power loss. FIG. 37 shows a generalized electric potential diagram of the biased leeching 63 and suppression 62 system with a floating baffle system. Low-energy ions formed inside the leeching electrode would be drawn toward the lower-potential baffles (the dotted line 92). Electrons generated inside the leeching electrode that are not intercepted by the baffles will not be able to overcome the saddle-point potential 67 and therefore be attracted directly toward the leeching electrode 63.

As long as the secondary electrons are suppressed and collected by a leeching electrode, the interception of scattered particles limits the discharge to occur only in favorable locations (namely, through the openings of the electrodes) with ions and fast neutrals traveling in the preferred directions.

In the double cathode configuration, the voltages on the leeching and suppressor electrodes should be selected to provide electric fields that keep low-energy electrons from reaching the anode by driving them to the leeching electrode (or the baffles). Some low-energy ions generated inside the leeching electrode will be attracted toward the baffles, instead of the suppressor electrode where they would produce more secondary electrons. This system with three different cathode electrodes and two different bias voltages should provide favorable conditions for generating neutrons with a high-pressure high-resistance gaseous discharge device.

If total control of the electrode potentials is desired, the baffle system could be biased independently of both the leeching and suppressor electrodes. By biasing the baffles at a potential slightly more negative than the leeching electrode, low-energy ions can be drawn from the discharge, all but eliminating secondary electron emission caused by those particles.

In instances with a single cathode electrode (without leeching and suppression electrodes), a baffling system can have two very different effects. If the baffles are electrically connected to the single cathode (producing a cathode with extended surfaces), the ions and fast neutrals that strike the baffles will liberate secondary electrons that are accelerated toward the anode. However, the baffles also restrict the motion of particles, limiting errant particle ionizations in the intra-cathode region. This arrangement is desirable for large electrode systems to sustain a high-resistance discharge. The other alternative is to place a set of floating baffles within the single electrode. Such a configuration provides the benefits of the suppressor and passive floating leeching electrode, and the benefits of a baffle system. As mentioned before, these qualities shift the operating P-d parameter needed to sustain an equivalent discharge voltage and current (as shown in FIG. 5), which results in improved neutron generation efficiency B. Reduction to Practice of this Innovation In the long cylindrical geometry of the testing demonstrator device, baffle inhibitors were placed within a single cathode configuration. FIG. 38 shows a photograph of the series of metal discs 90 attached within a wire-frame cathode 42. In this reduction-to-practice, the baffle discs were equally spaced inline with the openings of the wire-frame cathode. The baffled electrode shown was used in the HPHRGD demonstration unit from FIG. 13. FIG. 39 shows a photograph of the high-pressure high-resistance gaseous discharge operating with the described electrode arrangement.

Additionally, FIG. 40 shows a photograph of the reduction to practice of baffle inhibitors in a double cathode assembly. Again, in this photograph the baffles 90 are thin metal discs. They are placed inside a wire-frame leeching electrode 81 in locations near the openings of the suppressor electrode 80. Because the baffle discs are attached directly to the wire framework of the leeching electrode, a drawing of this arrangement similar to FIG. 27 would not clearly show the baffles connected to the leeching electrode. FIG. 40 also depicts the ceramic insulators 82 used to separate the leeching and suppressor electrodes.

C. Preferred Embodiment of this Innovation

The preferred embodiment for the implementation of a baffling system is in conjunction with the leeching and suppressor system described in the previous section. The preferred geometry is a long cylindrical configuration where the baffle inhibitors are placed near the openings of the semi-transparent cathodes. Each baffle plate is oriented so as to intercept particles within the electrode to reduce the distance over which errant particles travel axially.

The baffle inhibitors can be used in both the single and double cathode arrangements. In the double-cathode long-cylindrical HPHRGD configuration, the baffle plates should be electrically connected to the leeching electrode and made from thin sheets to prevent the axial transmission of particles and reduce the distance to the leeching electrode from points within the intra-cathode region. Thin-sheet baffles should also be used in the single-cathode long-cylindrical HPHRGD configuration for the same reasons.

6. Surface Material Selection and Treatment for Optimization of the HPHRGD Neutron Generator A. Surface Treatment Concept Specifically, this innovation assists the HPHRGD neutron generator by altering charged particle production through surface enhancements. Surface effects, such as electron-ion recombination, physisorption, chemisorption, hydration, secondary electron emission and thermionic electron emission may be beneficial or detrimental to the discharge performance. Enhancing or minimizing these effects at each electrode can increase the high-energy heavy-particle fraction of the discharge current and decrease electron power losses.

The electrode (anode, cathodes, and baffles) surface properties of the HPHRGD neutron generator affect the pressures of operation, electrode configuration, and charged particle path lengths within the device. The electrical resistance properties of the gaseous discharge can be altered by employing electrode materials, coatings, or treatments with specific properties, improving the neutron generating power efficiency of the HPHRGD neutron generator. Changes in the discharge resistance manifest as shifts in the operational P-d characteristic of the system, as shown in FIG. 5. A greater effective resistance from surface treatments or material selection can allow a higher pressure of operation and/or longer discharge path length for high-energy heavy particle discharge sustainment. As previously stated, greater amounts of high-energy heavy particle collisions with the background gas will result in a corresponding increase in neutron-producing collisions.

The anode materials can be constructed or treated to promote electron and fast-neutral surface ionization and reflection. These processes can increase high-energy ion populations in the high-resistance discharge, resulting in a larger heavy particle (ion and fast neutral) current fraction. The anode material can also have excellent gas absorbing characteristics to provide additional targets for increased collisions and ionizations at the surface of the anode.

The cathode materials can be constructed or treated to inhibit the ejection of electrons from particle impacts or thermionic emission. This is usually achieved by using a high-work function material that requires a large transfer of momentum for electrons to escape the surface barrier potential. Reduction of secondary and thermionic electron emission increases the effective resistance of the discharge, forcing larger ion and fast neutral currents to sustain the discharge at an equivalent current and voltage relation.

Ion-electron recombination is a three-body reaction, requiring a surface material to be present for effective electron attachment to the ion. The leeching electrode and/or baffle systems can be constructed or treated to promote surface recombination sites for more frequent charge neutralization. This larger "passive" current removal capability can lead to a higher effective resistance in the gaseous discharge, further shifting the P-d operating curve (as shown in FIG. 5) to increase the neutron generation rate without increasing power.

In addition, the physical sputtering of the electrode surfaces can be minimized through material selection, inhibiting the addition of heavy metal particles into the discharge that can lower the resistance of the discharge and adversely affect neutron production efficiency.

Surface treatments, including a variety of techniques such as electroplating, physical vapor deposition (PVD) and chemical vapor deposition (CVD), can be used to coat an electrode surface with a different material. Ion implantation can also be used insert elements deeper into the structure of the electrode. Sputter deposition, PVD, and CVD can provide smooth electrode surfaces, reducing the number of recombination sites on the electrode surface. Ion bombardment, chemical etching, and other macroscopic surface techniques, such as sand blasting, can roughen the electrode surfaces to provide more surface sites for recombination.

In summary, the alteration of the charged particle production processes at the surfaces in the discharge system lead to a new operating resistance and operating P-d curve for a specific electrode geometry. If the lossy electron processes are minimized and the beneficial high-energy processes are enhanced, the discharge parameters also change to allow a higher pressure of operation and/or increased intra-cathode electrode path length for high-energy heavy-particle transit and higher neutron production efficiency.

B. Reduction to Practice of this Innovation

Preliminary testing with the HPHRGD demonstration unit indicates that stainless steel is a suitable material for electrode construction. It has performed better than plain steel, galvanized steel and aluminum due to its lower sputtering yield and secondary electron emission coefficients.

C. Preferred Embodiment of this Innovation

The preferred embodiment for this innovation is the application of surface treatments and material choice to limit the secondary electron emission from the cathode electrodes, to increase the gas attached to the anode and/or secondary electron emission at the anode, to increase heavy particle reflection off the anode, to increase surface recombination on the passive leech and/or baffles, and to provide good thermal characteristics for power dissipation at high current operation.

In the preferred embodiment, the concentric cylindrical cathode array benefits from construction materials with reduced secondary and thermionic electron emission. The leeching electrode and baffles in the intra-cathode region are treated to have enhanced surface recombination attachment sites. The anode is treated so that it can absorb greater amounts of deuterium gas on its surface and to allow for greater surface ionization.

7. Optimization of the HPHRGD Neutron Generator

A. HPHRGD Neutron Generator Optimization Concept

The innovations described in the previous sections can be combined in whole or in part to improve the neutron production efficiency, that is increase the yield of the HPHRGD neutron generator without significantly changing the input power. These innovations accomplish this by decreasing the negative effects of low-energy electrons while promoting the effects of high-energy positive ions and fast neutrals in the gaseous discharge. With all other discharge parameters constant, these changes in discharge particle distributions tend to increase the resistance of the gaseous discharge, allowing increased high-energy particle path lengths, increased gas pressure, or both, to maintain an equivalent discharge voltage and current. Increasing the particle path lengths and/or pressure in this manner can increase the neutron generation rate. FIG. 41 shows predictions of neutron outputs based on successive implementation of the innovations described in previous sections.

Charged particle production can be increased by increasing the number of background gas particles to provide more collision targets and by extending the path length of the high-energy heavy particles so that the likelihood of collisions increases. Such increase can be brought about through techniques such as electron repression, electron suppression, and by altering surface material properties. These techniques shift the sustainment curve of operating voltage vs. P-d up and to the right. This represents the change in pressure and/or distance needed to maintain the level of current in the high-resistance discharge mode. Qualitatively the operating curve shifts of successive innovations are represented in FIG. 5. As noted earlier, increasing the number and average energy of high-energy deuterium particles and increasing the number of collisions with background gas targets along their path length will result in increased neutron production.

The optimization of the electrode gap spacing of the HPHRGD neutron generator with the implementation of electron repression, baffle inhibitors, and enhanced surface effects is the subject of this innovation. It deals primarily with manipulating the various collision reaction rates within the system to increase the rate of neutron-producing reactions. Several important parameters such as device construction, geometry of the electrodes, and device length, affect the voltage and current ranges of the HPHRGD system for a given pressure, a gas pressure that directly influences the collision reaction rate density. The voltage of the system, to the first order, determines the maximum energy of the ions and fast-neutral particles within the system. Optimization of neutron yield does not necessarily correspond to the most energy efficient ion and fast-neutral production in the high-resistance discharge system. This is due to the differences in the magnitudes of the cross sections and energy necessary for fusion, ionization, and charge-exchange reactions.

To increase the neutron output, the current driven through the gaseous discharge device between the anode and cathode assembly can be increased, resulting in an approximately proportional increase in particle collisions, including fusion collisions. However, the maximum input power is generally determined by the thermal limitations of the device, including factors such as electrode melting temperature, ceramic-metal interface expansion, or simply the device becoming too hot to safely operate. Increasing the applied voltage between the electrodes can also increase neutron output, since the fusion probability increases as particle energies approach the peak of the fusion cross-section. As stated earlier, the fusion reaction rate can also be increased with the use of longer path lengths for high-energy collisions. The quantity of gas pressure times the distance of travel of a particle is proportional to the total number of "targets" with which a deuterium particle may interact. Thus, a high gas pressure and a longer distance over which the particle travels at high-energy will increase the collision rate, with a corresponding increase in the number of fusion events.

The distance that a deuterium particle travels while at high energy is influenced by the electrode design, electric potential configuration, and gas pressure in the system. Charged ions may have the energy gained from the anode-cathode gap electric field, while fast neutral particles have the energy that the ions had before being neutralized through the charge-exchange collision. Depending on their starting location, ions can be accelerated to the full potential by the anode-cathode gap electric field, but are also affected by other electric fields present. Fast neutrals can travel throughout the entire device and can interact anywhere within the discharge, but once created cannot be further accelerated or increased in energy. Fast-neutral particles are desired in the high-resistance discharge system because they cause collisions throughout the system, especially near the anode where new ions can be generated from surface collision interactions with gas present on the anode surface. The ion-to-fast-neutral conversion reaction is energy dependent and has a greater probability of occurring at lower energies. However, with enough path length, most ions can become high-energy fast neutrals.

With the addition of electron repression, baffles, and surface enhancements, there are many more pressure and electrode configurations for a given geometry. The semi-transparent electrode size can be altered to provide the path length needed for fast neutrals to transit throughout the device and allow enough intra-cathode space for ions to charge exchange into fast neutrals. A short distance provides a strong electric field to rapidly accelerate charged particles, and also decreases the path length over which ionizations can occur. Likewise, if the gas pressure is raised sufficiently high, the charged particle production in the anode-cathode gap can be a large source of discharge current.

Thus, as the interior region of the semi-transparent cathode is increased, a greater number of electron and ion pairs can be generated inside the region. However, the amount of ion-to-fast neutral conversion via charge-exchange also increases with the length of the interior region of the cathode, leading to an increased fusion reaction rate. Optimization of the device is achieved by balancing the positive effects of this increased reaction zone with the negative effects of additional electron power loss through electrode collisions and gas ionization. These negative intra-cathode particle generation effects are offset through electron repression, baffle inhibitors, and surface enhancements. The optimization of sustaining P-d leads to increased device performance, higher voltage operation, and increased neutron yield. The optimization of the HPHRGD neutron generator also includes balancing the ion and electron current fractions to maximize the energy transfer to high-energy ions and minimize the amount of energy taken by electrons Decreasing gas pressure generally can increase operational voltage, since less background gas targets effectively increase the resistance of the gaseous discharge. Hence, an increased voltage is needed to provide more energetic heavy-particle interactions to sustain the same amount of discharge current. However, as stated earlier, an increased operating pressure is desired due to the increase in number of gas targets for fusion.

The HPHRGD system utilizes near-vacuum potentials formed by the anode-cathode electrode arrangement for particle acceleration. Space charge dominated regions with large charged particle densities can lower the gaseous discharge resistance, sending the discharge into a low-resistance mode. The optimizations for the HPHRGD system minimize space-charge fields by allowing the rapid removal of excess electrons and by not trapping ions within the discharge, preventing large power losses and maintaining a high-resistance operation. This system attempts to eliminate excess electron generation through suppression of secondary electrons from electrode surfaces and low-energy electron extraction. Electrons, a necessary by-product of the formation of high-energy heavy particles, serve little purpose in the high-resistance gaseous discharge since their energies are often too large for ionization collisions at useful locations near the anode. Most discharge electron effects draw energy from the system, decreasing power efficiency for neutron generation.

Thus, a balance of pressure, voltage, current, electrode geometry, and device dimensions can lead to optimized neutron production in the HPHRGD neutron generator. There are a nearly infinite number of combinations, with each system design having a range of pressures, currents and voltages for operation in the high-resistance discharge mode. Optimization is achieved by balancing the power losses in the system with gains in neutron production to provide a maximum neutron yield. Higher power operation increases the total fusion reaction rate through heavy particle impacts, but this effect is counter-balanced by the generation of larger quantities of electrons through heavy particle impacts, which reduce the ion current fraction in the system. Both the single cathode and double cathode HPHRGD neutron generating systems can utilize these optimization techniques.

B. Reduction to Practice of this Innovation

The combination of electron repression, baffle inhibitors, and material selection has been applied to the double-cathode HPHRGD demonstration unit. The baffle and leeching electrode combination of FIG. 40 and the repression-style suppressor electrode from FIG. 32 were combined to make the stainless steel cathode assembly, similar to the assembly shown in FIG. 28. The gaseous discharge resulting from this arrangement, which was similar to the discharge shown in FIG. 29, had an operating pressure four times that of the single-cathode discharge, shown in FIG. 15, for equivalent resistance.

C. Preferred Embodiment of the HPHRGD Neutron Generator

A long, concentric cylindrical geometry is preferred for ease of construction, minimal cost, simple design, and an effectively uniform and linear neutron production zone. The neutrons that are produced can have 2.45 MeV of energy if they are formed by D-D fusion reactions, or can have 14.1 MeV of energy if formed by D-T fusion reactions. Either a deuterium and tritium mixture or deuterium only can be used as the fusible gas; the choice should be based on the needs of the particular application.

A diagram of the preferred embodiment appears in FIG. 42 for a double cathode system. The cylindrical vacuum chamber 41 serves as the grounded anode of the discharge system. The preferred chamber would be made of a material that has excellent thermal conduction and convection properties, and has a surface treated to allow more hydrogen isotope gas to be attached to its surface. The device should be sized in length and diameter to meet the needs of the application. The device should also be outfitted with an active cooling system, which may include cooling fins 59 or coolant channels, and means of propelling the fluid (air, water, or other coolant) for forced convection heat transfer.

For a double cathode configuration, baffle inhibitors, material choice and an electron repression system are employed with the cathode electrodes. The suppressor electrode 62 should be a repression-style electrode with small openings to limit the penetration of electric fields through the suppressor. The suppressor should be located concentrically within the anode vacuum chamber 41 and be sized to provide an anode-suppressor gap that permits high-pressure operation without danger of electrical arcing between the two electrodes. The material selected for the suppressor should have a low secondary electron emission coefficient and good sputtering resistance.

The leeching electrode 63 should also be a repression-style and have openings that are aligned with the suppressor openings (I disagree with this entirely. If the leech is also a repression-style electrode, then the ions will not be able to easily escape, resulting in ion space charge that negates the operation of the leech electrode and requires a higher leech-suppressor bias voltage. Furthermore, if the only means of loss for low-energy ions is through holes that align with suppressor holes, then all of the secondary electrons liberated from the suppressor will be born in a location that would result in these electrons going directly to the anode instead of the leech. I think that the leech should be a wire-frame electrode with baffles.). The leeching electrode should be placed concentrically within the suppressor electrode, and sized to provide long intra-cathode path lengths and a leech-suppressor gap that will support electric potentials to repel low-energy electrons away from the suppressor electrode. The leeching electrode and baffles should be made of a material that does not readily emit electrons. The baffle plates 90 should be opaque (without openings), and spaced far enough apart to allow high-energy ions and fast-neutrals to travel across the diameter of the intra-cathode region.

Ceramic high-voltage feedthroughs 83, 85 should be used to supply power to the leeching and suppressor electrodes. A getter system 56 should be used to store gas and control the gas pressure within the HPHRGD neutron generator. The vacuum chamber should be fitted with means for loading and evacuating gas during maintenance 57, and should be fitted with pressure 48 and temperature sensors to measure the conditions within the chamber. A "floating" power supply arrangement should be used to provide electricity to the leeching and suppressor electrodes and conserve electrical power. Finally, an automatic control system 58 should be implemented to operate the HPHRGD neutron generator.

8. Online Industrial Process Control and Material Analysis with the HPHRGD Neutron Generator A. Material Analysis and Process Control Concept with the HPHRGD Neutron Generator This innovation is a complete online material monitoring system with the capability of analyzing and controlling an industrial process in real time. It utilizes the HPHRGD neutron source and combines it with an energy-sensitive detection system (including gamma and neutron systems), comprising a data acquisition system, mechanism for data analysis, and an interface to output analysis results. The radiation detection and assay system can be adapted to meet the conditions required for the material to be analyzed, and the data can be output to an industrial controller for performing a process or achieving a desired effect.

Chemical element identifying techniques such as prompt gamma and delayed gamma neutron activation analysis (PGNA and DGNA) utilize neutron interactions with individual elements contained within material to yield a characteristic gamma-ray spectrum that elucidates the material's contents. These techniques are useful for making measurements in hazardous environments, quantifying potentially dangerous materials, and for real-time analysis of bulk material. In addition, other neutron analysis techniques, such as thermalization analysis, utilize measurements of neutron energies before and after passing through material to determine its various properties, including density, porosity, thickness, and moisture content. Additionally, an array of energy sensitive neutron detectors can be used to measure the neutron energy spectra at many locations after passing through the material. This arrangement will provide material property information with a degree of spatial resolution, giving more insight into the material properties of the interrogated object. The results of each individual post-material detector can be compared to results from a lone pre-material detector to perform the desired analysis.

When using PGNA or DGNA techniques, the gamma-sensing system can use any type of detector, such as a germanium semiconductor, sodium-iodide crystal, or plastic scintillator, as long as the detector's energy resolution is sufficient for the application. A device, such as a multi-channel analyzer, receives the signals from each detector and the results are processed in a data acquisition and processing system for specific elemental resolution. This processing system can be based on the referenced elemental cross sections for nuclear interaction, and/or can be calibrated with known amounts of chemical elements and verified neutron levels.

The gamma spectroscopy system can be designed to utilize the advantages of a particular HPHRGD neutron source geometry. For example, the preferred near-term embodiment of a long-cylindrical neutron source 10 produces a nearly-linear neutron source profile. Individual gamma detectors 14 can be placed in an array to collect prompt gamma-rays 13 from the irradiated material 12 moving on a conveyor belt 17, as shown in FIG. 43. A disc (short cylindrical) neutron source 94 can be used with a gamma detector array 14 to give a general indication of the location of certain elements within the material, as shown in FIG. 44. Also, detectors 14 can be placed around a tube if the material being analyzed 12 is flowing in a pipe 95, as shown in FIG. 45 using a toroidal neutron source 96 as an example.

In each of these examples, an integrated neutron source controller and data acquisition and analysis system 93 can be implemented to handle the various operational aspects of the system, including the HPHRGD power supply 16.

Neutron activation analysis can also be used to provide an indication of how fast the interrogated material is traveling. For example, if the interrogated material contains sufficient quantities of elements with a short half-life after activation (such as oxygen), the decay of the activated material can be measured downstream of the irradiation point. If the flow rate is constant, each unit of distance the activated material travels is proportional to the amount of time that has elapsed since activation (distance=speed×time). Detectors spaced along the flow length measure the characteristic gamma rays from the irradiated material. Each successive detector registers an exponentially decreasing number of counts from the activated material, corresponding to an amount of time elapsed since activation. By comparing the measurements with the known half-life of the activated material, the material's flow rate can be calculated.

Other material properties can be ascertained by using neutron thermalization and attenuation techniques. Such techniques involve energy-sensitive measurements of neutron flux with appropriate detectors before and after passing through the material being interrogated. Energy sensitive neutron detectors, such as NE213 plastic scintillators or proton-recoil detectors, can measure the neutron energy spectra needed to perform these material analysis techniques. The neutron energy spectra can be analyzed to determine the fraction of energy the neutrons have lost and how many have been absorbed by the material. With these results, the neutron absorption and thermalization properties can be determined, which can lead to the calculation or estimation of other properties.

If the thickness of the material is known, the mean atomic weight of the material can be estimated directly from the amount of neutron thermalization, which can lead to an estimation of the chemical content. Also, if the material is known to be non-porous, the material's density can be calculated by knowing the thickness. Likewise, knowledge of a porous material's density and thickness can be used to determine its porosity. Finally, if the material is known to be a certain composition with a certain density and is non-porous, its thickness can be calculated based on the amount of neutron absorption and thermalization.

Moisture content of a material can be measured utilizing a combination of neutron and gamma spectroscopy techniques. The neutron energy spectrum of a "dry" standard can be compared to the spectrum of a "wet" sample to determine the amount of neutron absorption and thermalization by the water in the "wet" material. This will give an indication of how much water is in the moisture-laden material. Also, the energy-sensitive gamma detectors can detect prompt gammas emitted by both hydrogen and oxygen. The determination of the amount of H and O present gives an indication of the total water content, assuming that those elements are not supposed to be present within the "dry" material. These measurements can be made simultaneously to ensure a correct analysis of the moisture content. Thus, there are a host of neutron-based diagnostic techniques that can utilize the advantages of the HPHRGD neutron generator.

One detector needs to measure the neutrons before they pass through the material, and another detector measures them after going through the material. The HPHRGD neutron generator is perfectly suited for this application, with its uniform and multiple arrangements of generating neutrons. The detector that measures the pre-material neutron spectrum can be located on the opposite side of the generator, or at a location where the material is not present. This allows the material to be placed as close as possible to neutron source without having to place the pre-material detector between the source and material.

The control system for the HPHRGD neutron generator can be integrated with an industrial process controller to provide a common interface for neutron generator operation, data analysis and process control 15. An industrial process controller provides the necessary output signals to the process control system based on the evaluation of the data from the applicable radiation detectors, measuring the results of material interactions with neutrons, which are produced by the HPHRGD neutron generator. Some examples of process control include: controlling the flow or direction of material along a conveyor belt after inspection, monitoring the mass flow rate or void fraction of liquid through pipes, monitoring and controlling the thickness of a material being rolled or assembled, heating objects to desired temperatures, and controlling the addition of chemicals into a mixture.

In the specific application of mined mineral analysis, the material is ore that has been mined. The desired information is the chemical composition of the minerals. Once this is known, the minerals can be sorted, transported, collected, or treated. FIG. 46 depicts a sample illustration of an online mineral analysis system using an HPHRGD neutron source 10, a conveyor belt 17 to move material 12 into position for analysis, and means to divert the conveyor belt contents 18 based on the chemical composition of the material being analyzed.

In the example of analyzing and directing slurry or liquid flow through a system of pipes 95, the material 12 is generally a liquid, although there may be some multi-phase flow with solid material or gas in the system as well. The desired information, including the chemical composition of the material, its moisture content, its void fraction, or its flow rate, can be input into a flow control algorithm. Having determined the necessary properties, the flow can be diverted through the pipe network so that it can reach an appropriate destination, or be regulated to adjust how or when the flow reaches its destination. FIG. 47 depicts a sample illustration of an online flow analysis system with an annular HPHRGD neutron source 97 to uniformly irradiate the material as it flows through the pipe 95, detection equipment 14 to make material analysis measurements, an integrated source controller, data analyzer, and flow controller 98, and means to control the flow 99.

In the examples of material (such as metal, plastic, or other substance) forming processes, which include but are not limited to rolling, pressing, and extruding, the desired information is a material property, such as thickness, density, or porosity. Having determined the specific property of the material, that information can be used to adjust the process that formed the material, if an adjustment is necessary. This form of quality control feedback can curtail the production of poor material. FIG. 48 depicts a sample illustration of a rolled material analysis and control system to monitor material quality. It contains a planar HPHRGD neutron generator 100 (although a cylindrical source could also be used), neutron detectors to measure particle distributions before 101 and after 102 passing through the material 103 after it goes through the rollers 106. The integrated control system and data analyzer 104 can determine the desired material properties and feed controls back to the means of adjusting the rolling process 105.

The novelty of these applications lies in the use of the HPHRGD neutron generator, with its enhanced geometry, long lifetime, and strong neutron emission over wide areas; and in the ability to combine the industrial process controller, the neutron generator controller, and data acquisition system into a single unit. The geometries of the HPHRGD neutron generator can improve assay efficiency through specific neutron source distributions, such as the application of a nearly uniform neutron field over large areas. Such neutron fields can be used effectively to determine material properties and chemical compositions, even in heterogeneous materials. The neutron source can be cylindrical (linear) or planar for irradiating wide areas across a conveyor, or may be toroidal (donut shaped) or annular to irradiate a round area, such as a pipe. The linear and planar geometries provide extra surface area for diagnostic neutron measurements, which is especially useful in neutron thermalization analysis techniques.

The integration of the process controller, neutron source controller, and data acquisition system 15 simplifies the control of the industrial process to reduce the need for operator intervention. A well-designed system can be programmed to run autonomously, without an operator present. Such a system would be useful in hazardous areas, such as mine shafts, where a reduced human presence is desired for increased safety. Multiple gas-target neutron analyzers 160 can be run in concert, with a central data processing unit monitoring/adjusting several industrial processes, as shown in FIG. 58.

B. Preferred Embodiment of this Innovation

Figure 1:
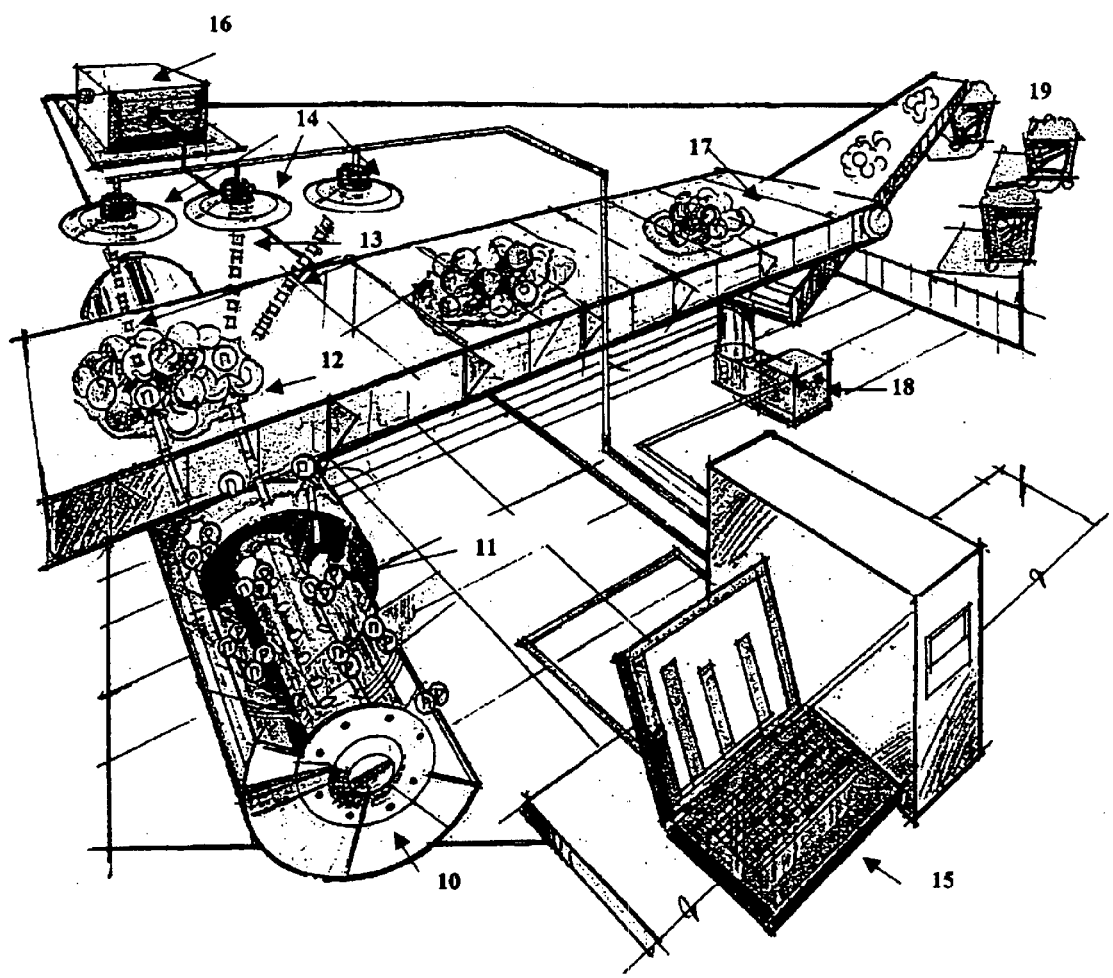
FIG. 1 is a conceptual drawing of the integrated on-line material analysis and industrial process controller using the high-pressure high-resistance gaseous discharge neutron generator.

The invention leverages the unique and beneficial properties of the HPHRGD neutron source to generate a nearly uniform neutron emission field for irradiation of the target material, resulting in more accurate analysis to ensure better process control. A linear cylindrical configuration is well suited for applications involving conveyor belts and material property measurements. In the identified application of mined mineral analysis, a long concentric cylindrical HPHRGD neutron generator 10 operating with deuterium gas, producing D-D fusion neutrons 11 and powered by a dedicated supply 16 is arranged near a conveyor 17 to uniformly irradiate the material 12 passing on the belt. Elemental concentration data is obtained from a series of energy-sensitive gamma detectors 14, which detect characteristic gamma rays 13, and is used to control the process of directing material 18 to its designated location 19. A conceptual drawing of this preferred embodiment appears in FIG. 1. The integrated unit 15 containing the neutron generator control system, data acquisition and analysis system, and process control system is another unique feature of the invention.

Such a materials analysis system benefits from the long lifetime, low cost of construction, ease of maintenance, increased scanning capability, continuous operation, and integrated control system capability of the HPHRGD neutron generation system.

9. Security Package Inspection and Contraband Material Analysis with the HPHRGD Neutron Generator A. General Security Interrogation Concept with the HPHRGD Neutron Generator This innovation is for a security package inspection system utilizing the HPHRGD neutron generator for the non-invasive inspection of closed packages. Such inspection systems can be used at airports, embassies, parcel shipping facilities, other ports of entry, and anywhere else additional security is desired. The improvements in the state-of-the-art in neutron generation by the HPHRGD technology, including long lifetime, lower cost, hermetically sealed safe operation, on/off radiation features, and integrated control and diagnostic capability, combined with recent advancements in radiation detection and computational capability, will be able to satisfy this need at a low cost.

FIG. 49 depicts a sample configuration of a neutron package interrogation security system. The following components can be included in such a system:

1. The HPHRGD neutron generator system 10, including an automated control system and its power supply 16.
2. Neutron moderation 107 and shielding 26 to reduce neutron energy and protect nearby individuals for occupational safety.
3. A conveyor belt system 17 (or other transport mechanism) for moving items 22 by the neutron source and detectors.
4. Radiation detectors 14 to measure the effects of neutron interactions with the material.
5. A data acquisition system to collect energy and location information about the neutron interactions to determine the elemental contents of the package 22.
6. A data analysis system to display information 24 about the elemental contents, their location, and determine if such materials are in sufficient quantities to be hazardous.

The HPHRGD neutron generator is an ideal choice for the source of neutrons in the security inspection system. There are a variety of neutron emission profiles, such as near-uniform linear and near-uniform planar, to suit the geometry of the inspection system, which increases efficacy of interrogating large items such as checked baggage at airports, or small items such as mailing envelopes. A deuterium and tritium gas mixture can be used for this innovation to provide 14.1 MeV neutrons 20 where high energy neutrons may be needed to detect nitrogen and other chemicals with energy thresholds above 2.45 MeV. Rapid interrogation of the packages and spatial resolution in the detection process determine where the hazardous material is located within an item.

While some elements need the higher energy neutrons to produce prompt gamma-rays, other elements respond better to lower energy neutrons. One solution is to place a series of neutron moderators 107 in certain locations near the neutron source. The moderators can be designed to reduce the energy of some neutrons so they reach the item to be scanned near a particular energy to better identify certain elements. The moderator may also provide some open space to allow some fast neutrons to reach the item without slowing down. The HPHRGD neutron generator can be placed within a shielded enclosure 26 to minimize the radiation dose to anyone nearby, including the operator.

A conveyor belt system 17 or other translation system can move items into position for interrogation. The conveyor should move at a speed comparable to those currently used in airport X-ray scanners, so that individual items can be interrogated rapidly. The belt system should have a low aspect ratio to minimize neutron scattering and thermalization effects. Additionally, a video camera or X-ray camera can be used to generate images of the item as it is interrogated. Such images can be combined with the neutron interrogation results to alert an operator of the approximate location of any hazardous materials detected. The motion of the conveyor system should also be controllable, allowing an operator or an automated system to stop, advance or reverse the motion of interrogated items as necessary.

PGNA and DGNA techniques can be used to identify the chemical composition of the interrogated items. Because there are so many different elements and characteristic gamma rays to detect, energy-sensitive detectors 14 with excellent energy resolution, such as germanium detectors, are preferred to resolve the various gamma rays 13. An array of gamma-ray detectors can also be used to provide spatial resolution of the interrogated items. Signals from the detectors are fed into multi-channel analyzers and the gamma spectra are analyzed to determine the presence and amount of chemical elements. Neutron detectors can also be used to measure the source rate of the HPHRGD neutron generator and attenuation through the material to sample bulk characteristics. A neutron detector could be placed near the gamma detection array to detect increased neutron emission from special nuclear materials, as such materials would sub-critically multiply the neutrons emitted by the HPHRGD generator.

The security inspection system can use commercially available computer technology to quickly and accurately analyze the signals from the gamma detectors and neutron detectors. Computer program modules will recognize specific elements from the gamma spectra, determine the amounts of each element present, and determine if the amounts represent a hazardous condition. A module can specifically look for elements found in explosive material (e.g., nitrogen, sulfur, and potassium), elements in narcotics (e.g., chlorine and fluorine), metal elements that could form weapons (e.g., aluminum and iron), and other elements. An algorithm can determine the chemical concentrations based on amount of signals received and total neutron output.

Heuristic decision-making routines to assess the possible threat of certain chemical combinations can be incorporated within such modules. Each security inspection system can also be connected to an updateable reference database of chemical compositions of common items and dangerous materials to minimize false-positive hazard assessment. Data about the interrogated items, including elemental content and their locations within the item, can be uploaded to the database and can be stored for record keeping purposes. The number of false positive occurrences is reduced through the combination of detection apparatus, data analysis software, and the database system.

As noted in previous innovations, the data analysis system, HPHRGD neutron generator control system, and other components can be merged into one unit 23. Such integration will allow a single, simple user interface to control every aspect of the security inspection system, minimizing worker interaction and reducing the capacity for human error and reducing labor costs.

B. Preferred Embodiment of this Innovation

Figure 2:
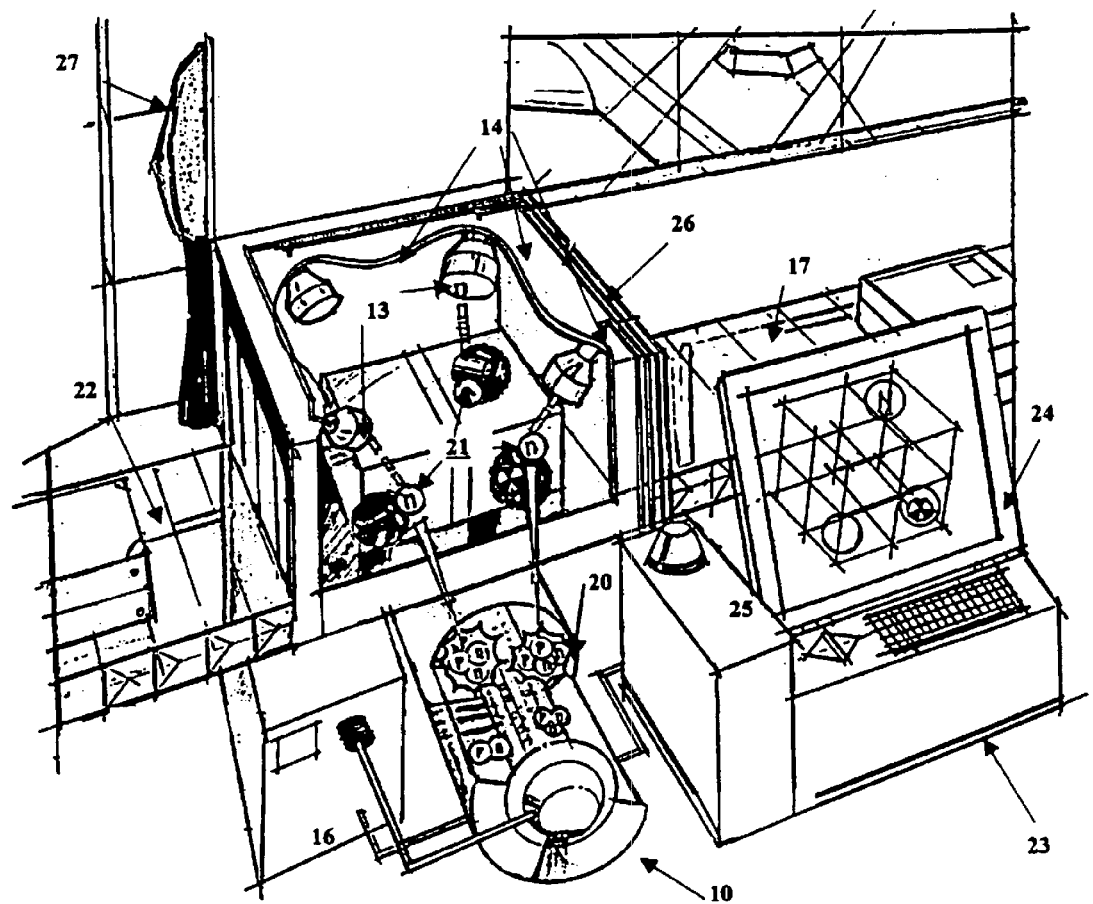
FIG. 2 is a conceptual drawing of the integrated on-line security and package inspection station using the high-pressure high-resistance gaseous discharge neutron generator.

The preferred embodiment of a security package inspection system, as shown in FIG. 2, includes a long cylindrical HPHRGD neutron generator 10 operating with a deuterium and tritium mixture to produce 14.1 MeV neutrons 20. Means to move items, such as a conveyor system 17, are used to bring items 22 near the neutron source so that they can be scanned quickly. An array of energy-sensitive gamma detectors 14 is positioned near the items to measure the gamma rays emitted 13 after interaction with the neutrons 21. The data acquisition system 23 analyzes the signals from the detectors to determine if they originated from hazardous chemicals and where they originated. A database of previously scanned items and chemical concentrations assists in reducing false positive hazard assessments. If the chemical components of the scanned item are deemed hazardous, an alarm 25 is sounded and the approximate location of the hazardous material is indicated on a display screen 24. Such a system can be integrated with existing security equipment, such as metal detecting portals 27 and conventional X-ray screening stations.

10. Mobile Environmental Land Analysis with the HPHRGD Neutron Generator

A. Remote Environmental Analysis Concept with the HPHRGD Neutron Generator

This innovation is a complete neutron inspection system for environmental scanning and analysis utilizing the state-of-the-art improvements gained by the HPHRGD including: long lifetime source and stability, compared to accelerator solid target devices, low cost of materials and maintenance, compared to linear accelerator spallation sources, on/off capability, safe storage and transport, compared to radioisotopic source, capability for computer integration and control for minimal operator interference, and customizable neutron source geometry for enhanced diagnostic capability.

In this application, remote monitoring and mobile scanning processes with the HPHRGD neutron generator and detection diagnostics provide continuous scanning of effluent streams for the detection of pollutants and waste products. The HPHRGD can be configured with an appropriate gamma detection array 14, data acquisition and analysis system 93 to provide real time remote monitoring of environmental gaseous, liquid and solid discharge. Data from the neutron scanning system can be sent electronically to a central database for tracking and monitoring. A sample illustration of a remote HPHRGD effluent monitoring assembly is shown in FIG. 45.

There is also emphasis for the creation of a mobile neutron analysis system for remote and in-the-field inspection of soil, including potential landmine fields, farmland, superfund sites, and water aquifers.

The HPHRGD neutron generator can be used to scan the surface layers of soil and earth for the identification of hidden underground explosives, such as landmines and unexploded ordinance, providing improvement to conventional de-mining detection systems in terms of scanning efficiency (time) and capability (materials detected). By utilizing neutron analysis techniques, such as PGNA and DGNA, explosive elemental signatures with spatial resolution can be determined, catalogued, and mapped for removal. A mobile vehicle 108, unmanned or manned, can be adapted with a HPHRGD neutron source 10, gamma-ray detector array 14, and data acquisition gear and analysis system 93. The deuterium-tritium version of the neutron generator is preferred for the greater range and penetration depth of the 14.1 MeV D-T neutrons for maximum subsurface scanning. FIG. 50 shows a sample illustration of a mobile landmine interrogation vehicle with the source and detectors mounted on an extension boom 109 and powered with a portable generator 110. The HPHRGD neutron interrogation system can also be integrated with other diagnostics, such as ground penetrating radar, to increase detection efficacy.

The HPHRGD neutron generator can also be utilized for the analysis of topsoil quality to determine the appropriate fertilizer application, planting seed, or other agricultural parameter for improvement of farming and harvesting. For an agricultural soil quality analysis system to provide specific data, such as nitrogen concentration for determining specific amounts of fertilizer to minimize costs and runoff, a mobile scanning system can map a plantation and provide an output data stream indicating the level of concentration in the soil. This can be coupled to an industrial controller to perform soil treatment in real time, as the ground is being scanned and processed. FIG. 50 also represents such a system adapted for farming purposes, although such a system could be mounted on a trailer. The benefit over existing soil analysis systems, is real-time 100% coverage of the soil field, as opposed to sampling of sections of the planting field. This reduces run-off problems, lowers costs of soil treatments, and also improves crop yields. Such a system could be implemented for the detection of hazardous materials at environmental waste sites, improving treatment and removal efficiency.

B. Preferred Embodiment of this Innovation

In the preferred embodiment, the long cylindrical HPHRGD neutron generator configuration can provide a near-uniform linear illumination source for superior sweeping width across terrain. This is applicable to landmine identification and also to soil quality analysis. For environmental remote monitoring, the HPHRGD geometrical configurations can be implemented depending on the application. For flow streams through pipes 95, an annular configuration 97 can provide additional diagnostic capability. Real-time analysis and detection capability, coupled with the improvements in the state-of-the-art in neutron generation, significantly increase the effectiveness of environmental remote monitoring 11. HPHRGD Neutron Generator for Medical Imaging and Treatment A. Medical Imaging and Treatment Concept with the HPHRGD Neutron Generator The fourth application area applies the HPHRGD state-of-the-art improvements in neutron generation to two separate categories: medical imaging and treatment. In the subset of medical imaging, neutron analysis techniques provide diagnostic imaging, including single photon emission computed tomography, without the use of radioactive tracer compounds; this bimodal imaging allows the utilization of a greater number of biological compounds, for improved analysis capability.

Neutrons from the HPHRGD can interact with individual elements through processes, such as PGNA and DGNA, yielding characteristic gamma rays within a patient. FIG. 51 shows a sample illustration of a HPHRGD medical imaging and diagnostic system for scanning patients 111 with a planar source 100 and moderating system 107. The advantages and improvements in the state-of-the-art neutron generation allow for more accurate scanning capability with the enhanced source geometry, longer lifetime, integrated control and imaging system 112 capability for greater resolution, and increase biological pathway analysis capability. SPECT imaging and 2D/3D gamma ray imaging can provide diagnostic data on the presence of tracer compounds, specifically tailored for the biological pathways interrogated. The ability to use a host of chemical isotopes with the bimodal neutron interaction allows greater diagnostic capability.

In the subset of medical treatment, neutrons can be directed to interact with materials present within the patient for a desired treatment effect. A specific application is Boron Neutron Capture Therapy, where neutrons 28 from the HPHRGD advanced source are directed to interact with a drug compound containing the element boron present in significant quantities 29 within the patient's cancer cells 30. BNCT is a bimodal therapy that uses neutron capture by boron-10 to generate localized heavy charged particles 31 to kill cancerous cells, as shown in FIG. 4.

FIG. 4a shows the neutron interaction with boron that releases an intense amount of energy as an alpha particle (a fast-moving helium nucleus) and a lithium ion (a fast-moving lithium nucleus). Both particles have very short ranges in tissue, depositing energy within one cell diameter. This localized energy deposition 31 results in a kill probability of nearly 100%, defeating even the best internal cellular repair mechanisms and allowing the treatment of brain, neck and spinal cancers (untreatable with conventional radiotherapy). This therapy effectively destroys cancerous tissue without harming normal healthy cells in close proximity. BNCT is a bimodal therapy in which only the combination of the neutrons and boron will cause significant damage to local tissue; either independently will cause little harm. An integrated scanning and treatment system illustration is presented in FIG. 52 using a long cylindrical HPHRGD neutron source 10 with detectors 14 mounted on a movable frame 113 to scan and treat a patient 111. FIG. 53 depicts another treatment variation without diagnostic imaging using an annular HPHRGD neutron source 97 with its power supply 16 and controller 58. A moderator assembly 107 can be fitted to provide neutrons with appropriate energies to the patient 111.

B. Preferred Embodiment of this Innovation

A long cylindrical or planar HPHRGD neutron generator can be used to provide sweeping or uniform scanning capability for medical diagnostic imaging with neutron analysis techniques. The HPHRGD neutron generator technology improves the state-of-the-art in medical treatment, in addition to the aforementioned HPHRGD advantages, the capability of small size and minimal support infrastructure to retrofit existing hospital radiotherapy centers without substantial capital improvements, and the capability with the geometrical source distributions to provide whole-body treatment.

What is claimed is:

1. A method of producing neutrons in a chamber containing an anode electrode, a suppressor cathode electrode, consisting of a semi-transparent electrically-conducting material that limits electron flow to said anode, and a leeching cathode electrode, consisting of a semi-transparent electrically-conducting material that removes electrons, comprising the steps of; introducing a fusible gas, comprising either deuterium gas or a mixture of deuterium and tritium gas, into the vacuum chamber; creating high voltage differentials between the cathode electrodes, comprised of said suppressor electrode and said leeching electrode, and said anode electrode, and a bias voltage to said suppressor electrode relative to said leeching cathode, such that a high-pressure high-resistance gaseous discharge forms primarily between said anode and said cathode electrodes and extends through the openings of said semi-transparent cathode electrodes, passing through said suppressor electrode and said leeching electrode and an intra-cathode region defined by the volume enclosed by said suppressor electrode, and such that ions resulting from said gaseous discharge and constituted from the group consisting of said fusible gas are accelerated by said voltage differential, with a substantial portion of said ions passing through the openings of said semi-transparent cathode electrodes; allowing a portion of said ions to undergo charge-exchange collisions with background gas particles, comprised of said fusible gas, to become fast-neutral particles selected from the group consisting of deuterium particles and tritium particles, such that a portion of said fast-neutral particles pass through said openings of said semi-transparent cathode electrodes, and such that a high-pressure high-resistance gaseous discharge is sustained primarily through charged particle generation initiated by said ions and said fast neutral particles; and generating neutrons from said high-pressure high-resistance gaseous discharge as a product of fusion collisions occurring between said ions and said background gas particles and between said fast-neutral particles and said background gas particles.

2. The method according to claim 1 wherein at least a portion of said background gas particles that experience collisions with said ions and said fast-neutral particles are situated on a surface of a material within the vacuum chamber.

3. The method according to claim 2, wherein said portion of said background gas particles that are situated on said surface within said vacuum chamber are attached to said surface by physical adsorption.

4. The method according to claim 1, wherein said chamber and said electrodes have a shape selected to produce said neutrons with a spatial distribution dependent on the volume occupied by said high-pressure high-resistance discharge within said shape.

5. The method according to claim 1, further comprising the step of employing an electron management system to augment the neutron production power efficiency of said high-pressure high-resistance gaseous discharge by adjustment of said bias voltage resulting in the reduction of space-charge buildup and power consumed by the production or conduction of electrons in said high-pressure high-resistance gaseous discharge.

6. The method according to claim 5 wherein said electron management system further comprises baffle electrodes, comprising electrically-conductive material with an electrical connection selected from the group of electrically floating or electrically connected to said leeching electrode, situated within said intra-cathode region to further inhibit space charge build up and to intercept errant particle and electron paths for minimization of electron generation.

* * * * *